(12) United States Patent
Liu et al.

(10) Patent No.: US 12,401,556 B2
(45) Date of Patent: Aug. 26, 2025

(54) EHT-LTF SEQUENCE TRANSMISSION METHOD AND RELATED APPARATUS

(71) Applicant: HUAWEI TECHNOLOGIES CO., LTD., Guangdong (CN)

(72) Inventors: Chenchen Liu, Shenzhen (CN); Dandan Liang, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 412 days.

(21) Appl. No.: 18/161,141

(22) Filed: Jan. 30, 2023

(65) Prior Publication Data
US 2023/0224203 A1 Jul. 13, 2023

Related U.S. Application Data

(63) Continuation of application No. PCT/CN2021/109915, filed on Jul. 30, 2021.

(30) Foreign Application Priority Data

Jul. 31, 2020 (CN) .......................... 202010762599.8

(51) Int. Cl.
*H04L 27/26* (2006.01)
*H04W 84/12* (2009.01)

(52) U.S. Cl.
CPC ........... *H04L 27/262* (2013.01); *H04W 84/12* (2013.01)

(58) Field of Classification Search
CPC ............. H04L 27/2603; H04L 27/2613; H04L 27/26132; H04L 27/262; H04W 84/12
See application file for complete search history.

(56) References Cited

U.S. PATENT DOCUMENTS

2021/0195591 A1* 6/2021 Li ....................... H04L 27/2603

FOREIGN PATENT DOCUMENTS

| CN | 110876200 A | 3/2020 |
|----|-------------|--------|
| WO | 2019240416 A1 | 12/2019 |
| WO | 2019240441 A1 | 12/2019 |
| WO | 2020096349 A1 | 5/2020 |

OTHER PUBLICATIONS

IEEE P802.11ax™/D6.0,Part 11: Wireless LAN Medium Access Control(MAC) and Physical Layer (PHY) Specifications, Amendment 1: Enhancements for High Efficiency WLAN, Nov. 2019, total 780 pages.

(Continued)

*Primary Examiner* — Asad M Nawaz
*Assistant Examiner* — Natali Pascual Peguero

(57) ABSTRACT

A method for transmitting an extremely high throughput long training field (EHT-LTF) sequence includes: A first communication device generates and sends an extremely high throughput physical layer protocol data unit (EHT PPDU), where the EHT PPDU includes an EHT-LTF; and correspondingly, a second communication device receives the EHT PPDU, and parses the EHT-LTF in the received EHT PPDU. In this way, an LTF sequence can be designed for the IEEE 802.11be standard, and a PAPR value of the LTF sequence on a resource unit can be reduced.

20 Claims, 11 Drawing Sheets

(56) References Cited

OTHER PUBLICATIONS

IEEE P802.11be™/D0.01,Part 11: Wireless LAN Medium Access Control (MAC) and Physical Layer (PHY) Specifications, Amendment 7: Enhancements for extremely high throughput (EHT), Jul. 2020, total 33 pages.
IEEE P802.11ay™/D2.2,Part 11: Wireless LAN Medium Access Control (MAC) and Physical Layer (PHY) Specifications, Amendment 2: Enhanced throughput for operation in 12 license-, exempt bands above 45 GHZ, Jan. 2019, total 707 pages.
PCT International Search Report for Application No. PCT/CN2021/109915 dated Jul. 30, 2021, 10 pages.
Chinese Office Action for Application No. 202010762599.8 dated Jul. 29, 2022, 8 pages.

\* cited by examiner

| L-STF/ Legacy short training field | L-LTF/ Legacy long training field | L-SIG/ Legacy signal field | L-SIG/ Legacy signal field | HE-SIG-A/ High-efficiency signal field A | HE-STF/High-efficiency short training field | HE-LTF/ High-efficiency long training field | DATA/ Data | PE/Packet extension |

FIG. 4a

| L-STF/ Legacy short training field | L-LTF/ Legacy long training field | L-SIG/ Legacy signal field | L-SIG/ Legacy signal field | HE-SIG-A/ High-efficiency signal field A | HE-SIG-B/ High-efficiency signal field B | HE-STF/ High-efficiency short training field | HE-LTF/ High-efficiency long training field | DATA/ Data | PE/Packet extension |

FIG. 4b

Type A RU26

Type: indicates the type    Type B RU26

EHT-LTF SEQUENCE TRANSMISSION METHOD AND RELATED APPARATUS

CROSS-REFERENCE TO RELATED APPLICATIONS

This application is a continuation of International Application No. PCT/CN2021/109915, filed on Jul. 30, 2021, which claims priority to Chinese Patent Application No. 202010762599.8, filed on Jul. 31, 2020. The disclosures of the aforementioned applications are hereby incorporated by reference in their entireties.

TECHNICAL FIELD

The present disclosure relates to the field of wireless communications technologies, and in particular, to an EHT-LTF sequence transmission method and a related apparatus.

BACKGROUND

With the development of the mobile Internet and the popularization of smart terminals, data traffic increases rapidly, and users have higher requirements on communication service quality. The Institute of Electrical and Electronics Engineers (IEEE) 802.11ax standard no longer meets user requirements on large throughput, low jitter, and low delay. Therefore, there is an urgent need to develop a next-generation wireless local area network (WLAN) technology, that is, the IEEE 802.11be standard, the extremely high throughput (EHT) standard, or the Wi-Fi 7 standard. Different from the IEEE 802.11ax, the IEEE 802.11be uses ultra-large bandwidths, such as 240 MHz and 320 MHz, to implement an ultra-high transmission rate and support a scenario of ultra-high user density.

The IEEE 802.11be continues to use the orthogonal frequency division multiplexing access (OFDMA) transmission manner used in the IEEE 802.11ax. The OFDMA technology is developed based on an orthogonal frequency division multiplexing (OFDM) technology, and is a technology that is applicable to multi-user access and that is formed by combining OFDM and frequency division multiple access (FDMA) technologies. OFDMA divides a physical channel into a plurality of resource blocks, each resource block includes a plurality of subcarriers (or subchannels), and each user may occupy one resource block for transmission. Therefore, a plurality of users may perform concurrent transmission, thereby reducing time overheads and a conflict probability of multi-user contention access. In addition, in the OFDMA technology, because subcarriers overlap with each other, spectrum utilization is greatly improved. However, because an OFDM symbol is formed by superimposing a plurality of independently modulated subcarrier signals, when phases of subcarriers are the same or similar, the superimposed signals are modulated by using a same initial phase, thereby generating a large instantaneous power, and consequently a high peak-to-average power ratio (PAPR), which is referred to as a PAPR for short. The PAPR is a ratio of a peak power of a signal to an average power of the signal in a period of time. In addition, because the OFDMA technology evolves from the OFDM technology, the OFDMA technology inevitably inherits a feature of a high PAPR of the OFDM technology. In addition, because the OFDM uses a frequency domain equalization technology, accuracy of channel estimation greatly affects communication performance. In addition, because an OFDM system has a disadvantage of a high PAPR, especially in a large bandwidth, more subcarriers lead to a higher PAPR, and a high PAPR leads to nonlinear distortion of a signal and degrade system performance.

Therefore, to improve accuracy of channel estimation, in the existing IEEE 802.11ax standard, a long training field (LTF) sequence that has a low PAPR and that can be applied to a plurality of spatial flows in different resource units (RU)/resource blocks is designed. In one aspect, because the IEEE 802.11be standard changes RU division and pilot subcarrier locations in an 80 MHz bandwidth in the IEEE 802.11ax standard, if the LTF sequence in the IEEE 802.11ax standard continues to be used, PAPR values of the LTF sequence on some resource units increase. In another aspect, because a maximum bandwidth supported in the IEEE 802.11be is 320 MHz, and a maximum bandwidth supported in the IEEE 802.11ax is 160 MHz, in the IEEE 802.11be, a channel estimation sequence with a low PAPR in a large bandwidth of 320 MHz needs to be designed, for example, an LTF sequence. In addition, because the IEEE 802.11be uses a transmission technology of OFDMA and 16 spatial flows, an LTF sequence with a low PAPR needs to be designed for each spatial flow and each resource block, so as to fully ensure communication performance of all users. In conclusion, in the IEEE 802.11be standard, how to design an LTF sequence to reduce a PAPR value on a resource unit becomes an urgent problem to be resolved.

SUMMARY

Embodiments of the present disclosure provide an EHT-LTF sequence transmission method and a related apparatus, so that an LTF sequence can be designed for the IEEE 802.11be standard, and a PAPR value of the LTF sequence on a resource unit can be reduced.

The following describes the present disclosure from different aspects. It should be understood that mutual reference may be made to the following implementations and beneficial effects of the different aspects.

According to a first aspect, the present disclosure provides an EHT-LTF sequence transmission method, applied to a first communication device, for example, an AP. The EHT-LTF sequence transmission method includes: The first communication device generates an extremely high throughput physical layer protocol data unit (EHT PPDU), where the EHT PPDU may include an EHT-LTF; and the first communication device sends the EHT PPDU.

According to a second aspect, the present disclosure provides an EHT-LTF sequence transmission method, applied to a second communication device, for example, a STA. The EHT-LTF sequence transmission method includes: The second communication device receives an extremely high throughput physical layer protocol data unit (EHT PPDU), where the EHT PPDU includes an EHT-LTF; and the second communication device parses the EHT-LTF in the received EHT PPDU.

According to a third aspect, the present disclosure provides a communication apparatus. The communication apparatus may be a first communication device or a chip in the first communication device, for example, a Wi-Fi chip. The communication apparatus includes:

a processing unit, configured to generate an extremely high throughput physical layer protocol data unit (EHT PPDU), where the EHT PPDU may include an EHT-LTF; and a transceiver unit, configured to send the EHT PPDU.

According to a fourth aspect, the present disclosure provides a communication apparatus, where the communication apparatus may be a second communication device or a chip in a second communication device, for example, a Wi-Fi chip, and includes:

a transceiver unit, configured to receive an extremely high throughput physical layer protocol data unit (EHT PPDU), where the EHT PPDU includes an EHT-LTF; and a processing unit, configured to parse the EHT-LTF in the received EHT PPDU.

In an implementation of any one of the foregoing aspects, a 2x EHT-LTF sequence in an 80 MHz bandwidth is:

2xEHT-LTF80 MHZ=[2xHE-LTF80 MHz_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHz_part5].

2xNew_partA=[1, 0, −1, 0, 1], 2xNew_partB=[0, 1, 0, −1, 0, 1, 0, 1, 0, 0, 0, 0, 0, 0, 0, −1, 0, 1, 0, −1, 0, 1, 0], and 2xNew_partC=[−1, 0, 1, 0, 1].

2xHE-LTF80 MHz_part2_Reverse indicates that 2xHE-LTF80 MHz_part2 is arranged in a reverse order. 2xHE-LTF80 MHz_part4_Reverse indicates that 2xHE-LTF80 MHz_part4 is arranged in a reverse order. 2xHE-LTF80 MHz_part1=2xHE-LTF80 MHz (−500:−259), 2xHE-LTF80 MHz_part2=2xHE-LTF80 MHz (−258:−17), 2xHE-LTF80 MHz_part4=2xHE-LTF80 MHz (17:258), and 2xHE-LTF80 MHz_part5=2xHE-LTF80 MHz (259:500).

In an implementation of any one of the foregoing aspects, a 4x EHT-LTF sequence in an 80 MHz bandwidth is:

4xEHT-LTF80 MHZ [4xHE-LTF80 MHz_part1, 4xNew_partA, 4xHE-LTF80 MHz_part2_Reverse, 4xNew_partB, 4xHE-LTF80 MHz_part4_Reverse, 4xNew_partC, (−1)*4xHE-LTF80 MHz_part5].

4xNew_partA=[−1, −1, −1, −1, 1], 4xNew_partB=[1, −1, −1, −1, 1, 1, −1, 1, −1, 0, 0, 0, 0, 0, 1, 1, 1, 1, 1, 1, −1, 1, 1], and 4xNew_partC=[−1, 1, −1, 1, −1].

4xHE-LTF80 MHz_part2_Reverse indicates that 4xHE-LTF80 MHz_part2 is arranged in a reverse order. 4xHE-LTF80 MHz_part4_Reverse indicates that 4xHE-LTF80 MHz_part4 is arranged in a reverse order. 4xHE-LTF80 MHz_part1=4xHE-LTF80 MHz (−500:−259), 4xHE-LTF80 MHz_part2=4xHE-LTF80 MHz (−258:−17), 4xHE-LTF80 MHz_part4=4xHE-LTF80 MHz (17:258), and 4xHE-LTF80 MHz_part5=4xHE-LTF80 MHz (259:500).

In this solution, an EHT-LTF80 MHz sequence is obtained by inverting/reversing some sequences in an HE-LTF80 MHz sequence, and re-assigning a value to a sequence corresponding to a direct current subcarrier in 11be. The EHT-LTF80 MHz sequence has a low PAPR value on a plurality of single Rus and a plurality of combined Rus. Compared with direct use of the HE-LTF80 MHz sequence in 11ax without modifying, PAPR values of the EHT-LTF80 MHz sequence on most resource blocks are reduced.

In an implementation of any one of the foregoing aspects, a 2xEHT-LTF sequence and a 4xEHT-LTF sequence in an 80 MHz bandwidth are respectively:

2xEHT-LTF80 MHz=[2xHE-LTF80 MHz_part1, 2xHE-LTF80 MHz_part2_Reverse, 2xHE-LTF80 MHz_part3, 2xHE-LTF80 MHz_part4_Reverse, 2xHE-LTF80 MHz_part5]; and 4xEHT-LTF80 MHz=[4xHE-LTF80 MHz_part1, 4xHE-LTF80 MHz_part2_Reverse, 4xHE-LTF80 MHz_part3, 4xHE-LTF80 MHz_part4_Reverse, 4xHE-LTF80 MHz_part5].

2xHE-LTF80 MHz_part2_Reverse indicates that 2xHE-LTF80 MHz_part2 is arranged in a reverse order. 2xHE-LTF80 MHz_part4_Reverse indicates that 2xHE-LTF80 MHz_part4 is arranged in a reverse order. 2xHE-LTF80 MHz_part1=2xHE-LTF80 MHz (−500:−259), 2xHE-LTF80 MHz_part2=2xHE-LTF80 MHz (−258:−12), 2xHE-LTF80 MHz_part3=2xHE-LTF80 MHz (−11:11), 2xHE-LTF80 MHz_part4=2xHE-LTF80 MHz (12:258), and 2xHE-LTF80 MHz_part5=2xHE-LTF80 MHz (259:500).

4xHE-LTF80 MHz_part2_Reverse indicates that 4xHE-LTF80 MHz_part2 is arranged in a reverse order. 4xHE-LTF80 MHz_part4_Reverse indicates that 4xHE-LTF80 MHz_part4 is arranged in a reverse order. 4xHE-LTF80 MHz_part1=4xHE-LTF80 MHz (−500:−259), 4xHE-LTF80 MHz_part2=4xHE-LTF80 MHz (−258:−12), 4xHE-LTF80 MHz_part3=4xHE-LTF80 MHz (−11:11), 4xHE-LTF80 MHz_part4=4xHE-LTF80 MHz (12:258), and 4xHE-LTF80 MHz_part5=4xHE-LTF80 MHz (259:500).

In this solution, some sequences in the HE-LTF80 MHz sequence are inverted to obtain an EHT-LTF80 MHz sequence, and sequence values corresponding to five direct current subcarriers between a first RU242 and a second RU242, 23 subcarriers between the second RU242 and a third RU242, and five direct current subcarriers between the third RU242 and a fourth RU242 do not need to be modified. Sequence values corresponding to corresponding subcarriers in 11ax are directly used. The EHT-LTF80 MHz sequence has a low PAPR value on a plurality of single Rus and a plurality of combined Rus. Compared with direct use of the HE-LTF80 MHz sequence in 11ax without modifying, PAPR values of the EHT-LTF80 MHz sequence on most resource blocks are reduced.

In an implementation of any one of the foregoing aspects, a 2xEHT-LTF sequence and a 4xEHT-LTF sequence in a 160 MHz bandwidth are respectively:

2xEHT-LTF160 MHZ=[2xEHT-LTF80 MHz_part1, 2xEHT-LTF80 MHz_part2, (−1)*2xEHT-LTF80 MHz_part3, (−1)*2xEHT-LTF80 MHz_part4, $0_{23}$, 2xEHT-LTF80 MHz_part1, 2xEHT-LTF80 MHz_part2, 2xEHT-LTF80 MHz_part3, 2xEHT-LTF80 MHz_part4]; and 4xEHT-LTF160 MHz=[4xEHT-LTF80 MHz_part1, 4xEHT-LTF80 MHz_part2, (−1)*4xEHT-LTF80 MHz_part3, 4xEHT-LTF80 MHz_part4, $0_{23}$, 4xEHT-LTF80 MHz_part1, (−1)*4xEHT-LTF80 MHz_part2, 4xEHT-LTF80 MHz_part3, 4xEHT-LTF80 MHz_part4].

2xEHT-LTF80 MHz_part1=2xEHT-LTF80 MHz (−500:−257), 2xEHT-LTF80 MHz_part2=2xEHT-LTF80 MHz (−256:−1), 2xEHT-LTF80 MHz_part3=2xEHT-LTF80 MHz (0:255), and 2xEHT-LTF80 MHz_part4=2xEHT-LTF80 MHz (256:500).

4xEHT-LTF80 MHz_part1=4xEHT-LTF80 MHz (−500:−257), 4xEHT-LTF80 MHz_part2=4xEHT-LTF80 MHz (−256:−1), 4xEHT-LTF80 MHz_part3=4xEHT-LTF80 MHz (0:255), and 4xEHT-LTF80 MHz_part4=4xEHT-LTF80 MHz (256:500).

In an implementation of any one of the foregoing aspects, a 2xEHT-LTF sequence and a 4xEHT-LTF sequence in a 320 MHz bandwidth are respectively:

2xEHT-LTF320 MHz=[2xEHT-LTF80 MHz_part1, 2xEHT-LTF80 MHz_part2, $0_{23}$, (−1)*2xEHT-LTF80 MHz_part1, 2xEHT-LTF80 MHz_part2, $0_{23}$, (−1)*2xEHT-LTF80 MHz_part1, (−1)*2xEHT-LTF80 MHz_part2, $0_{23}$, 2xEHT-LTF80 MHz_part1, (−1)*2xEHT-LTF80 MHz_part2]; and 4xEHT-LTF320 MHz=[4xEHT-LTF80 MHz_part1, (−1)*4xEHT-LTF80 MHz_part2, $0_{23}$, 4xEHT-LTF80 MHz_part1, 4xEHT-LTF80 MHz_part2, $0_{23}$, (−1)*4xEHT-LTF80 MHz_part1, 4xEHT-LTF80 MHz_part2, $0_{23}$, (−1)*4xEHT-LTF80 MHz_part1, 4xEHT-LTF80 MHz_part2].

2xEHT-LTF80 MHz_part1=2xEHT-LTF80 MHz (−500:−1) and 2xEHT-LTF80 MHz_part2=2xEHT-LTF80 MHz (0:500).

4xEHT-LTF80 MHz_part1=4xEHT-LTF80 MHz (−500:−1) and 4xEHT-LTF80 MHz_part2=4xEHT-LTF80 MHz (0:500).

In this solution, based on the foregoing EHT-LTF80 MHz sequence, an EHT-LTF sequence in a larger bandwidth (for example, 160 MHz and 320 MHz) may be constructed. These sequences have low PAPR values on a plurality of single Rus and a plurality of combined Rus.

In an implementation of any one of the foregoing aspects, a 2xEHT-LTF sequence and a 4xEHT-LTF sequence in an 80 MHz bandwidth are respectively:

2xEHT-LTF80 MHz=[2xHE-LTF80 MHz_part1, 2xHE-LTF80 MHz_part4, 2xHE-LTF80 MHz_part3, 2xHE-LTF80 MHz_part2, 2xHE-LTF80 MHz_part5]; and 4xEHT-LTF80 MHz=[4xHE-LTF80 MHz_part1, 4xHE-LTF80 MHz_part4, 4xHE-LTF80 MHz_part3, 4xHE-LTF80 MHz_part2, 4xHE-LTF80 MHz_part5].

2xHE-LTF80 MHz_part1=2xHE-LTF80 MHz (−500:−259), 2xHE-LTF80 MHz_part2=2xHE-LTF80 MHz (−258:−12), 2xHE-LTF80 MHz_part3=2xHE-LTF80 MHz (−11:11), 2xHE-LTF80 MHz_part4=2xHE-LTF80 MHz (12:258), and 2xHE-LTF80 MHz_part5=2xHE-LTF80 MHz (259:500).

4xHE-LTF80 MHz_part1=4xHE-LTF80 MHz (−500:−259), 4xHE-LTF80 MHz_part2=4xHE-LTF80 MHz (−258:−12), 4xHE-LTF80 MHz_part3=4xHE-LTF80 MHz (−11:11), 4xHE-LTF80 MHz_part4=4xHE-LTF80 MHz (12:258), and 4xHE-LTF80 MHz_part5=4xHE-LTF80 MHz (259:500).

In this solution, an EHT-LTF80 MHz sequence is obtained by moving a part of a sequence in the HE-LTF80 MHz sequence. The EHT-LTF80 MHz sequence has a low PAPR value on a plurality of single Rus and a plurality of combined Rus. Compared with direct use of the HE-LTF80 MHz sequence in 11ax without modifying, PAPR values of the EHT-LTF80 MHz sequence on most resource blocks are reduced.

In an implementation of any one of the foregoing aspects, a 2xEHT-LTF sequence in an 80 MHz bandwidth is:

2xEHT-LTF80 MHZ=[2xHE-LTF80 MHz_part1, 2xNew_partA, 2xHE-LTF80 MHz_part4, 2xNew_partB, 2xHE-LTF80 MHz_part2, 2xNew_partC, 2xHE-LTF80 MHz_part5].

2xNew_partA=[1, 0, 1, 0, −1], 2xNew_partB=[0, 1, 0, −1, 0, 1, 0, −1, 0, 0, 0, 0, 0, 0, 1, 0, 1, 0, −1, 0, 1, 0], and 2xNew_partC=[1, 0, −1, 0, 1].

2xHE-LTF80 MHz_part1=2xHE-LTF80 MHz (−500:−259), 2xHE-LTF80 MHz_part2=2xHE-LTF80 MHz (−258:−17), 2xHE-LTF80 MHz_part4=2xHE-LTF80 MHz (17:258), and 2xHE-LTF80 MHz_part5=2xHE-LTF80 MHz (259:500).

In an implementation of any one of the foregoing aspects, a 4xEHT-LTF sequence in an 80 MHz bandwidth is:

4xEHT-LTF80 MHZ=[4xHE-LTF80 MHz_part1, 4xNew_partA, 4xHE-LTF80 MHz_part4, 4xNew_partB, 4xHE-LTF80 MHz_part2, 4xNew_partC, 4xHE-LTF80 MHz_part5].

4xNew_partA=[−1, −1, 1, 1, 1], 4xNew_partB=[−1, −1, 1, 1, 1, −1, 1, −1, −1, 1, −1, 1, −1, 1, 0, 0, 0, 0, 0, −1, −1, 1, 1, −1, −1, 1, −1, 1, 1, −1, 1, −1, −1], and 4xNew_partC=[1, −1, 1, −1, −1].

4xHE-LTF80 MHz_part1=4xHE-LTF80 MHz (−500:−259), 4xHE-LTF80 MHz_part2=4xHE-LTF80 MHz (−258:−17), 4xHE-LTF80 MHz_part4=4xHE-LTF80 MHz (17:258), and 4xHE-LTF80 MHz_part5=4xHE-LTF80 MHz (259:500).

In this solution, an EHT-LTF80 MHz sequence is obtained by moving some sequences in the HE-LTF80 MHz sequence, and re-assigning a value to a sequence corresponding to a direct current subcarrier in 11be. The EHT-LTF80 MHz sequence has a low PAPR value on a plurality of single Rus and a plurality of combined Rus. Compared with direct use of the HE-LTF80 MHz sequence in 11ax without modifying, PAPR values of the EHT-LTF80 MHz sequence on most resource blocks are reduced.

In an implementation of any one of the foregoing aspects, a 2xEHT-LTF sequence and a 4xEHT-LTF sequence in a 160 MHz bandwidth are respectively:

2xEHT-LTF160 MHZ [2xEHT-LTF80 MHz_part1, 2xEHT-LTF80 MHz_part2, 2xEHT-LTF80 MHz_part3, 2xEHT-LTF80 MHz_part4, $0_{23}$, (−1)*2xEHT-LTF80 MHz_part1, (−1)*2xEHT-LTF80 MHz_part2, 2xEHT-LTF80 MHz_part3, 2xEHT-LTF80 MHz_part4]; and 4xEHT-LTF160 MHz=[4xEHT-LTF80 MHz_part1, 4xEHT-LTF80 MHz_part2, (−1)*4xEHT-LTF80 MHz_part3, (−1)*4xEHT-LTF80 MHz_part4, $0_{23}$, (−1)*4xEHT-LTF80 MHz_part1, 4xEHT-LTF80 MHz_part2, 4xEHT-LTF80 MHz_part3, (−1)*4xEHT-LTF80 MHz_part4].

EHT-LTF80 MHz_part1=EHT-LTF80 MHz (−500:−257), 2xEHT-LTF80 MHz_part2=2xEHT-LTF80 MHz (−256:−1), 2xEHT-LTF80 MHz_part3=2xEHT-LTF80 MHz (0:255), and 2xEHT-LTF80 MHz_part4=2xEHT-LTF80 MHz (256:500).

4xEHT-LTF80 MHz_part1=4xEHT-LTF80 MHz (−500:−257), 4xEHT-LTF80 MHz_part2=4xEHT-LTF80 MHz (−256:−1), 4xEHT-LTF80 MHz_part3=4xEHT-LTF80 MHz (0:255), and 4xEHT-LTF80 MHz_part4=4xEHT-LTF80 MHz (256:500).

In an implementation of any one of the foregoing aspects, a 2xEHT-LTF sequence and a 4xEHT-LTF sequence in a 320 MHz bandwidth are respectively:

2xEHT-LTF320 MHz=[2xEHT-LTF80 MHz_part1, (−1)*2xEHT-LTF80 MHz_part2, $0_{23}$, 2xEHT-LTF80 MHz_part1, 2xEHT-LTF80 MHz_part2, $0_{23}$, (−1)*2xEHT-LTF80 MHz_part1, 2xEHT-LTF80 MHz_part2, $0_{23}$, (−1)*2xEHT-LTF80 MHz_part1, (−1)*2xEHT-LTF80 MHz_part2]; and 4xEHT-LTF320 MHz=[4xEHT-LTF80 MHz_part1, (−1)*4xEHT-LTF80 MHz_part2, $0_{23}$, (−1)*4xEHT-LTF80 MHz_part1, (−1)*4xEHT-LTF80 MHz_part2, $0_{23}$, (−1)*4xEHT-LTF80 MHz_part1, 4xEHT-LTF80 MHz_part2, $0_{23}$, 4xEHT-LTF80 MHz_part1, 4xEHT-LTF80 MHz_part2].

2xEHT-LTF80 MHz_part1=2xEHT-LTF80 MHz (−500:−1) and 2xEHT-LTF80 MHz_part2=2xEHT-LTF80 MHz (0:500).

4xEHT-LTF80 MHz_part1=4xEHT-LTF80 MHz (−500:−1) and 4xEHT-LTF80 MHz_part2=4xEHT-LTF80 MHz (0:500).

In this solution, based on the foregoing EHT-LTF80 MHz sequence, an EHT-LTF sequence in a larger bandwidth (for example, 160 MHz and 320 MHz) may be constructed. These sequences have low PAPR values on a plurality of single Rus and a plurality of combined Rus.

According to a fifth aspect, the present disclosure provides a communication apparatus, which is a first communication device and includes a processor and a transceiver. The processor is configured to support the first communication device to perform a corresponding function in the method in the first aspect. The transceiver is configured to: support communication between the first communication device and a second communication device, and send information, a frame, a data packet, an instruction, or the like to the second communication device in the foregoing method. The first communication device may further include a memory, and the memory is configured to be coupled to the processor and stores one or more program instructions and data that are necessary for the first communication device.

In the embodiment, the processor is configured to generate an extremely high throughput physical layer protocol data unit (EHT PPDU), where the EHT PPDU may include an EHT-LTF; and the transceiver is configured to send the EHT PPDU.

According to a sixth aspect, the present disclosure provides a communication apparatus, which is a second communication device and includes a processor and a transceiver. The processor is configured to support the second communication device to perform a corresponding function in the method in the second aspect. The transceiver is configured to: support communication between the second communication device and a first communication device, and receive information, a frame, a data packet, an instruction, or the like sent by the first communication device in the foregoing method. The second communication device may further include a memory, and the memory is configured to be coupled to the processor and stores one or more program instructions and data that are necessary for the second communication device.

In the embodiment, the transceiver is configured to receive an extremely high throughput physical layer protocol data unit (EHT PPDU), where the EHT PPDU includes an EHT-LTF; and the processor is configured to parse the EHT-LTF in the received EHT PPDU.

According to a seventh aspect, the present disclosure provides a chip or a chip system, including an input/output interface and a processing circuit. The processing circuit is configured to generate an extremely high throughput physical layer protocol data unit (EHT PPDU), where the EHT PPDU may include an EHT-LTF; and the input/output interface is configured to send the EHT PPDU.

In an example embodiment, the input/output interface is configured to receive an extremely high throughput physical layer protocol data unit (EHT PPDU), where the EHT PPDU includes an EHT-LTF; and the processing circuit is configured to parse the EHT-LTF in the received EHT PPDU.

According to an eighth aspect, the present disclosure provides a computer-readable storage medium. The computer-readable storage medium stores instructions; and when the instructions are run on a computer, the computer is enabled to perform the EHT-LTF sequence transmission method according to any one of the foregoing aspects.

According to a ninth aspect, the present disclosure provides a computer program product including instructions. When the computer program product runs on a computer, the computer is enabled to perform the EHT-LTF sequence transmission method according to any one of the foregoing aspects.

According to embodiments of the present disclosure, an LTF sequence can be designed for the IEEE 802.11be standard, and a PAPR value of the LTF sequence on a resource unit can be reduced.

BRIEF DESCRIPTION OF DRAWINGS

To describe technical solutions in embodiments of the present disclosure more clearly, the following briefly describes accompanying drawings for describing embodiments.

FIG. 4a is a schematic diagram of a frame structure of an HE SU PPDU;

FIG. 4b is a schematic diagram of a frame structure of an HE MU PPDU;

DESCRIPTION OF EMBODIMENTS

The following clearly and completely describes the technical solutions in embodiments of the present disclosure with reference to the accompanying drawings in embodiments of the present disclosure.

To facilitate understanding of the technical solutions in embodiments of the present disclosure, the following briefly describes a system architecture of an EHT-LTF sequence transmission method provided in embodiments of the present disclosure. It may be understood that the system architecture and/or the scenario described in embodiments of the present disclosure are/is intended to describe the technical solutions in embodiments of the present disclosure more clearly, and do/does not constitute a limitation on the technical solutions provided in embodiments of the present disclosure.

An embodiment of the present disclosure provides an EHT-LTF sequence transmission method, which may be applied to a wireless communication system. A high efficiency (HE) LTF sequence in 80 MHz in the 802.11ax standard is modified, and a modified sequence is applied to 802.11be, so that PAPR values of an EHT-LTF sequence on a plurality of single RUs and a plurality of combined RUs can be reduced. In addition, concatenation may be performed based on the modified sequence, to construct EHT-LTF sequences in 160 MHz and 320 MHz bandwidths, so that a PAPR of an EHT-LTF sequence in a larger bandwidth on an RU is also low. The wireless communication system may be a wireless local area network or a cellular network. The EHT-LTF sequence transmission method may be implemented by a communication device, or a chip or a processor in the communication device in the wireless communication system. The communication device may be an access point (AP) device or a station (STA) device. Alternatively, the communication device may be a wireless communication device that supports concurrent transmission on a plurality of links. For example, the communication device may be referred to as a multi-link device (MLD) or a multi-band device. Compared with a communication device that supports only single-link transmission, the multi-link device has higher transmission efficiency and a higher throughput.

It may be understood that, the EHT-LTF sequence transmission method provided in embodiments of the present disclosure may be applied to a scenario in which one node performs data transmission with one or more nodes; may be applied to single-user uplink/downlink transmission, and multi-user uplink/downlink transmission; or may be applied to device to device (D2D) transmission. The node may be an AP or a STA. When an AP communicates with a STA or a STA communicates with a STA, an LTF sequence in a frame structure of a physical protocol data unit (PPDU) needs to be designed based on a tone plan in 802.11be, and tone plans of 160 MHz and 320 MHz are repetition of a tone plan of 80 MHz. For ease of description, the following uses communication between the AP and the STA as an example for description.

Figure 1:
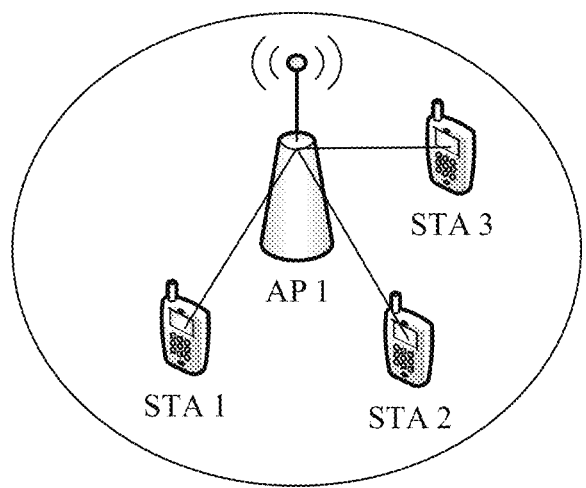
FIG. 1 is a schematic diagram of an architecture of a wireless communication system according to an embodiment of the present disclosure.

FIG. 1 is a schematic diagram of an architecture of a wireless communication system according to an embodiment of the present disclosure. As shown in FIG. 1, the wireless communication system may include one or more APs (for example, an AP 1 in FIG. 1) and one or more STAs (for example, a STA 1, a STA 2, and a STA 3 in FIG. 1). The AP and the STA support a WLAN communication protocol. The communication protocol may include the IEEE 802.11be (or referred to as Wi-Fi 7, EHT protocol), and may further include protocols such as the IEEE 802.11ax and the IEEE 802.11ac. Certainly, the communication protocol may further include a next-generation protocol of IEEE 802.11be and the like with continuous evolution and development of communication technologies. A WLAN is used as an example. An apparatus for implementing the method in the present disclosure may be an AP or a STA in the WLAN, or a chip or a processing system disposed in the AP or the STA.

The access point (AP) is an apparatus having a wireless communication function, supports communication by using a WLAN protocol, has a function of communicating with another device (for example, a station or another access point) in a WLAN network, and certainly, may further have a function of communicating with another device. In the WLAN system, an access point may be referred to as an access point station (AP STA). The apparatus may be an entire device, or may be a chip or a processing system installed in the entire device. The device in which the chip or the processing system is installed may implement the method and the function in embodiments of the present disclosure under control of the chip or the processing system. The AP in embodiments of the present disclosure is an apparatus providing a service for a STA, and may support 802.11 series protocols. For example, the AP may be a communication entity, for example, a communication server, a router, a switch, or a bridge. The AP may include a macro base station, a micro base station, a relay station, and the like in various forms. Certainly, the AP may alternatively be a chip or a processing system in these devices in various forms, to implement the method and function in embodiments of the present disclosure.

A station (for example, the STA 1 or the STA 2 in FIG. 1) is an apparatus having a wireless communication function, supports communication by using a WLAN protocol, and has a capability of communicating with another station or an access point in a WLAN network. In the WLAN system, a station may be referred to as a non-access point station (non-AP STA). For example, the STA is any user communication device that allows a user to communicate with an AP and further communicate with a WLAN. The apparatus having a wireless communication function may be an entire device, or may be a chip or a processing system disposed in the entire device. The device in which the chip or the processing system is disposed may implement the method and the function in embodiments of the present disclosure under control of the chip or the processing system. For example, the STA may be user equipment that can connect to the internet, for example, a tablet computer, a desktop computer, a laptop computer, a notebook computer, an ultra-mobile personal computer (UMPC), a handheld computer, a netbook, a personal digital assistant (PDA), or a mobile phone. Alternatively, the STA may be an internet of things node in the internet of things, an in-vehicle communication apparatus in the internet of vehicles, an entertainment device, a game device or system, a global positioning system device, or the like. The STA may alternatively be a chip and a processing system in the foregoing terminals.

The WLAN system can provide high-speed and low-latency transmission. With continuous evolution of WLAN application scenarios, the WLAN system is to be applied to more scenarios or industries, for example, the internet of things industry, the internet of vehicles industry, the banking industry, enterprise offices, exhibition halls of stadiums, concert halls, hotel rooms, dormitories, wards, classrooms, supermarkets, squares, streets, production workshops and warehousing. Certainly, a device (such as an access point or a station) that supports WLAN communication may be a sensor node (for example, a smart water meter, a smart electricity meter, or a smart air detection node) in a smart city, a smart device (for example, a smart camera, a projector, a display, a television, a stereo, a refrigerator, or a washing machine) in a smart home, a node in the internet of things, an entertainment terminal (for example, an AR, a VR, or another wearable device), a smart device in smart office (for example, a printer, a projector, a loudspeaker, or a stereo), an internet of vehicle device in the internet of vehicle, an infrastructure (for example, a vending machine, a self-service navigation station of a supermarket, a self-service cash register device, or a self-service ordering machine) in daily life scenarios, a device in a large sports and music venue, and the like. Specific forms of the multi-link STA and the multi-link AP are not limited in embodiments of the present disclosure, and are merely examples for description herein.

Figure 2A:
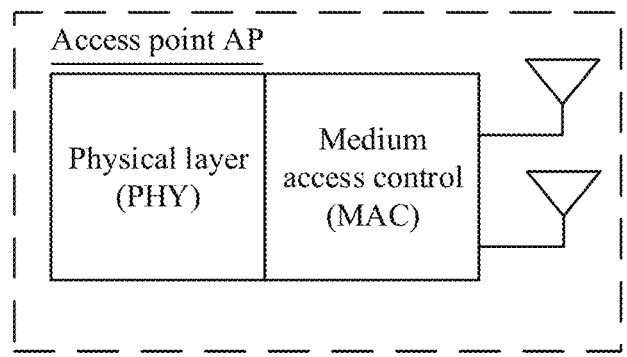
FIG. 2a is a schematic diagram of a structure of an access point according to an embodiment of the present disclosure.
Figure 2B:
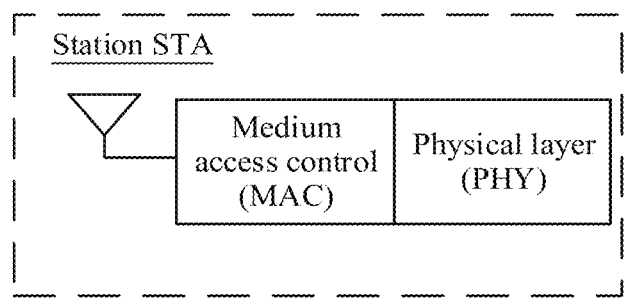
FIG. 2b is a schematic diagram of a structure of a station according to an embodiment of the present disclosure.

Optionally, refer to FIG. 2a. FIG. 2a is a schematic diagram of a structure of an access point according to an embodiment of the present disclosure. The AP may have a plurality of antennas, or may have a single antenna. In FIG. 2a, the AP includes a physical layer (PHY) processing circuit and a media access control (MAC) processing circuit. The physical layer processing circuit may be configured to process a physical layer signal, and the MAC layer processing circuit may be configured to process a MAC layer signal. The 802.11 standard focuses on the PHY and MAC parts. FIG. 2b is a schematic diagram of a structure of a station according to an embodiment of the present disclosure. FIG.

2b is a schematic diagram of a structure of a STA with a single antenna. In an actual scenario, the STA may alternatively have a plurality of antennas, and may be a device with more than two antennas. In FIG. 2b, the STA may include a PHY processing circuit and a MAC processing circuit. The physical layer processing circuit may be configured to process a physical layer signal, and the MAC layer processing circuit may be configured to process a MAC layer signal.

The foregoing content briefly describes the system architecture in embodiments of the present disclosure. To better understand the technical solutions in embodiments of the present disclosure, the following separately describes tone plans in 802.11ax and 802.11be.

1. 11ax Tone Plan

Figure 3:
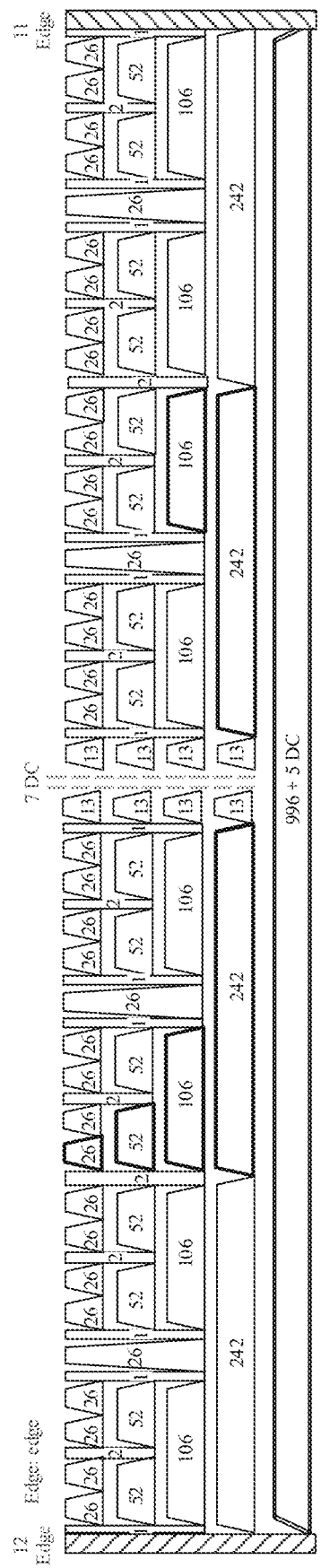
FIG. 3 is a schematic diagram of an 80 MHz tone plan in the 802.11ax.

FIG. 3 is a schematic diagram of an 80 MHz tone plan in 802.11ax. FIG. 3 shows an 80 MHz subcarrier design in 802.11ax. As shown in FIG. 3, an 80 MHz bandwidth in 802.11ax includes 36 RU26, or includes 16 RU52, or includes eight RU106, or includes four RU242, or includes one RU996 and five direct current subcarriers. There is no gap between a first RU242 and a second RU242, there are seven direct current subcarriers/null subcarriers between the second RU242 and a third RU242, and there is also no gap between the third RU242 and a fourth RU242. It may be understood that the RU26 may be a resource unit including 26 subcarriers. It may be further understood that the 26 subcarriers may be contiguous or noncontiguous. Similarly, the RU52 may be a resource unit including 52 subcarriers, the RU106 may be a resource unit including 106 subcarriers, the RU242 may be a resource unit including 242 subcarriers, and the like.

Based on the 80 MHz subcarrier design shown in FIG. 3, 802.11ax specifies an HE-LTF sequence used for channel estimation, and defines four HE PPDU formats: a high efficiency (HE) single user (SU) PPDU, a high efficiency (HE) multiple user (MU) PPDU, an HE ER SU PPDU (high efficiency extended range single user PPDU), and an HE TB PPDU (high efficiency trigger based PPDU).

FIG. 4a is a schematic diagram of a frame structure of an HE SU PPDU. As shown in FIG. 4a, the HE SU PPDU is used for SU transmission, and in the HE SU PPDU, a high efficiency signal field A is not repeated. Optionally, a frame structure of an HE ER SU PPDU is the same as the frame structure of the HE SU PPDU. FIG. 4b is a schematic diagram of a frame structure of an HE MU PPDU. As shown in FIG. 4b, if the HE MU PPDU is not used to respond to a trigger frame, the HE MU PPDU is transmitted to one or more users. Compared with the frame structure of the HE SU PPDU, the HE MU PPDU further includes a high efficiency signal field B. Optionally, a frame structure of an HE ER MU PPDU is the same as the frame structure of the HE MU PPDU.

In FIG. 4a and FIG. 4b, an HE-LTF included in a PPDU is a high efficiency long training field used for multiple-input multiple-output (MIMO) channel estimation. The field may include one or more HE-LTF elements, and each element is an OFDM symbol. In 802.11ax, HE-LTF modes are mainly classified into three types, namely, 1xLTF, 2xLTF, and 4xLTF. For details of an HE-LTF sequence in the 802.11ax standard, refer to the 802.11ax standard. Details are not described in the present disclosure.

It may be understood that a 1xLTF sequence is an LTF sequence with a subcarrier spacing of $\Delta_F^{1x}=20$ MHz/$64=312.5$ kHz, a 2xLTF sequence is an LTF sequence with a subcarrier spacing of $\Delta_F^{2x}=20$ MHz/$128=156.25$ kHz, and a 4xLTF sequence is an LTF sequence with a subcarrier spacing of $\Delta_F^{4x}=20$ MHz/$256=78.125$ kHz.

2. 11be Tone Plan

Figure 5:
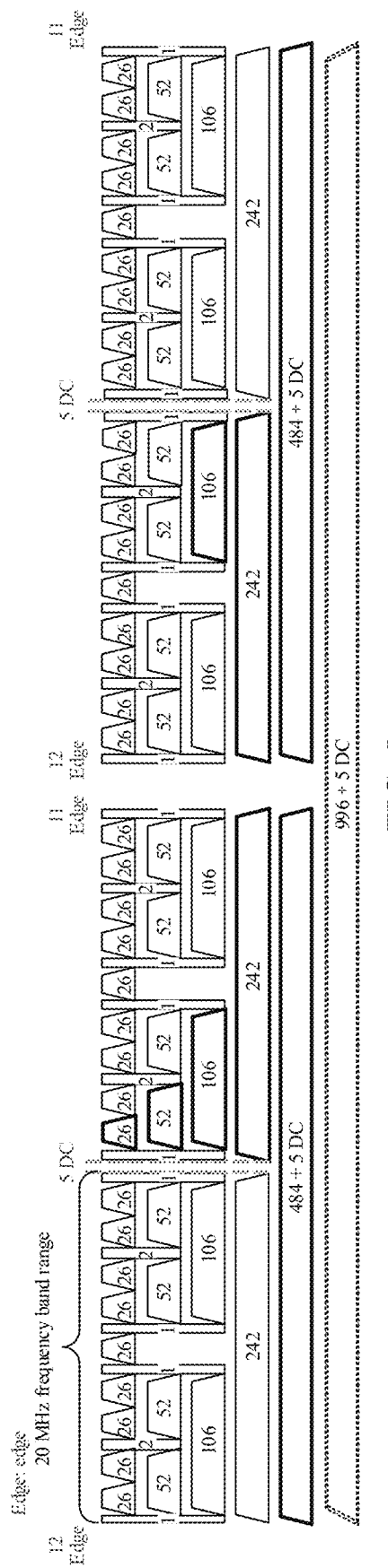
FIG. 5 is a schematic diagram of an 80 MHz tone plan in 802.11be according to an embodiment of the present disclosure.

To meet users' requirements for an ultra-large bandwidth, an ultra-high transmission rate, and an extremely high throughput, the 802.11be expands a bandwidth from 160 MHz to 240 MHz and 320 MHz. 240 MHz may be obtained by directly combining subcarriers of three 802.11be 80 MHz. 320 MHz may be obtained by directly combining subcarriers of four 802.11be 80 MHz. FIG. 5 is a schematic diagram of an 80 MHz tone plan in 802.11be according to an embodiment of the present disclosure. FIG. 5 shows an 80 MHz subcarrier design in 802.11be. As shown in FIG. 5, an 80 MHz bandwidth in 802.11be includes 36 RU26, or includes 16 RU52, or includes eight RU106, or includes four RU242, or includes two RU484 and five direct current subcarriers/null subcarriers, or includes one RU996 and five direct current subcarriers. There are five direct current subcarriers between a first RU242 and a second RU242, and there are also five direct current subcarriers between a third RU242 and a fourth RU242.

The following separately describes locations of different RUs in the 80 MHz bandwidth in the 802.11be.

(a) In the 80 MHz subcarrier design in FIG. 5, indices of data subcarriers and pilot subcarriers of an RU26 are shown in the following Table 1. One RU26 includes 24 data subcarriers and two pilot subcarriers.

TABLE 1

| | Indices of data subcarriers and pilot subcarriers of an RU26 | | |
|---|---|---|---|
| | Locations of a first RU26 to an 18th RU26 | Locations of a 19th RU26 to a 36th RU26 | Pilot location |
| 26-tone RU | [−499 −474] | [13 38] | {−494 −480}, {−468 −454}, |
| | [−473 −448] | [39 64] | {−440 −426}, {−414 −400}, |
| | [−445 −420] | [67 92] | {−386, −372}, {−360 −346}, |
| | [−419 −394] | [93 118] | {−334 −320}, {−306 −292}, |
| | [−392 −367] | [120 145] | {−280 −266}, {−246 −232}, |
| | [−365 −340] | [147 172] | {−220, −206}, {−192 −178}, |
| | [−339 −314] | [173 198] | {−166 −152}, {−140 −126}, |
| | [−311 −286] | [201 226] | {−112 −98}, {−86 −72}, |
| | [−285 −260] | [227 252] | {−58 −44}, {−32 −18}, {18 32}, |
| | [−252 −227] | [260 285] | {44 58}, {72 86}, {98 112}, |
| | [−226 −201] | [286 311] | {126 140}, {152 166}, {178 |
| | [−198 −173] | [314 339] | 192}, {206 220}, {232 246}, |
| | [−172 −147] | [340 365] | 5DC, {266 280}, {292 306}, |
| | [−145 −120] | [367 392] | {320 334}, {346 360}, {372 |
| | [−118 −93] | [394 419] | 386}, {400 414}, {426 440}, |
| | [−92 −67] | [420 445] | {454 468}, {480 494} |

TABLE 1-continued

Indices of data subcarriers and pilot subcarriers of an RU26

| Locations of a first RU26 to an 18th RU26 | Locations of a 19th RU26 to a 36th RU26 | Pilot location |
|---|---|---|
| [−64 −39] | [448 473] | |
| [−38 −13] | [474 499] | |

Each row in a second column and a third column in Table 1 indicates one RU26. For example, a last row in the second column indicates an 18th RU26 [−38−13], and locations of the 18th RU26 are subcarriers numbered −38 to −13. For another example, a fifth row in the third column indicates a 23rd RU26 [120 145], and locations of the 23rd RU26 are subcarriers numbered 120 to 145. A fourth column in Table 1 sequentially indicates pilot subcarrier indices for corresponding 26-tone RUs. For example, the first 26-tone RU includes a subcarrier numbered −499 to a subcarrier numbered −474, where pilot subcarriers are a subcarrier numbered −494 and a subcarrier numbered −480. For another example, the second 26-tone RU includes a subcarrier numbered −473 to a subcarrier numbered −448, where pilot subcarriers are subcarriers numbered −468 to −454. For another example, the 36th 26-tone RU includes a subcarrier numbered 474 to a subcarrier numbered 499, where pilot subcarriers are subcarriers numbered 480 to 494. It may be understood that a 26-tone RU and the RU26 may be used interchangeably.

(b) In the 80 MHz subcarrier design in FIG. 5, indices of data subcarriers and pilot subcarriers of an RU52 are shown in the following Table 2. One RU52 includes 48 data subcarriers and four pilot subcarriers.

TABLE 2

Indices of data subcarriers and pilot subcarriers of an RU52

| | Locations of a first RU52 to a 16th RU52 | Pilot location |
|---|---|---|
| 52-tone RU | [−499 −448] | {−494, −480, −468, −454}, |
| | [−445 −394] | {−440, −426, −414, −400}, |
| | [−365 −314] | {−360, −346, −334, −320}, |
| | [−311 −260] | {−306, −292, −280, −266}, |
| | [−252 −201] | {−246, −232, −220, −206}, |
| | [−198 −147] | {−192, −178, −166, −152}, |
| | [−118 −67] | {−112, −98, −86, −72}, |
| | [−64 −13] | {−58, 44, −32, −18}, |
| | [13 64] | {18, 32, 44, 58}, {72, 86, 98, 112}, |
| | [67 118] | {152, 166, 178, 192}, {206, 220, 232, |
| | [147 198] | 246}, {266, 280, 292, 306}, {320, 334, |
| | [201 252] | 346, 360}, {400, 414, 426, 440}, {454, |
| | [260 311] | 468, 480, 494}, |
| | [314 365] | |
| | [394 445] | |
| | [448 499] | |

Each row in the second column in Table 2 indicates one RU. For example, a first row in a second column indicates a first RU52 [−38 −13], and locations of the first RU52 are a subcarrier numbered −499 to a subcarrier numbered −448. A third column in Table 2 sequentially indicates pilot subcarrier indices for corresponding 52-tone RUs. For example, the second 52-tone RU includes subcarriers numbered −445 to −394, where pilot subcarriers are subcarriers numbered −440, −426, −414, and −400. It may be understood that a 52-tone RU and the RU52 may be used interchangeably.

It should be understood that, the following table describes same meanings, which are not repeated below.

(c) In the 80 MHz subcarrier design in FIG. 5, indices of data subcarriers and pilot subcarriers of an RU106 are shown in the following Table 3. One RU106 includes 102 data subcarriers and four pilot subcarriers. It may be understood that a 106-tone RU and the RU106 may be used interchangeably.

TABLE 3

Indices of data subcarriers and pilot subcarriers of an RU106

| | Locations of a first RU106 to an eighth RU106 | Pilot location |
|---|---|---|
| 106-tone RU | [−499 −394] | {−494, −468, −426, −400}, |
| | [−365 −260] | {−360, −334, −292, −266}, |
| | [−252 −147] | {−246, −220, −178, −152}, |
| | [−118 −13] | {−112, −86, −44, −18}, |
| | [13 118] | {18, 44, 86, 112}, {152, 178, 220, |
| | [147 252] | 246}, {266, 292, 334, 360}, {400, |
| | [260 365] | 426, 468, 494} |
| | [394 499] | |

(d) In the 80 MHz subcarrier design in FIG. 5, indices of data subcarriers and pilot subcarriers of an RU242 are shown in the following Table 4. One RU242 includes 234 data subcarriers and eight pilot subcarriers. It may be understood that a 242-tone RU and the RU242 may be used interchangeably.

TABLE 4

Indices of data subcarriers and pilot subcarriers of an RU242

| | Locations of a first RU242 to a fourth RU242 | Pilot location |
|---|---|---|
| 242-tone RU | [−500 −259] | {−494, −468, −426, −400, −360, |
| | [−253 −12] | −334, −292, −266}, {−246, |
| | [12 253] | −220, −178, −152, −112, |
| | [259 500] | −86, −44, −18}, {18, 44, 86, |
| | | 112, 152, 178, 220, 246}, {266, |
| | | 292, 334, 360, 400, 426, 468, 494} |

(e) In the 80 MHz subcarrier design in FIG. 5, indices of data subcarriers and pilot subcarriers of an RU484 are shown in the following Table 5. A 484-tone RU and the RU484 may be used interchangeably. It may be understood that an 80 MHz 484-tone RU in the 802.11ax is an RU composed of 484 consecutive subcarriers. An 80 MHz 484-tone RU in the 802.11be is composed of 468 data subcarriers and 16 pilot subcarriers, and there are 5 direct current subcarriers or null subcarriers in the middle. For example, in the first 484-tone RU, subcarriers are numbered from −500 to −12. The 5 direct current subcarriers are numbered −258, −257, −256, −255, and −254. The 16 pilot subcarriers are numbered −494, −468, −426, −400, −360, −334, −292, −266, −246, −220, −178, −152, −112, −86, −44, and −18.

TABLE 5

Indices of data subcarriers and pilot subcarriers of an RU484

| | Locations of a first RU484 and a second RU484 | Pilot location |
|---|---|---|
| 484-tone RU | [−500 −259 −253 −12] [12 253 259 500] | {−494, −468, −426, −400, −360, −334, −292, −266, −246, −220, −178, −152, −112, −86, −44, −18}, {18, 44, 86, 112, 152, 178, 220, 246, 266, 292, 334, 360, 400, 426, 468, 494} |

(f) In the 80 MHz subcarrier design in FIG. 5, indices of data subcarriers and pilot subcarriers of an RU996 are shown in the following Table 6. A 996-tone RU and the RU996 may be used interchangeably. An 80 MHz 996-tone RU in the 802.11be is composed of 980 data subcarriers and 16 pilot subcarriers, and there are 5 direct current subcarriers in the middle. For example, in the first 996-tone RU, subcarriers are numbered −500 to 500, and the 5 direct current subcarriers are numbered −2, −1, 0, 1, and 2. The 16 pilot subcarriers are numbered −468, −400, −334, −266, −220, −152, −86, −18, +18, +86, +152, +220 +266, +334, +400, and +468.

TABLE 6

Indices of data subcarriers and pilot subcarriers of an RU996

| | Locations of a RU996 | Pilot location |
|---|---|---|
| 996-tone RU | [−500 −33 500] | {−468, −400, −334, −266, −220, −152, −86, −18, +18, +86, +152, +220, +266, +334, +400, +468} |

In conclusion, it can be learned from the tone plan (FIG. 3) in 11ax and the tone plan (FIG. 5) in 11be that resource block division and a pilot location in an 80 MHz bandwidth in 11be (it may be understood that a "pilot location" mentioned in the present disclosure is a pilot subcarrier location, and a "pilot location" and a "pilot subcarrier location" may be mutually used) are different from resource block division and a pilot location in an 80 MHz bandwidth in 11ax. For example, it can be learned from comparison between FIG. 3 and FIG. 5 that there is no spacing between the first RU242 and the second RU242 in 11ax, and there are five direct current subcarriers between the first RU242 and the second RU242 in 11be. Therefore, if the HE-LTF sequence in the 80 MHZ bandwidth in 11ax is directly applied to an 80 MHz bandwidth in 11be, PAPR values on some resource blocks in 11be are high, as shown in Table 7 below. In Table 7, a second row indicates average PAPR values of a data part on different resource blocks. A third row indicates PAPR values on different resource blocks when a 2x HE-LTF sequence in an 80 MHz bandwidth in 11ax is applied to an 80 MHz bandwidth in 11be. A fourth row indicates PAPR values on different resource blocks when a 4x HE-LTF sequence in the 80 MHz bandwidth in 11ax is applied to the 80 MHZ bandwidth in 11be. It can be learned from Table 7 that PAPR values of resource blocks (RU26, RU52, and RU484+RU242) in the second column, the third column, and a last column in Table 7 are greater than the average PAPR values of the data part.

TABLE 7

PAPR values of an HE-LTF sequence in an 80 MHz bandwidth in 11ax applied to an 80 MHz bandwidth in 11be

| Max PAPR | RU26 | RU52 | RU106 | RU242 | RU484 | RU996 | RU52 + RU26 | RU106 + RU26 | RU484 + RU242 |
|---|---|---|---|---|---|---|---|---|---|
| Data (16QAM) | 6.52 | 7.17 | 7.76 | 8.36 | 8.82 | 9.22 | 7.54 | 7.94 | 9.08 |
| 2x LTF | 7.95 | 7.43 | 6.71 | 8.23 | 7.33 | 6.48 | 6.37 | 6.64 | 9.65 |
| 4x LTF | 7.29 | 8.48 | 6.69 | 7.07 | 7.36 | 6.74 | 6.90 | 7.42 | 8.46 |

In addition, because a combined RU is introduced in 802.11be, if a PAPR value of a single RU is high, a PAPR value of a combined RU obtained by combining a plurality of RUs is higher. It may be understood that combining a plurality of RUs means to allocate the plurality of RUs to one STA. A location of each RU includes a data subcarrier location and a pilot subcarrier location of the RU. In still another aspect, because a maximum bandwidth supported by 802.11ax is 160 MHz, and a maximum bandwidth supported by 802.11be is 320 MHz, for a larger bandwidth (for example, 320 MHz), an LTF sequence applicable to the larger bandwidth needs to be redesigned.

Therefore, embodiments of the present disclosure provide a plurality of methods for modifying an HE-LTF sequence in an 80 MHz bandwidth in 802.11ax, and applying a modified sequence to the 802.11be standard. In other words, in embodiments of the present disclosure, after some changes are made to the HE-LTF sequence in the 80 MHz bandwidth in 802.11ax, after the sequence is applied to 11be, PAPR values of an LTF sequence on a plurality of single RUs and a plurality of combined RUs can be significantly reduced.

After the tone plans in 802.11ax and 802.11be are described, the following describes in detail an EHT-LTF sequence transmission method provided in embodiments of the present disclosure with reference to more accompanying drawings. In embodiments of the present disclosure, the method is described by using a first communication device and a second communication device. It may be understood that the first communication device may be an AP or a STA (for example, the AP or the STA shown in FIG. 1), and the second communication device may also be an AP or a STA (for example, the AP or the STA shown in FIG. 1).

It may be understood that the "LTF sequence" mentioned in the present disclosure may be a frequency domain sequence of an LTF, and the two may be used interchangeably in the present disclosure. The "80 MHz bandwidth"

mentioned in the present disclosure may mean that a bandwidth is 80 MHz. Similarly, the "160 MHz bandwidth" may mean that a bandwidth is 160 MHz, and the "320 MHz bandwidth" means that a bandwidth is 320 MHz.

Embodiment 1

An embodiment 1 of the present disclosure describes a possible procedure of an EHT-LTF sequence transmission method provided in the present disclosure.

Figure 6:
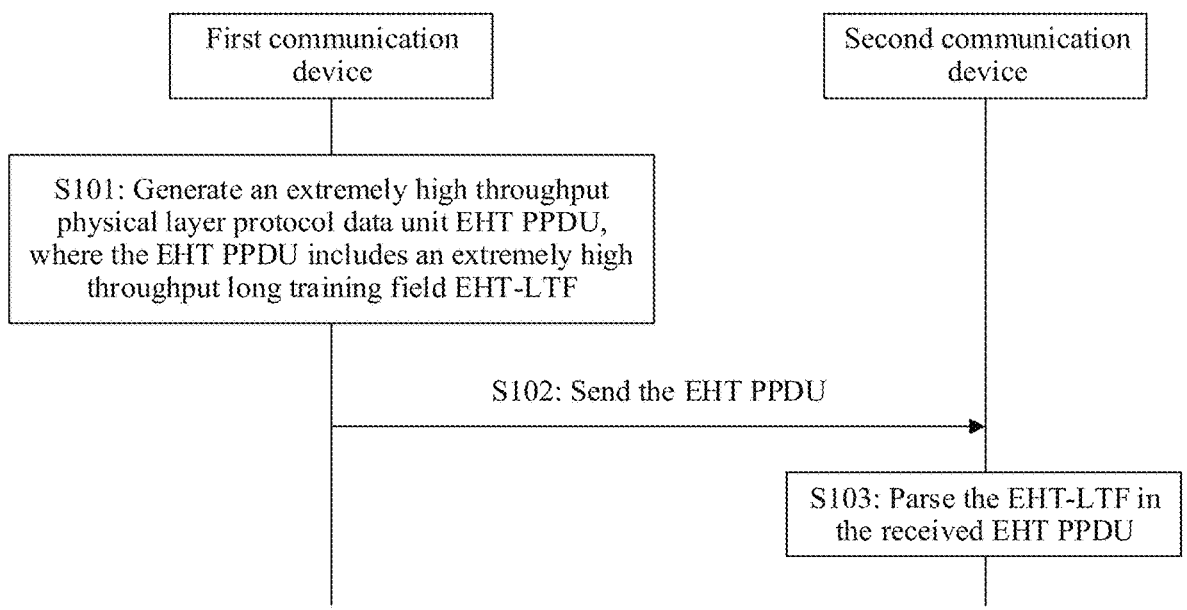
FIG. 6 is a schematic flowchart of an EHT-LTF sequence transmission method according to an embodiment of the present disclosure.

FIG. 6 is a schematic flowchart of an EHT-LTF sequence transmission method according to an embodiment of the present disclosure. As shown in FIG. 6, the EHT-LTF sequence transmission method includes but is not limited to the following steps.

S101: A first communication device generates an extremely high throughput physical layer protocol data unit (EHT PPDU), where the EHT PPDU includes an extremely high throughput long training field (EHT-LTF).

S102: The first communication device sends the EHT PPDU. Correspondingly, a second communication device receives the EHT PPDU.

S103: The second communication device parses the EHT-LTF in the received EHT PPDU.

For ease of description, in the present disclosure, "frequency domain sequence of an EHT-LTF" is referred to as an EHT-LTF sequence for short, and "frequency domain sequence of an HE-LTF" is referred to as an HE-LTF sequence for short.

Figure 7:
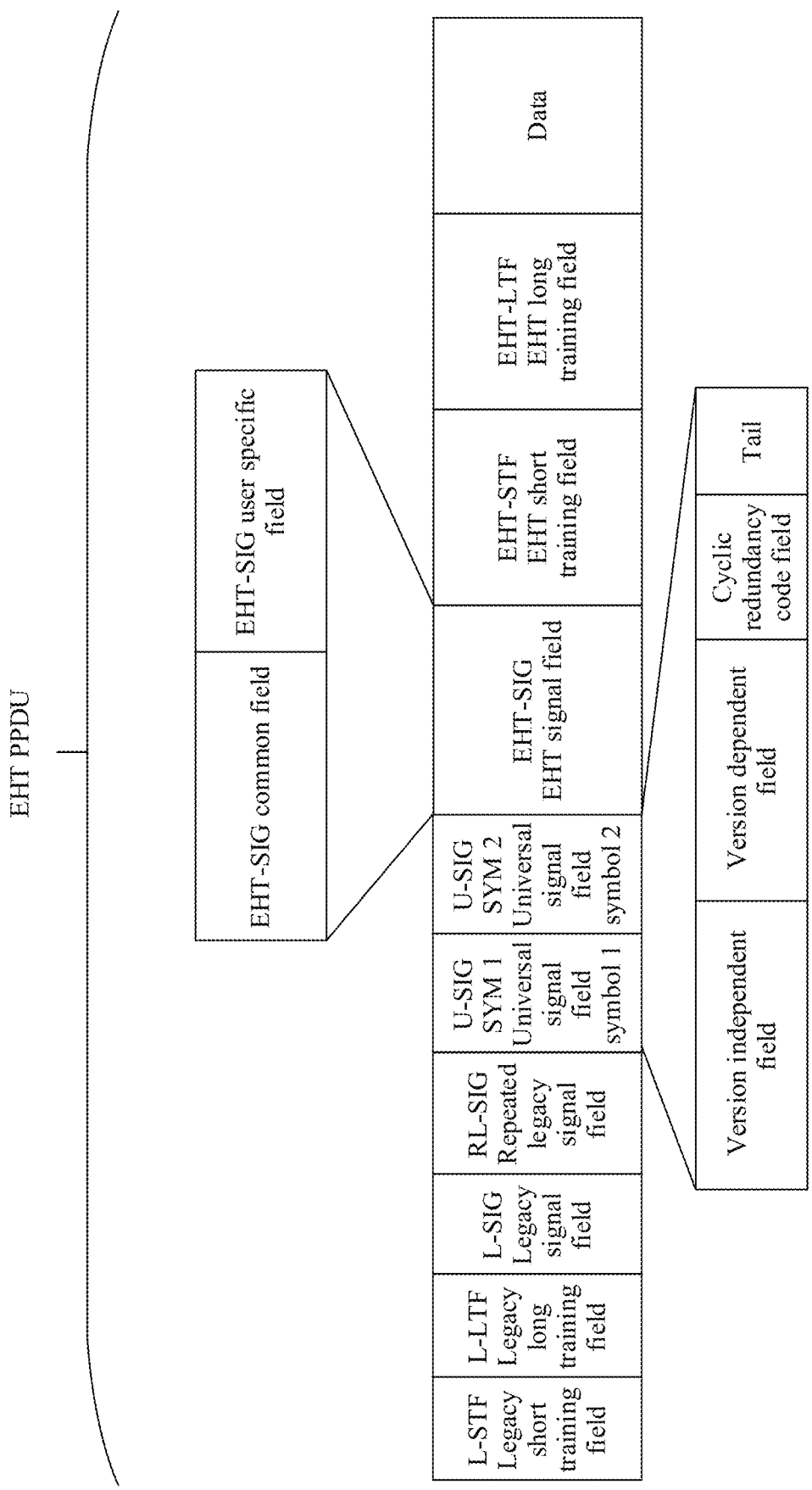
FIG. 7 is a schematic diagram of a structure of an EHT PPDU according to an embodiment of the present disclosure.

This embodiment focuses on an EHT-LTF sequence of an EHT PPDU transmitted over a plurality of bandwidths (80 MHz, 160 MHZ, and 320 MHz bandwidths). An EHT-LTF sequence in the 80 MHz bandwidth may be determined based on an HE-LTF sequence in an 80 MHz bandwidth in 11ax. An EHT-LTF sequence in the 160 MHz/320 MHz bandwidth may be determined by multiplying the EHT-LTF sequence in the 80 MHz bandwidth by different coefficients (1 or −1). FIG. 7 is a schematic diagram of a structure of an EHT PPDU according to an embodiment of the present disclosure. As shown in FIG. 7, the EHT PPDU includes an EHT long training field, and the EHT long training field may be used for carrying an EHT-LTF sequence.

This embodiment focuses on a plurality of possible EHT-LTF sequences. Before the plurality of possible EHT-LTF sequences provided in this embodiment are described, a method for generating an EHT-LTF sequence is first described. The details are as follows.

S1: Obtain an HE-LTF sequence in an 80 MHz bandwidth in 11ax. The HE-LTF sequence in the 80 MHz bandwidth is denoted as HE-LTF80 MHz.

S2: Use a sequence obtained through operations such as translation motion, reversal, or re-assignment on a part of the HE-LTF80 MHz sequence as an EHT-LTF sequence in an 80 MHz bandwidth. The EHT-LTF sequence in the 80 MHz bandwidth is denoted as EHT-LTF80 MHz.

Optionally, the method for generating an EHT-LTF sequence further includes: S3: Construct, based on the EHT-LTF80 MHz sequence, EHT-LTF sequences in 160 MHz and 320 MHz bandwidths through program search.

It may be understood that, when a Wi-Fi signal is sent in a single-stream pilot mode, a pilot subcarrier and a data subcarrier on each LTF symbol of a long training field corresponding to the Wi-Fi signal are multiplied by different values, so that a structure of an original LTF sequence changes, and a PAPR value of the LTF sequence may be high in a case of multiplying by some coefficients. Therefore, during design of an LTF sequence in actual application, impact of multiplying a pilot subcarrier by different coefficients on a PAPR value of an LTF needs to be considered.

It may be further understood that a data subcarrier of an $n^{th}$ LTF symbol sent in an $m^{th}$ spatial stream is multiplied by an element in an $m^{th}$ row and an $n^{th}$ column of a P matrix, and a pilot subcarrier of the LTF symbol is multiplied by an element in an $m^{th}$ row and an $n^{th}$ column of an R matrix. Each row of the R matrix is equal to a first row of the P matrix. Optionally, specific values of the P-matrix are as follows:

$$P_{4\times 4} = \begin{bmatrix} 1 & -1 & 1 & 1 \\ 1 & 1 & -1 & 1 \\ 1 & 1 & 1 & -1 \\ -1 & 1 & 1 & 1 \end{bmatrix};$$

$$P_{6\times 6} = \begin{bmatrix} w^{0*0} & -w^{0*1} & w^{0*2} & w^{0*3} & w^{0*4} & -w^{0*5} \\ w^{1*0} & -w^{1*1} & w^{1*2} & w^{1*3} & w^{1*4} & -w^{1*5} \\ w^{2*0} & -w^{2*1} & w^{2*2} & w^{2*3} & w^{2*4} & -w^{2*5} \\ w^{3*0} & -w^{3*1} & w^{3*2} & w^{3*3} & w^{3*4} & -w^{3*5} \\ w^{4*0} & -w^{4*1} & w^{4*2} & w^{4*3} & w^{4*4} & -w^{4*5} \\ w^{5*0} & -w^{5*1} & w^{5*2} & w^{5*3} & w^{5*4} & -w^{5*5} \end{bmatrix},$$

where $w = \exp(-j2\pi/6)$; and $$P_{8\times 8} = \begin{bmatrix} P_{4\times 4} & P_{4\times 4} \\ P_{4\times 4} & -P_{4\times 4} \end{bmatrix}$$

It can be learned from the foregoing analysis that, the pilot subcarrier is multiplied by a value different from that of the data subcarrier. Therefore, if an HE-LTF sequence designed for a pilot location and resource block division in 11ax is directly applied to 11be, PAPR values of some Rus in 11be increase. Because a pilot location and resource block division in 11be change, when an HE-LTF sequence in 11ax is applied to 11be, sequences corresponding to pilot subcarriers of the sequence need to be aligned as much as possible.

It may be further understood that, by analyzing resource unit division and pilot locations (as shown in Table 1 and FIG. 5) in the 80 MHz bandwidth in 802.11be, the following conclusion may be obtained: In 36 RU26 included in the 80 MHz bandwidth, pilot subcarriers of each of some RU26 are sixth and $20^{th}$ subcarriers in 26 subcarriers, and pilot subcarriers of each of other RU26 are seventh and $21^{st}$ subcarriers in 26 subcarriers. For example, it is assumed that numbers of subcarriers are arranged in ascending order. Pilot locations (namely, a subcarrier numbered −494 and a subcarrier numbered −480) of the first RU26 in Table 1 are a sixth subcarrier and a 20th subcarrier in a subcarrier numbered −499 to a subcarrier numbered −474 (26 subcarriers in total). For another example, pilot locations (namely, a subcarrier numbered −386 and a subcarrier numbered −372) of the fifth RU26 in Table 1 are a seventh subcarrier and a $21^{st}$ subcarrier in a subcarrier numbered −392 to a subcarrier numbered −367 (26 subcarriers in total).

Figure 8:
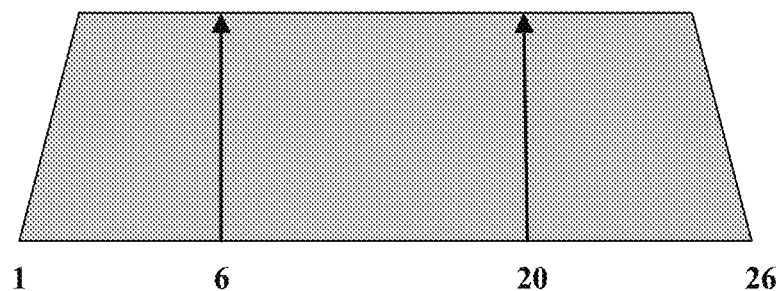
FIG. 8 is a schematic diagram of two different types of RU26 according to an embodiment of the present disclosure.
Figure 8:
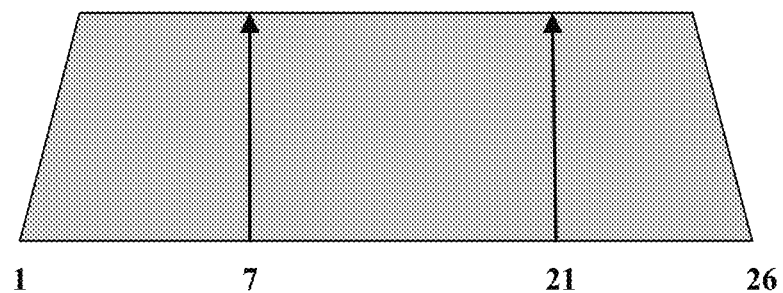

Therefore, according to the foregoing conclusion, the 36 RU26 may be classified into two types of RU26, where one type is denoted as a type A, and the other type is denoted as a type B. An RU26 of the type A (denoted as a type A RU26) is an RU26 in which pilot subcarriers are located on a sixth subcarrier and a $20^{th}$ subcarrier in 26 subcarriers. Correspondingly, an RU26 of the type B (denoted as a type B RU26) is an RU26 in which pilot subcarriers are located on a seventh subcarrier and a 21st subcarrier in 26 subcarriers. FIG. 8 is a schematic diagram of two different types of RU26 according to an embodiment of the present disclosure. As shown in FIG. 8, a pilot subcarrier location of a type A RU26 is on a sixth subcarrier and a 20th subcarrier in 26 subcarriers, and a pilot subcarrier location of a type B RU26 is on a seventh subcarrier and a 21st subcarrier in 26 subcarriers. It may be understood that, for a same RU26, if numbers of 26 subcarriers are arranged in ascending order, and pilot subcarrier locations of the RU26 are a sixth subcarrier and a 20th subcarrier in the 26 subcarriers. If numbers of 26 subcarriers are arranged in descending order, pilot subcarrier locations of the RU26 are changed to a seventh subcarrier and a 21 st subcarrier in the 26 subcarriers. Similarly, for a same RU26, if numbers of 26 subcarriers are arranged in ascending order, and pilot subcarrier locations of the RU26 are a seventh subcarrier and a 21st subcarrier in the 26 subcarriers. If numbers of 26 subcarriers are arranged in descending order, pilot subcarrier locations of the RU26 are changed to a sixth subcarrier and a 20th subcarrier in the 26 subcarriers. Therefore, if either of the type A and the type B is inverted, the other type may be obtained. For example, the type B may be obtained by inverting the type A.

Figure 9A:
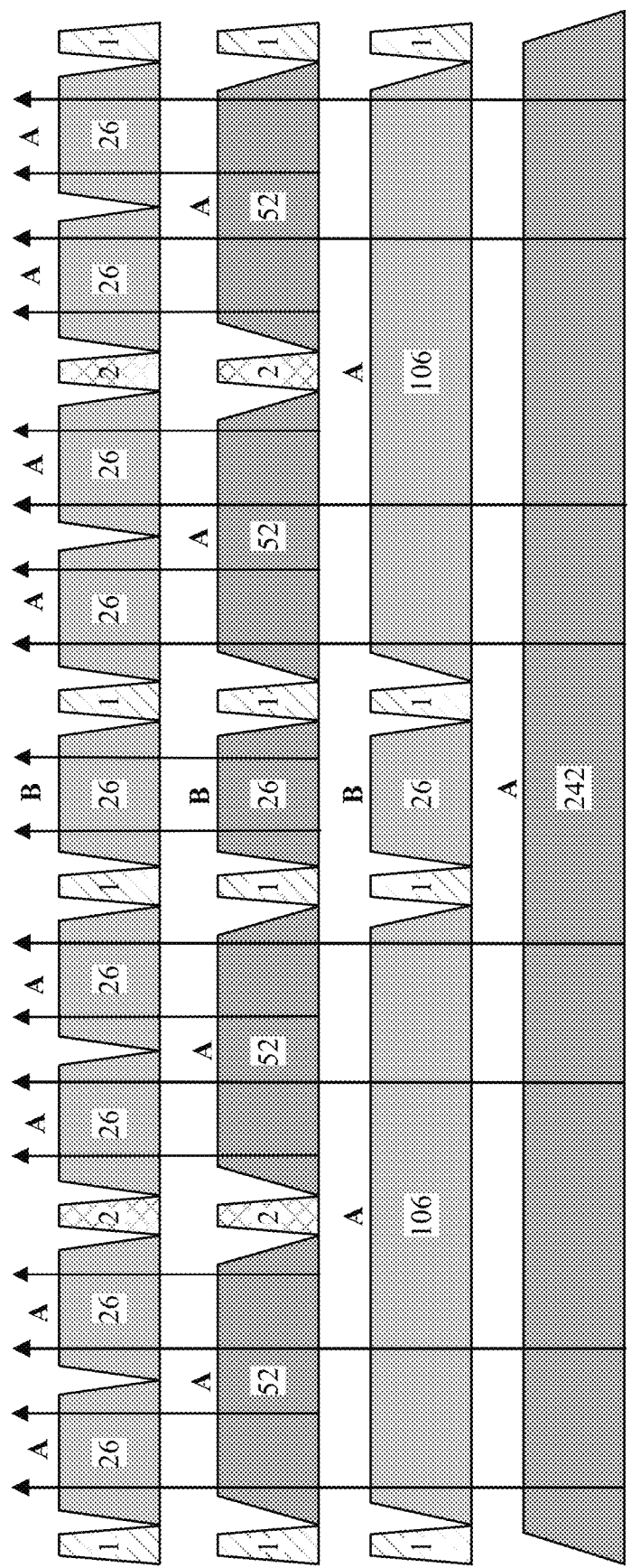
FIG. 9a is a schematic diagram of an RU division structure and pilot subcarrier distribution of a 20 MHz bandwidth according to an embodiment of the present disclosure.
Figure 9B:
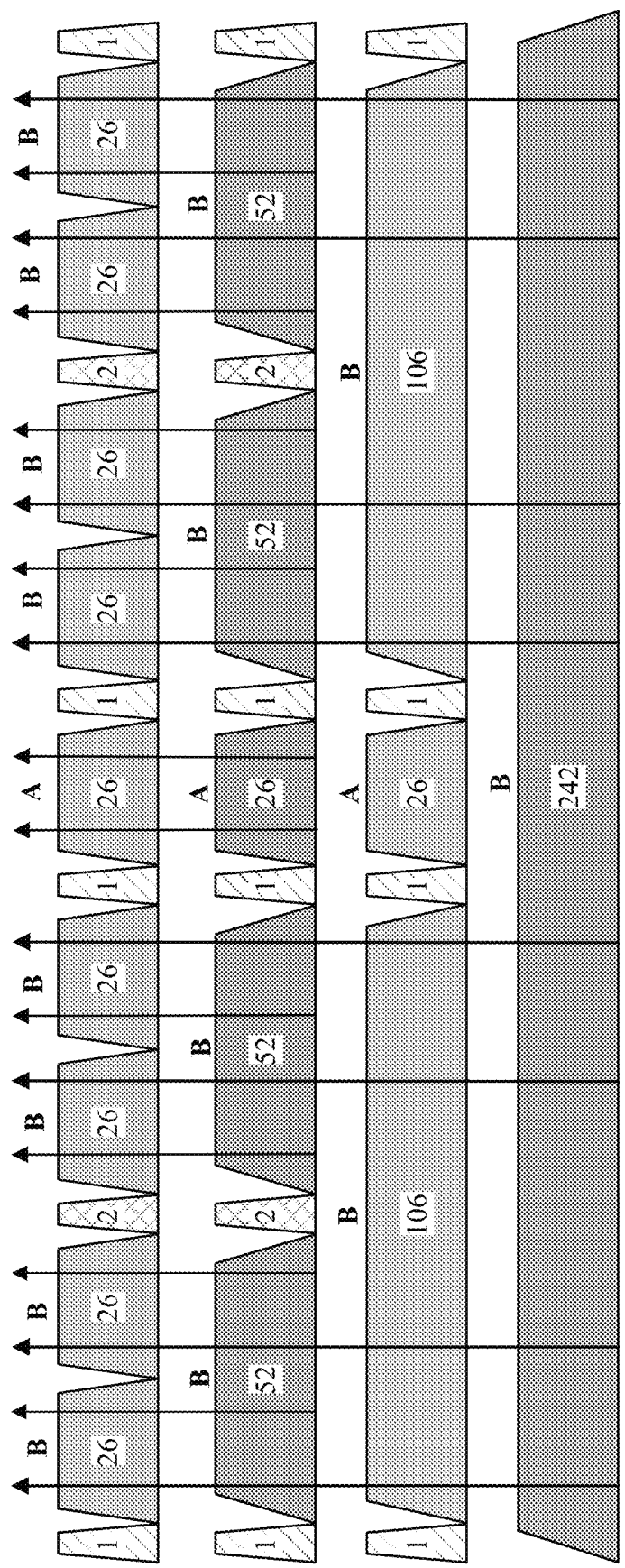
FIG. 9b is a schematic diagram of another RU division structure and pilot subcarrier distribution of a 20 MHz bandwidth according to an embodiment of the present disclosure.

Because an RU26 included in the 80 MHz bandwidth may be classified into two types, correspondingly, an RU52 including two RU26 may also be classified into two types: an RU52 including two type A RU26 (the RU52 is referred to as a type A RU52 below) and an RU52 including two type B RU26 (the RU52 is referred to as a type B RU52 below). Similarly, there are also two types of RU106 including two types of RU52. One type is an RU106 including two type A RU52, and this type of RU106 is referred to as a type A RU106 below. The other type is an RU106 including two type B RU52, and this type of RU106 is referred to as a type B RU106 below. It can be learned from the tone plan of the 80 MHz bandwidth in 11be in FIG. 5 that one RU242 includes nine RU26, and a structure of the RU242 including the nine RU26 is more complex, but may also be classified into two types. One type of RU242 is an RU242 including eight type A RU26 and one type B RU26, and is denoted as a type A RU242. The other type of RU242 is an RU242 including eight type B RU26 and one type A RU26, and is denoted as a type A RU242. FIG. 9a is a schematic diagram of an RU division structure and pilot subcarrier distribution of an RU of a 20 MHz bandwidth according to an embodiment of the present disclosure. As shown in FIG. 9a, 20 MHz includes eight type A RU26 and one type B RU26. An RU242 corresponding to the 20 MHz bandwidth shown in FIG. 9a is a type A RU242. FIG. 9b is a schematic diagram of another division structure and pilot subcarrier distribution of an RU of a 20 MHz bandwidth according to an embodiment of the present disclosure. As shown in FIG. 9b, 20 MHz includes eight type B RU26 and one type A RU26. An RU242 corresponding to the 20 MHz bandwidth shown in FIG. 9b is a type B RU242.

For resource block division and pilot subcarrier locations in the 80 MHz bandwidth in 11ax, four RU242 in the 80 MHz bandwidth may be classified into two types based on different pilot locations. A first RU242, a second RU242, and smaller resource blocks covered by the first RU242 and the second RU242 are all of the type A according to pilot subcarrier locations of them. A third RU242, a fourth RU242, and smaller resource blocks covered by the third RU242 and the fourth RU242 are all of the type B according to pilot subcarrier locations of them. In other words, the first RU242 to the fourth RU242 (the first to the fourth from left to right) included in the 80 MHz bandwidth in 11ax are: a type A RU242, a type A RU242, a type B RU242, and a type B RU242. Likewise, a first RU106 to an eighth RU106 (the first to the eighth from left to right) included in the 80 MHz bandwidth in 11ax are: a type A RU106, a type A RU106, a type A RU106, a type A RU106, a type B RU106, a type B RU106, a type B RU106, and a type B RU106. It should be understood that distribution of RU52 types included in the 80 MHz bandwidth in 11ax and distribution of RU26 types are similar to distribution of RU106 types/of RU242 types.

For resource block division and pilot subcarrier locations in the 80 MHz bandwidth in 11be, a first RU242, a third RU242, and smaller resource blocks covered by the first RU242 and the third RU242 in four RU242 in the 80 MHz bandwidth are all of the type A according to pilot subcarrier locations of them. A second RU242, a fourth RU242, and smaller resource blocks covered by the second RU242 and the fourth RU242 are all of the type B according to pilot subcarrier locations of them. In other words, the first RU242 to the fourth RU242 (the first to the fourth from left to right) included in the 80 MHz bandwidth in 11be are: a type A RU242, a type B RU242, a type A RU242, and a type B RU242. Likewise, a first RU106 to an eighth RU106 (the first to the eighth from left to right) included in the 80 MHz bandwidth in 11be are: a type A RU106, a type A RU106, a type B RU106, a type B RU106, a type A RU106, a type A RU106, a type B RU106, and a type B RU106. It should be understood that distribution of RU52 types included in the 80 MHz bandwidth in 11be and distribution of RU26 types are similar to distribution of RU106 types/of RU242 types.

It can be learned from the foregoing analysis that, to avoid that PAPR values of some resource blocks are excessively high because sequences corresponding to pilot subcarriers are not aligned, in this embodiment, a location of an 80 MHz HE-LTF sequence in 11ax may be adjusted, and an adjusted sequence may be applicable to resource block division and a pilot subcarrier location of the 80 MHz bandwidth in 11be. For example, in this embodiment, an HE-LTF sequence corresponding to a second RU242 in 11ax is moved to a subcarrier location corresponding to a third RU242 in 11be, and an HE-LTF sequence corresponding to a third RU242 in 11ax is moved to a subcarrier location corresponding to a second RU242 in 11be. For another example, in this embodiment, HE-LTF sequences corresponding to the second RU242 and the third RU242 in 80 MHz in 11ax may be inverted, and an inverted sequence is used as an EHT-LTF sequence corresponding to the second RU242 and the third RU242 in 11be 80 MHz.

In this embodiment, the HE-LTF sequence in the 80 MHz bandwidth in 11ax is modified, and a modified sequence is used as the EHT-LTF sequence in the 80 MHz bandwidth.

Optionally, an EHT-LTF sequence in another bandwidth (160 MHz and 320 MHz) is constructed based on the EHT-LTF sequence of 80 MHz.

According to the EHT-LTF sequence provided in this embodiment, a PAPR value on a resource unit is low.

The following describes a plurality of possible EHT-LTF sequences provided in the present disclosure. For ease of description, a 2xEHT-LTF sequence in the 80 MHz bandwidth is referred to as a 2xEHT-LTF80 MHz sequence for short below, and a 4xEHT-LTF sequence in the 80 MHz bandwidth is referred to as a 4xEHT-LTF80 MHz sequence for short below. Similarly, EHT-LTF sequences in 160 MHz and 320 MHz bandwidths may be separately referred to as a 2xEHT-LTF160 MHz sequence, a 4xEHT-LTF160 MHz sequence, a 2xEHT-LTF320 MHz sequence and a 4xEHT-LTF320 MHz sequence.

Embodiment 2

An embodiment 2 of the present disclosure describes a first EHT-LTF sequence in an 80 MHz bandwidth, and describes EHT-LTF sequences that are in a 160 MHz bandwidth and a 320 MHz bandwidth and that are constructed based on the 80 MHz EHT-LTF sequence.

It may be understood that, in resource block division according to the 11ax standard, subcarriers corresponding to a first RU242 are numbered from −500 to −259, subcarriers corresponding to a second RU242 are numbered from −258 to −17, subcarriers corresponding to a third RU242 are numbered from 17 to 258, and subcarriers corresponding to a fourth RU242 are numbered from 259 to 500. In resource block division according to the 11be standard, for subcarrier numbers corresponding to each RU242, refer to the foregoing Table 4. Details are not described herein again.

Specifically, 1001 subcarriers numbered in a range from −500 to 500 in an HE-LTF sequence in the 80 MHz bandwidth may be divided into the following five parts:

HE-LTF80 MHZ [HE-LTF80 MHz_part1, HE-LTF80 MHz_part2, HE-LTF80 MHz_part3, HE-LTF80 MHz_part4, HE-LTF80 MHz_part5].

HE-LTF80 MHz_part1=HE-LTF80 MHz (−500:−259) indicates that a total of 242 subcarriers whose subcarrier numbers range from −500 to −259 are included. HE-LTF80 MHz_part2=HE-LTF80 MHz (−258:−17) indicates that a total of 242 subcarriers whose subcarrier numbers range from −258 to −17 are included. HE-LTF80 MHz_part3=HE-LTF80 MHz (−16:16) indicates that a total of 33 subcarriers whose subcarrier numbers range from −16 to 16 are included. HE-LTF80 MHz_part4=HE-LTF80 MHz (17:258) indicates that a total of 242 subcarriers whose subcarrier numbers range from 17 to 258 are included. HE-LTF80 MHz_part5=HE-LTF80 MHz (259:500) indicates that a total of 242 subcarriers whose subcarrier numbers range from 259 to 500 are included. It may be understood that, because the foregoing division manner is the same for a 2xLTF mode and a 4xLTF mode, whether a 2xHE-LTF or a 4xHE-LTF is divided into segments is not indicated.

Based on the foregoing block division manner of the HE-LTF sequence in the 80 MHz bandwidth, a possible 2xEHT-LTF80 MHz sequence is as follows:

2xEHT-LTF80 MHZ=[2xHE-LTF80 MHz_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHz_part5].

The 2xEHT-LTF80 MHz sequence indicates a 2xLTF sequence in a range from subcarrier numbers −500 to 500 in the 80 MHZ bandwidth in 11be. 2xHE-LTF80 MHZ_part2_Reverse indicates a sequence obtained by inverting a sequence of a part 2xHE-LTF80 MHz_part2, that is, the 2xHE-LTF80 MHz_part2 sequence is arranged in a reverse order. Similarly, 2xHE-LTF80 MHz_part4_Reverse indicates a sequence obtained by inverting a sequence of a part 2xHE-LTF80 MHz_part4, that is, the 2xHE-LTF80 MHz_part4 sequence is arranged in a reverse order. For specific values of 2xHE-LTF80 MHz_part1, 2xHE-LTF80 MHz_part2, 2xHE-LTF80 MHz_part4, and 2xHE-LTF80 MHz_part5, refer to the 802.11ax standard, and details are not described herein. Based on the foregoing 2xEHT-LTF80 MHZ sequence, possible 2xNew_partA, 2xNew_partB, and 2xNew_partC are as follows:

2xNew_partA=[1, 0, −1, 0, 1];
2xNew_partB=[0, 1, 0, −1, 0, 1, 0, 1, 0, 0, 0, 0, 0, 0, 0, −1, 0, 1, 0, −1, 0, 1, 0]; and
2xNew_partC=[−1, 0, 1, 0, 1].

It may be understood that, in the 802.11ax standard, 2xHE-LTF80 MHz_part1 corresponds to a first RU242, 2xHE-LTF80 MHz_part2 corresponds to a second RU242, 2xHE-LTF80 MHz_part4 corresponds to a third RU242, and 2xHE-LTF80 MHz_part5 corresponds to a fourth RU242. In addition, in the 802.11ax standard, the first RU242 and the second RU242 are type A RU242, and the third RU242 and the fourth RU242 are type B RU242. Therefore, in the 2xHE-LTF sequence in the 80 MHZ bandwidth, 2xHE-LTF80 MHz_part1 and 2xHE-LTF80 MHz_part2 may be considered as sequence blocks belonging to a type A, and 2xHE-LTF80 MHz_part4 and 2xHE-LTF80 MHz_part5 may be considered as sequence blocks belonging to a type B. It may be further understood that, according to resource block division in the 802.11be standard, first and third resource blocks (that is, the first RU242 and the third RU242) including 242 subcarriers are type A RU242, and the second and fourth resource blocks (that is, the second RU242 and the fourth RU242) including 242 subcarriers are type B RU242.

Therefore, when 2xHE-LTF80 MHz_part1 and 2xHE-LTF80 MHz_part2 are located at the subcarrier locations corresponding to the second or the fourth RU242 in the 2xEHT-LTF80 MHz sequence, 2xHE-LTF80 MHz_part1 and 2xHE-LTF80 MHz_part2 sequences need to be inverted before being used. Similarly, when 2xHE-LTF80 MHz_part4 and 2xHE-LTF80 MHz_part5 are located at the subcarrier locations corresponding to the first or the third RU242 in the 2xEHT-LTF80 MHZ sequence, 2xHE-LTF80 MHz_part4 and 2xHE-LTF80 MHz_part5 sequences need to be inverted before being used.

In an example, compared with a case in which an original 2xHE-LTF80 MHz sequence is directly used as a 2xLTF sequence of 80 MHz in 11be, PAPR values of resource blocks corresponding to the 2xEHT-LTF80 MHz sequence are shown in the following Table 8. In Table 8, a second row indicates PAPR values of the original 2xHE-LTF80 MHz sequence directly used as the 2xLTF sequence of 80 MHz on different resource blocks in the 11be, and a third row indicates PAPR values of the foregoing 2xEHT-LTF80 MHz sequence on different resource blocks. Therefore, it can be learned from Table 8 that, in comparison with directly using the original 2xHE-LTF80 MHz sequence as the 2xLTF sequence of 80 MHz in 11be, the 2xEHT-LTF80 MHz sequence provided in this embodiment has lower PAPR values on a plurality of single Rus, a plurality of combined Rus, and an entire bandwidth.

TABLE 8

| PAPR value of each resource block corresponding to 2xEHT-LTF80 MHz | | | | | | | | | |
|---|---|---|---|---|---|---|---|---|---|
| Max PAPR (dB) | RU26 | RU52 | RU106 | RU242 | RU484 | RU996 | RU52 + RU26 | RU106 + RU26 | RU484 + RU242 |
| Original 2x LTF | 7.95 | 7.43 | 6.71 | 8.23 | 7.33 | 6.48 | 6.37 | 6.64 | 9.65 |
| 2x LTF after modification | 4.46 | 4.69 | 5.41 | 5.58 | 6.58 | 6.16 | 5.94 | 6.25 | 8.59 |

Optionally, lengths of 2xNew_partA, 2xNew_partB, and 2xNew_partC sequences and subcarrier locations corresponding to the sequences are fixed. A length of the 2xNew_partA sequence is 5, and the 2xNew_partA sequence corresponds to five direct current subcarriers between the first RU242 and the second RU242 in 11be. A length of the 2xNew_partB sequence is 23, and the 2xNew_partB sequence corresponds to 23 subcarriers between the second RU242 and the third RU242 in 11be. A length of the 2xNew_partC sequence is 5, and the 2xNew_partC sequence corresponds to five direct current subcarriers between the third RU242 and the fourth RU242 in 11be. Specific values of the 2xNew_partA, the 2xNew_partB, and the 2xNew_partC sequences are subject to locations of other four sequence blocks (that is, 2xHE-LTF80 MHz_part1, 2xHE-LTF80 MHz_part2, 2xHE-LTF80 MHz_part4, and 2xHE-LTF80 MHz_part5) including 242 subcarriers in the 2xEHT-LTF80 MHz sequence and whether the sequence blocks are negated (negation herein refers to whether the sequence blocks are multiplied by −1). A principle for selecting sequence values of parts 2xNew_partA, 2xNew_partB, and 2xNew_partC is that a PAPR value of an RU996 is the lowest (that is, a PAPR value of a sum of signals in the 80 M bandwidth is the lowest). Optionally, several segments may be directly selected from the original 2xHE-LTF sequence as 2xNew_partA, 2xNew_partB, and 2xNew_partC sequences.

Optionally, one or more of the following five operations may be performed on the four sequence blocks 2xHE-LTF80 MHz_part1, 2xHE-LTF80 MHz_part2, 2xHE-LTF80 MHz_part4, and 2xHE-LTF80 MHz_part5 in the foregoing 2xEHT-LTF80 MHz sequence, and each of the five operations may be performed for one or more times. The five operations of the four sequence blocks have small impact on performance (for example, a PAPR value) of the entire 2xEHT-LTF80 MHz sequence, and the impact may be ignored. The five operations mainly affect values of the 2xNew_partA, 2xNew_partB, and 2xNew_partC sequences. The five operations are as follows.

(1) Cyclic shift For example, after one cyclic shift, 2xHE-LTF80 MHz_part1, 2xHE-LTF80 MHz_part2, 2xHE-LTF80 MHz_part4, and 2xHE-LTF80 MHz_part5 become 2xHE-LTF80 MHz_part5, 2xHE-LTF80 MHz_part1, 2xHE-LTF80 MHz_part2, and 2xHE-LTF80 MHz_part4. Therefore, a possible 2xEHT-LTF80 MHz sequence is:
  2xEHT-LTF80 MHZ=[2xHE-LTF80 MHz_part5_Reverse, 2xNew_partA, 2xHE-LTF80 MHz_part1_Reverse, 2xNew_partB, 2xHE-LTF80 MHz_part2, 2xNew_partC, 2xHE-LTF80 MHz_part4].

(2) Inverting For example, 2xHE-LTF80 MHz_part1, 2xHE-LTF80 MHz_part2, 2xHE-LTF80 MHz_part4, and 2xHE-LTF80 MHz_part5 is changed to 2xHE-LTF80 MHz_part5, 2xHE-LTF80 MHz_part4, 2xHE-LTF80 MHz_ part2, and 2xHE-LTF80 MHz_part1 after being inverted for one time. Therefore, a possible 2xEHT-LTF80 MHz sequence is:
  2xEHT-LTF80 MHZ=[2xHE-LTF80 MHz_part5_Reverse, 2xNew_partA, 2xHE-LTF80 MHz_part4, 2xNew_partB, 2xHE-LTF80 MHz_part2, 2xNew_partC, 2xHE-LTF80 MHz_part1_Reverse].

(3) Negation on the entire sequence (that is, the entire sequence is multiplied by −1). For example, 2xHE-LTF80 MHz_part1, 2xHE-LTF80 MHz_part2, 2xHE-LTF80 MHz_part4, and 2xHE-LTF80 MHz_part5 is changed to (−1)*2xHE-LTF80 MHz_part1, (−1)*2xHE-LTF80 MHz_part2, (−1)*2xHE-LTF80 MHz_part4, (−1)*2xHE-LTF80 MHz_part5 after all of them are negated. Therefore, a possible 2xEHT-LTF80 MHz sequence is:
  2xEHT-LTF80 MHz=[(−1)*2xHE-LTF80 MHz_part1, 2xNew_partA, (−1)*2xHE-LTF80 MHz_part2_Reverse, 2xNew_partB, (−1)*2xHE-LTF80 MHz_part4_Reverse, 2xNew_partC, (−1)*2xHE-LTF80 MHz_part5].

(4) Exchange locations of two sequence blocks that are located in the middle and that include 242 subcarriers. For example, after exchanging, 2xHE-LTF80 MHz_part1, 2xHE-LTF80 MHz_part2, 2xHE-LTF80 MHz_part4, and 2xHE-LTF80 MHz_part5 becomes 2xHE-LTF80 MHz_part1, 2xHE-LTF80 MHz_part4, 2xHE-LTF80 MHz_part2 and 2xHE-LTF80 MHz_part5. Therefore, a possible 2xEHT-LTF80 MHz sequence is:
  2xEHT-LTF80 MHZ=[2xHE-LTF80 MHz_part1, 2xNew_partA, 2xHE-LTF80 MHz_part4, 2xNew_partB, 2xHE-LTF80 MHz_part2, 2xNew_partC, 2xHE-LTF80 MHz_part5].

(5) All sequence values of the last two sequence blocks including 242 subcarriers are negated. For example, 2xHE-LTF80 MHz_part1, 2xHE-LTF80 MHz_part2, 2xHE-LTF80 MHz_part4, and 2xHE-LTF80 MHz_part5 becomes 2xHE-LTF80 MHz_part1, 2xHE-LTF80 MHz_part2, (−1)*2xHE-LTF80 MHz_part4, (−1)*2xHE-LTF80 MHz_part5 after all sequence values of the last two sequence blocks including 242 subcarriers are negated. Therefore, a possible 2xEHT-LTF80 MHz sequence is:
  2xEHT-LTF80 MHZ [2xHE-LTF80 MHz_part1, 2xNew_partA, 2xHE-LTF80 MHz_part2_Reverse, 2xNew_partB, (−1)*2xHE-LTF80 MHz_part4_Reverse, 2xNew_partC, (−1)*2xHE-LTF80 MHz_part5].

Optionally, a negation (multiplying by −1) operation, an inversion operation, and a negation operation on an even-numbered location/an odd-numbered location of the entire 2xEHT-LTF80 MHz sequence have small impact on performance (for example, a PAPR value) of the entire 2xEHT-LTF80 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF80 MHZ sequence mentioned in embodiments of the present disclosure. The negation operation on an even-number location may mean negation of even-numbered elements in a sequence, for example, a second element, a fourth element, a sixth element, an eighth element, and the like in the sequence is multiplied by −1; or may refer to negation of a value on a subcarrier at an even-numbered location in subcarriers corresponding to the sequence. Similarly, the negation operation on an odd-number location may mean negation of odd-numbered elements in a sequence, for example, a first element, a third element, a fifth element, a seventh element, and the like in the sequence is multiplied by −1; or may refer to negation of a value on a subcarrier at an odd-numbered location in subcarriers corresponding to the sequence.

Based on the foregoing block division manner of the HE-LTF sequence in the 80 MHz bandwidth, a possible 4xEHT-LTF80 MHz sequence is as follows:
  4xEHT-LTF80 MHZ [4xHE-LTF80 MHz_part1, 4xNew_partA, 4xHE-LTF80 MHz_part2_Reverse, 4xNew_partB, 4xHE-LTF80 MHz_part4_Reverse, 4xNew_partC, (−1)*4xHE-LTF80 MHz_part5].

The 4xEHT-LTF80 MHz sequence indicates a 4xLTF sequence in a range from subcarrier numbers −500 to 500 in the 80 MHZ bandwidth in 11be. 4xHE-LTF80 MHz_part2_Reverse indicates a sequence obtained by inverting a sequence of a part 4xHE-LTF80 MHz_part2, that is, the 4xHE-LTF80 MHz_part2 sequence is arranged in a reverse order. Similarly, 4xHE-LTF80 MHz_part4_Reverse indicates a sequence obtained by inverting a sequence of a part 4xHE-LTF80 MHz_part4, that is, the 4xHE-LTF80 MHz_part4 sequence is arranged in a reverse order. For specific values of 4xHE-LTF80 MHz_part1, 4xHE-LTF80 MHz_part2, 4xHE-LTF80 MHz_part4, and 4xHE-LTF80 MHz_part5, refer to the 802.11ax standard, and details are not described herein. Based on the foregoing 4xEHT-LTF80 MHZ sequence, possible 4xNew_partA, 4xNew_partB, and 4xNew_partC are as follows:

4xNew_partA=[−1, −1, −1, −1, 1];
4xNew_partB=[1, −1, −1, −1, 1, 1, −1, 1, −1, 0, 0, 0, 0, 0, 1, 1, 1, 1, 1, 1, −1, 1, 1]; and
4xNew_partC=[−1, 1, −1, 1, −1].

It may be understood that, similar to the foregoing 2xEHT-LTF80 MHz sequence, when 4xHE-LTF80 MHz_part1 and 4xHE-LTF80 MHz_part2 are located at the subcarrier locations corresponding to the second or the fourth RU242 in the 4xEHT-LTF80 MHz sequence, 4xHE-LTF80 MHz_part1 and 4xHE-LTF80 MHz_part2 sequences need to be inverted before being used. Similarly, when 4xHE-LTF80 MHz_part4 and 4xHE-LTF80 MHz_part5 are located at the subcarrier locations corresponding to the first or the third RU242 in the 4xEHT-LTF80 MHZ sequence, 4xHE-LTF80 MHz_part4 and 4xHE-LTF80 MHz_part5 sequences need to be inverted before being used.

In an example, compared with a case in which an original 4xHE-LTF80 MHz sequence is directly used as a 4xLTF sequence of 80 MHz in 11be, PAPR values of resource blocks corresponding to the 4xEHT-LTF80 MHz sequence are shown in the following Table 9. In Table 9, a second row indicates PAPR values of the original 4xHE-LTF80 MHz sequence directly used as the 4xLTF sequence of 80 MHz on different resource blocks in the 11be, and a third row indicates PAPR values of the foregoing 4xEHT-LTF80 MHz sequence on different resource blocks. Therefore, it can be learned from Table 9 that, in comparison with directly using the original 4xHE-LTF80 MHz sequence as a 4xLTF sequence of 80 MHz in 11be, the 4xEHT-LTF80 MHz sequence provided in this embodiment has a lower PAPR value on a plurality of single Rus and a plurality of combined Rus.

4xNew_partC sequence is 5, and the 4xNew_partC sequence corresponds to five direct current subcarriers between the third RU242 and the fourth RU242 in 11be. Specific values of the 4xNew_partA, the 4xNew_partB, and the 4xNew_partC sequences are subject to locations of other four sequence blocks (that is, 4xHE-LTF80 MHz_part1, 4xHE-LTF80 MHz_part2, 4xHE-LTF80 MHz_part4, and 4xHE-LTF80 MHz_part5) including 242 subcarriers in the 4xEHT-LTF80 MHz sequence and whether the sequence blocks are negated (negation herein means that the sequence blocks are multiplied by −1). A principle for selecting sequence values of parts 4xNew_partA, 4xNew_partB, and 4xNew_partC is that a PAPR value of an RU996 is the lowest (that is, a PAPR value of a sum of signals in the 80 M bandwidth is the lowest). Optionally, several segments may be directly selected from the original 4xHE-LTF sequence as 4xNew_partA, 4xNew_partB, and 4xNew_partC sequences.

Optionally, one or more of the following three operations may be performed on the four sequence blocks 4xHE-LTF80 MHz_part1, 4xHE-LTF80 MHz_part2, 4xHE-LTF80 MHz_part4, and 4xHE-LTF80 MHz_part5 in the foregoing 4xEHT-LTF80 MHz sequence, and each of the three operations may be performed for one or more times. The three operations of the four sequence blocks have small impact on performance (for example, a PAPR value) of the entire 4xEHT-LTF80 MHz sequence, and the impact may be ignored. The three operations mainly affect values of the 4xNew_partA, 4xNew_partB, and 4xNew_partC sequences. The three operations are as follows:

(1) Cyclic shift For example, after one cyclic shift, 4xHE-LTF80 MHz_part1, 4xHE-LTF80 MHz_part2, 4xHE-LTF80 MHz_part4, and 4xHE-LTF80 MHz_part5 become 4xHE-LTF80 MHz_part5, 4xHE-LTF80 MHz_part1, 4xHE-LTF80 MHz_part2, and 4xHE-LTF80 MHz_part4. Therefore, a possible 4xEHT-LTF80 MHz sequence is:

4xEHT-LTF80 MHz=[4xHE-LTF80 MHz_part5_Reverse, 4xNew_partA, 4xHE-LTF80 MHz_part1_Reverse, 4xNew_partB, 4xHE-LTF80 MHz_part2, 4xNew_partC, 4xHE-LTF80 MHz_part4].

(2) Inverting For example, 4xHE-LTF80 MHz_part1, 4xHE-LTF80 MHz_part2, 4xHE-LTF80 MHz_part4, and 4xHE-LTF80 MHz_part5 is changed to 4xHE-LTF80 MHz_part5, 4xHE-LTF80 MHz_part4, 4xHE-LTF80 MHz_part2, and 4xHE-LTF80 MHz_part1 after being inverted for one time. Therefore, a possible 4xEHT-LTF80 MHz sequence is:

TABLE 9

| | PAPR value of each resource block corresponding to 4xEHT-LTF80 MHz | | | | | | | | |
|---|---|---|---|---|---|---|---|---|---|
| Max PAPR (dB) | RU26 | RU52 | RU106 | RU242 | RU484 | RU996 | RU52 + RU26 | RU106 + RU26 | RU484 + RU242 |
| Original 4x LTF | 7.29 | 8.48 | 6.69 | 7.07 | 7.36 | 6.74 | 6.90 | 7.42 | 8.46 |
| 4x LTF after modification | 3.78 | 4.97 | 5.53 | 5.60 | 8.03 | 7.26 | 6.46 | 6.41 | 8.29 |

Optionally, lengths of 4xNew_partA, 4xNew_partB, and 4xNew_partC sequences and subcarrier locations corresponding to the sequences are fixed. A length of the 4xNew_partA sequence is 5, and the 4xNew_partA sequence corresponds to five direct current subcarriers between the first RU242 and the second RU242 in 11be. A length of the 4xNew_partB sequence is 23, and the 4xNew_partB sequence corresponds to 23 subcarriers between the second RU242 and the third RU242 in 11be. A length of the 4xEHT-LTF80 MHZ=[4xHE-LTF80 MHz_part5_Reverse, 4xNew_partA, 4xHE-LTF80 MHz_part4, 4xNew_partB, 4xHE-LTF80 MHz_part2, 4xNew_partC, 4xHE-LTF80 MHz_part1_Reverse].

(3) Negation on the entire sequence (that is, the entire sequence is multiplied by −1). For example, 4xHE-LTF80 MHz_part1, 4xHE-LTF80 MHz_part2, 4xHE-LTF80 MHz_part4, and 4xHE-LTF80 MHz_part5 is changed to (−1)*4xHE-LTF80 MHz_part1, (−1)*4xHE-LTF80 MHz_part2, (−1)*4xHE-LTF80 MHz_part4, (−1)*4xHE-LTF80 MHz_part5 after all of them are negated. Therefore, a possible 4xEHT-LTF80 MHz sequence is:

4xEHT-LTF80 MHz=[(−1)*4xHE-LTF80 MHz_part1, 4xNew_partA, (−1)*4xHE-LTF80 MHz_part2_Reverse, 4xNew_partB, (−1)*4xHE-LTF80 MHz_part4_Reverse, 4xNew_partC, (−1)*4xHE-LTF80 MHz_part5].

Optionally, a negation (multiplying by −1) operation, an inversion operation, and a negation operation on an even-numbered location/an odd-numbered location of the entire 4xEHT-LTF80 MHz sequence have small impact on performance (for example, a PAPR value) of the entire 4xEHT-LTF80 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 4xEHT-LTF80 MHZ sequence mentioned in embodiments of the present disclosure.

Based on the foregoing 2xEHT-LTF80 MHz sequence and the foregoing 4xEHT-LTF80 MHz sequence, a 2xEHT-LTF sequence and a 4xEHT-LTF sequence in a 160 MHz bandwidth and a 320 MHz bandwidth may be constructed. In the 160 MHz bandwidth and the 320 MHz bandwidth, the EHT-LTF sequence in 11be may be obtained by combining an improved 80 MHz bandwidth sequence multiplied by a different coefficient (for example, 1 or −1) or by combining each segment multiplied by a different coefficient (for example, 1 or −1) after segmentation. In other words, a 2xEHT-LTF80 MHz sequence may be multiplied by a different coefficient (for example, 1 or −1), or the 2xEHT-LTF80 MHz sequence is segmented and then each segment is multiplied by different coefficients (for example, 1 or −1), and then the segments are combined together to obtain the 2xEHT-LTF sequence in the 160 MHz bandwidth and the 320 MHz bandwidth. Similarly, a 4xEHT-LTF80 MHz sequence may be multiplied by a different coefficient (for example, 1 or −1), or the 4xEHT-LTF80 MHz sequence is segmented and then each segment is multiplied by different coefficients (for example, 1 or −1), and then the segments are combined together to obtain the 4xEHT-LTF sequence in the 160 MHz bandwidth and the 320 MHz bandwidth.

Optionally, 1001 subcarriers in a range of numbers from −500 to 500 of the EHT-LTF sequence in the 80 MHz bandwidth may be divided into the following two parts/two segments:

EHT-LTF80 MHz=[EHT-LTF80 MHz_part1, EHT-LTF80 MHz_part2].

EHT-LTF80 MHz_part1=EHT-LTF80 MHz (−500:−1) indicates that a total of 500 subcarriers whose subcarrier numbers range from −500 to −1 are included. EHT-LTF80 MHz_part2=EHT-LTF80 MHz (0:500) indicates that a total of 501 subcarriers whose subcarrier numbers range from 0 to 500 are included. It may be understood that, because the foregoing division manner is the same for a 2xLTF mode and a 4xLTF mode, whether a 2xEHT-LTF or a 4xEHT-LTF is divided into segments is not indicated.

After segmentation, each segment may be multiplied by a different coefficient, and then combined into an EHT-LTF sequence with a larger bandwidth. According to the foregoing two-segment division manner of the EHT-LTF80 MHz sequence, an EHT-LTF sequence in the 320 MHz bandwidth may be constructed. A possible 2xEHT-LTF320 MHz sequence is as follows:

2xEHT-LTF320 MHz=[2xEHT-LTF80 MHz_part1, 2xEHT-LTF80 MHz_part2, $0_{23}$, (−1)*2xEHT-LTF80 MHz_part1, 2xEHT-LTF80 MHz_part2, $0_{23}$, (−1)*2xEHT-LTF80 MHz_part1, (−1)*2xEHT-LTF80 MHz_part2, $0_{23}$, 2xEHT-LTF80 MHz_part1, (−1)*2xEHT-LTF80 MHz_part2].

The 2xEHT-LTF320 MHz sequence indicates a 2xLTF sequence in a range from subcarrier numbers −2036 to 2036 in the 320 MHz bandwidth in 11be. Coefficient L of the 2xEHT-LTF320 MHz sequence=[1 1 −1 1 −1 −1 1 −1]. $0_{23}$ indicates 23 consecutive 0s. Herein, a PAPR of a coefficient L' formed by negating all coefficients multiplied by each segment in the 2xEHT-LTF320 MHz sequence or by performing cyclic shift for an even number of times (equal to a quantity of segments of the EHT-LTF sequence in the 80 MHz bandwidth, which is 2 herein) is equivalent to a PAPR of the coefficient L, that is, a PAPR value is consistent. In other words, when the coefficient of the 2xEHT-LTF320 MHz sequence is L' and L, the PAPR value of the 2xEHT-LTF320 MHz sequence is consistent. For example, the coefficient L' obtained by negating (that is, being multiplied by −1) the coefficient L is: L'=[−1 −1 1 −1 1 1 −1 1]. The coefficient L' obtained by performing cyclic shift on the coefficient L twice is: L'=[1 −1 1 1 −1 1 −1 −1].

In an example, Table 10 is a PAPR value of each resource block corresponding to the foregoing 2xEHT-LTF320 MHz sequence.

TABLE 10

| PAPR value of each resource block corresponding to 2xEHT-LTF320 MHz sequence | |
|---|---|
| RU size | Max PAPR |
| RU26 | 4.46 |
| RU52 | 4.69 |
| RU52 + RU26 | 5.94 |
| RU106 | 5.41 |
| RU106 + RU26 | 6.25 |
| RU242 | 5.58 |
| RU484 | 6.59 |
| RU484 + RU242 | 8.59 |
| RU996 | 6.21 |
| RU996 + RU484 | 8.87 |
| 2*RU996 | 9.34 |
| 2*RU996 + RU484 | 9.52 |
| 3*RU996 | 8.80 |
| 3*RU996 + RU484 | 9.46 |
| 4*RU996 | 9.53 |

A possible 4xEHT-LTF320 MHz sequence is as follows:
4xEHT-LTF320 MHz=[4xEHT-LTF80 MHz_part1, (−1)*4xEHT-LTF80 MHz_part2, $0_{23}$, 4xEHT-LTF80 MHz_part1, 4xEHT-LTF80 MHz_part2, $0_{23}$, (−1)*4xEHT-LTF80 MHz_part1, 4xEHT-LTF80 MHz_part2, $0_{23}$, (−1)*4xEHT-LTF80 MHz_part1, 4xEHT-LTF80 MHz_part2].

The 4xEHT-LTF320 MHz sequence indicates a 4xLTF sequence in a range from subcarrier numbers −2036 to 2036 in the 320 MHz bandwidth in 11be. Coefficient L of the 4xEHT-LTF320 MHz sequence=[1 −1 1 1 −1 1 −1 1]. $0_{23}$ indicates 23 consecutive 0s. Similar to the foregoing 2xEHT-LTF320 MHz sequence, a PAPR of a coefficient L' formed by negating all coefficients multiplied by each segment in the 4xEHT-LTF320 MHz sequence or by performing cyclic shift for an even number of times (equal to a quantity of segments of the EHT-LTF sequence in the 80 MHz bandwidth, which is 2 herein) is equivalent to a PAPR of the coefficient L, that is, a PAPR value is consistent. In other words, when the coefficient of the 4xEHT-LTF320 MHz sequence is L' and L, the PAPR value of the 4xEHT-LTF320 MHz sequence is consistent.

In an example, Table 11 is a PAPR value of each resource block corresponding to the foregoing 4xEHT-LTF320 MHz sequence.

TABLE 11

PAPR value of each resource block corresponding to 4xEHT-LTF320 MHz sequence

| RU size | Max PAPR |
|---|---|
| RU26 | 3.78 |
| RU52 | 4.97 |
| RU52 + RU26 | 6.46 |
| RU106 | 5.53 |
| RU106 + RU26 | 6.41 |
| RU242 | 5.60 |
| RU484 | 6.83 |
| RU484 + RU242 | 8.09 |
| RU996 | 7.80 |
| RU996 + RU484 | 9.81 |
| 2*RU996 | 10.65 |
| 2*RU996 + RU484 | 10.02 |
| 3*RU996 | 9.93 |
| 3*RU996 + RU484 | 10.56 |
| 4*RU996 | 10.65 |

It may be understood that, a negation (multiplying by −1) operation, an inversion operation, and a negation operation on an even-numbered location/an odd-numbered location of the entire 2xEHT-LTF320 MHz sequence have small impact on performance (for example, a PAPR value) of the entire 2xEHT-LTF320 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF320 MHz sequence mentioned in embodiments of the present disclosure.

Similarly, a negation (multiplying by −1) operation, an inversion operation, and a negation operation on an even-numbered location/an odd-numbered location of the entire 4xEHT-LTF320 MHz sequence have small impact on performance (for example, a PAPR value) of the entire 4xEHT-LTF320 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 4xEHT-LTF320 MHz sequence mentioned in embodiments of the present disclosure.

Optionally, in addition to the foregoing division manner in which the EHT-LTF sequence in the 80 MHz bandwidth is divided into two segments, the EHT-LTF sequence in the 80 MHz bandwidth may be further divided into more segments, and each segment is multiplied by a different coefficient, and then is combined into an EHT-LTF sequence of a larger bandwidth. For example, the EHT-LTF sequence in the 80 MHz bandwidth may be divided into the following four parts/four segments:

EHT-LTF80 MHZ=[EHT-LTF80 MHz_part1, EHT-LTF80 MHz_part2, EHT-LTF80 MHz_part3, EHT-LTF80 MHz_part4].

EHT-LTF80 MHz_part1=EHT-LTF80 MHz (−500:−257) indicates that a total of 244 subcarriers whose subcarrier numbers range from −500 to −257 are included. EHT-LTF80 MHz_part2=EHT-LTF80 MHz (−256:−1) indicates that a total of 256 subcarriers whose subcarrier numbers range from −256 to −1 are included. EHT-LTF80 MHz_part3=EHT-LTF80 MHz (0:255) indicates that a total of 256 subcarriers whose subcarrier numbers range from 0 to 255 are included. EHT-LTF80 MHz_part4=EHT-LTF80 MHz (256:500) indicates that a total of 245 subcarriers whose subcarrier numbers range from 256 to 500 are included. It may be understood that, because the foregoing division manner is the same for a 2xLTF mode and a 4xLTF mode, whether a 2xEHT-LTF or a 4xEHT-LTF is divided into segments is not indicated.

According to the foregoing four-segment division manner of the EHT-LTF80 MHz sequence, an EHT-LTF sequence in the 160 MHz bandwidth may be constructed. A possible 2xEHT-LTF160 MHz sequence is as follows:

2xEHT-LTF160 MHZ=[2xEHT-LTF80 MHz_part1, 2xEHT-LTF80 MHz_part2, (−1)*2xEHT-LTF80 MHz_part3, (−1)*2xEHT-LTF80 MHz_part4, $0_{23}$, 2xEHT-LTF80 MHz_part1, 2xEHT-LTF80 MHz_part2, 2xEHT-LTF80 MHz_part3, 2xEHT-LTF80 MHz_part4].

The 2xEHT-LTF160 MHz sequence indicates a 2xLTF sequence in a range from subcarrier numbers −1012 to 1012 in the 160 MHz bandwidth in 11be. Coefficient L of the 2xEHT-LTF160 MHz sequence=[1 1 −1 −1 1 1 1 1]. $0_{23}$ indicates 23 consecutive 0s. Similar to the foregoing 2xEHT-LTF320 MHz sequence, a PAPR of a coefficient L' formed by negating all coefficients multiplied by each segment in the 2xEHT-LTF160 MHz sequence or by performing cyclic shift for an even number of times (equal to a quantity of segments of the EHT-LTF sequence in the 80 MHz bandwidth, which is 4 herein) is equivalent to a PAPR of the coefficient L, that is, a PAPR value is consistent. In other words, when the coefficient of the 2xEHT-LTF160 MHz sequence is L' and L, the PAPR value of the 2xEHT-LTF160 MHz sequence is consistent.

A possible 4xEHT-LTF160 MHz sequence is as follows:

4xEHT-LTF160 MHz=[4xEHT-LTF80 MHz_part1, 4xEHT-LTF80 MHz_part2, (−1)*4xEHT-LTF80 MHz_part3, 4xEHT-LTF80 MHz_part4, $0_{23}$, 4xEHT-LTF80 MHz_part1, (−1)*4xEHT-LTF80 MHz_part2, 4xEHT-LTF80 MHz_part3, 4xEHT-LTF80 MHz_part4].

The 4xEHT-LTF160 MHz sequence indicates a 4xLTF sequence in a range from subcarrier numbers −1012 to 1012 in the 160 MHz bandwidth in 11be. Coefficient L of the 4xEHT-LTF160 MHz sequence=[1 1 −1 1 1 −1 1 1]. $0_{23}$ indicates 23 consecutive 0s. Similar to the foregoing 2xEHT-LTF320 MHz sequence, a PAPR of a coefficient L' formed by negating all coefficients multiplied by each segment in the 4xEHT-LTF160 MHz sequence or by performing cyclic shift for an even number of times (equal to a quantity of segments of the EHT-LTF sequence in the 80 MHz bandwidth, which is 4 herein) is equivalent to a PAPR of the coefficient L, that is, a PAPR value is consistent. In other words, when the coefficient of the 4xEHT-LTF160 MHz sequence is L' and L, the PAPR value of the 4xEHT-LTF160 MHz sequence is consistent.

It may be understood that, a negation (multiplying by −1) operation, an inversion operation, and a negation operation on an even-numbered location/an odd-numbered location of the entire 2xEHT-LTF160 MHz sequence have small impact on performance (for example, a PAPR value) of the entire 2xEHT-LTF160 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF160 MHz sequence mentioned in embodiments of the present disclosure.

Similarly, a negation (multiplying by −1) operation, an inversion operation, and a negation operation on an even-numbered location/an odd-numbered location of the entire 4xEHT-LTF160 MHz sequence have small impact on performance (for example, a PAPR value) of the entire 4xEHT-LTF160 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 4xEHT-LTF160 MHz sequence mentioned in embodiments of the present disclosure.

In this embodiment, some sequences in an HE-LTF80 MHz sequence are inverted/reversed, and a value is re-assigned to a sequence corresponding to a direct current subcarrier in 11be, to obtain an EHT-LTF80 MHz sequence. Then, an EHT-LTF sequence in a larger bandwidth (for example, 160 MHz and 320 MHz) is constructed based on the EHT-LTF80 MHz sequence. PAPR values of these sequences on a plurality of single Rus and a plurality of combined Rus are low. Compared with direct use of an HE-LTF sequence in 11ax without modifying, the EHT-LTF sequence provided in this embodiment reduces PAPR values on most resource blocks.

Embodiment 3

An embodiment 3 of the present disclosure describes a second EHT-LTF sequence in an 80 MHz bandwidth, and describes EHT-LTF sequences that are in a 160 MHz bandwidth and a 320 MHz bandwidth and that are constructed based on the 80 MHz EHT-LTF sequence.

Specifically, 1001 subcarriers numbered in a range from −500 to 500 in an HE-LTF sequence in the 80 MHz bandwidth may be divided into the following five parts:
HE-LTF80 MHZ [HE-LTF80 MHz_part1, HE-LTF80 MHz_part2, HE-LTF80 MHz_part3, HE-LTF80 MHz_part4, HE-LTF80 MHz_part5].

HE-LTF80 MHz_part1=HE-LTF80 MHz (−500:−259) indicates that a total of 242 subcarriers whose subcarrier numbers range from −500 to −259 are included. HE-LTF80 MHz_part2=HE-LTF80 MHz (−258:−12) indicates that a total of 247 subcarriers whose subcarrier numbers range from −258 to −12 are included. HE-LTF80 MHz_part3=HE-LTF80 MHz (−11:11) indicates that a total of 23 subcarriers whose subcarrier numbers range from −11 to 11 are included. HE-LTF80 MHz_part4=HE-LTF80 MHz (12:258) indicates that a total of 247 subcarriers whose subcarrier numbers range from 12 to 258 are included. HE-LTF80 MHz_part5=HE-LTF80 MHz (259:500) indicates that a total of 242 subcarriers whose subcarrier numbers range from 259 to 500 are included. It may be understood that, because the foregoing division manner is the same for a 2xLTF mode and a 4xLTF mode, whether a 2xHE-LTF or a 4xHE-LTF is divided into segments is not indicated.

Based on a division manner of the HE-LTF sequence in the 80 MHz bandwidth in this embodiment, a possible 2xEHT-LTF80 MHz sequence is as follows:

2xEHT-LTF80 MHz=[2xHE-LTF80 MHz_part1, 2xHE-LTF80 MHz_part2_Reverse, 2xHE-LTF80 MHz_part3, 2xHE-LTF80 MHz_part4_Reverse, 2xHE-LTF80 MHz_part5].

A possible 4xEHT-LTF80 MHz sequence is as follows:
4xEHT-LTF80 MHz=[4xHE-LTF80 MHz_part1, 4xHE-LTF80 MHz_part2_Reverse, 4xHE-LTF80 MHz_part3, 4xHE-LTF80 MHz_part4_Reverse, 4xHE-LTF80 MHz_part5].

The 2xEHT-LTF80 MHz sequence indicates a 2xLTF sequence in a range from subcarrier numbers −500 to 500 in the 80 MHz bandwidth in 11be. The 4xEHT-LTF80 MHz sequence indicates a 4xLTF sequence in a range from subcarrier numbers −500 to 500 in the 80 MHz bandwidth in 11be. 2xHE-LTF80 MHz_part2_Reverse indicates a sequence obtained by inverting a sequence of a part 2xHE-LTF80 MHz_part2, that is, the 2xHE-LTF80 MHz_part2 sequence is arranged in a reverse order. 4xHE-LTF80 MHz_part2_Reverse indicates a sequence obtained by inverting a sequence of a part 4xHE-LTF80 MHz_part2, that is, the 4xHE-LTF80 MHz_part2 sequence is arranged in a reverse order. Similarly, 2xHE-LTF80 MHz_part4_Reverse indicates a sequence obtained by inverting a sequence of a part 2xHE-LTF80 MHz_part4, that is, the 2xHE-LTF80 MHz_part4 sequence is arranged in a reverse order. 4xHE-LTF80 MHz_part4_Reverse indicates a sequence obtained by inverting a sequence of a part 4xHE-LTF80 MHz_part4, that is, the 4xHE-LTF80 MHz_part4 sequence is arranged in a reverse order. For specific values of 2xHE-LTF80 MHz_part1, 2xHE-LTF80 MHz_part2, 2xHE-LTF80 MHz_ part3, 2xHE-LTF80 MHz_part4, and 2xHE-LTF80 MHz_ part5, refer to the 802.11ax standard, and details are not described herein. Similarly, for specific values of 4xHE-LTF80 MHz_ part1, 4xHE-LTF80 MHz_part2, 4xHE-LTF80 MHz_ part3, 4xHE-LTF80 MHz_part4, and 4xHE-LTF80 MHz_ part5, refer to the 802.11ax standard. Details are not described herein.

It may be understood that, similar to the foregoing embodiment 2, in the 802.11ax standard, a first RU242 and a second RU242 are type A RU242, and a third RU242 and a fourth RU242 are type B RU242; in the 802.11be standard, a first RU242 and a third RU242 are type A RU242, and a second RU242 and a fourth RU242 are type B RU242. Therefore, when HE-LTF80 MHz_part1 and HE-LTF80 MHz_part2 are located at locations corresponding to the second or the fourth RU242 in the EHT-LTF80 MHz sequence, HE-LTF80 MHz_part1 and HE-LTF80 MHz_ part2 need to be inverted before being used. Similarly, when HE-LTF80 MHz_part4 and HE-LTF80 MHz_part5 are located at locations corresponding to the first or the third RU242 in the EHT-LTF80 MHz sequence, HE-LTF80 MHz_ part4 and HE-LTF80 MHz_part5 sequences need to be inverted before being used. Herein, the foregoing principle is applicable to both a 2xLTF sequence and a 4xLTF sequence in 11be.

Optionally, a negation (multiplying by −1) operation, an inversion operation, and a negation operation on an even-numbered location/an odd-numbered location of the entire 2xEHT-LTF80 MHz/4xEHT-LTF80 MHz sequence have small impact on performance (for example, a PAPR value) of the entire 2xEHT-LTF80 MHz/4xEHT-LTF80 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF80 MHz/4xEHT-LTF80 MHz sequence mentioned in embodiments of the present disclosure.

Optionally, based on the foregoing 2xEHT-LTF80 MHz and the foregoing 4xEHT-LTF80 MHz, a 2xEHT-LTF sequence and a 4xEHT-LTF sequence in a 160 MHz bandwidth and a 320 MHz bandwidth may be constructed. In the 160 MHz bandwidth and the 320 MHz bandwidth, the EHT-LTF sequence in 11be may be obtained by combining an improved 80 MHz bandwidth sequence multiplied by a different coefficient (for example, 1 or −1) or by combining each segment multiplied by a different coefficient (for example, 1 or −1) after segmentation.

Optionally, 1001 subcarriers in a range of numbers from −500 to 500 of the EHT-LTF sequence in the 80 MHz bandwidth may be divided into the following two parts/two segments:

EHT-LTF80 MHz=[EHT-LTF80 MHz_part1, EHT-LTF80 MHz_part2].

EHT-LTF80 MHz_part1=EHT-LTF80 MHz (−500:−1) indicates that a total of 500 subcarriers whose subcarrier numbers range from −500 to −1 are included. EHT-LTF80 MHz_part2=EHT-LTF80 MHz (0:500) indicates that a total of 501 subcarriers whose subcarrier numbers range from 0 to 500 are included. It may be understood that, because the foregoing division manner is the same for a 2xLTF mode and a 4xLTF mode, whether a 2xEHT-LTF or a 4xEHT-LTF is divided into segments is not indicated.

After segmentation, each segment may be multiplied by a different coefficient, and then combined into an EHT-LTF sequence with a larger bandwidth. According to the foregoing two-segment division manner of the EHT-LTF80 MHz sequence, an EHT-LTF sequence in the 320 MHz bandwidth may be constructed. A possible 2xEHT-LTF320 MHz sequence is as follows:

2xEHT-LTF320 MHz=[2xEHT-LTF80 MHz_part1, 2xEHT-LTF80 MHz_part2, $0_{23}$, (−1)*2xEHT-LTF80 MHz_part1, 2xEHT-LTF80 MHz_part2, $0_{23}$, (−1)*2xEHT-LTF80 MHz_part1, (−1)*2xEHT-LTF80 MHz_part2, $0_{23}$, 2xEHT-LTF80 MHz_part1, (−1)*2xEHT-LTF80 MHz_part2].

The 2xEHT-LTF320 MHz sequence indicates a 2xLTF sequence in a range from subcarrier numbers −2036 to 2036 in the 320 MHz bandwidth in 11be. Coefficient L of the 2xEHT-LTF320 MHz sequence=[1 1 −1 1 −1 −1 1 −1]. $0_{23}$ indicates 23 consecutive 0s. Herein, a PAPR of a coefficient L' formed by negating all coefficients multiplied by each segment in the 2xEHT-LTF320 MHz sequence or by performing cyclic shift for an even number of times (equal to a quantity of segments of the EHT-LTF sequence in the 80 MHz bandwidth, which is 2 herein) is equivalent to a PAPR of the coefficient L, that is, a PAPR value is consistent. In other words, when the coefficient of the 2xEHT-LTF320 MHz sequence is L' and L, the PAPR value of the 2xEHT-LTF320 MHz sequence is consistent. For example, the coefficient L' obtained by negating the coefficient L is: L'=[−1 −1 1 −1 1 1 −1 1]. The coefficient L' obtained by performing cyclic shift on the coefficient L twice is: L'=[1 −1 1 1 −1 1 −1 −1].

A possible 4xEHT-LTF320 MHz sequence is as follows:
4xEHT-LTF320 MHz=[4xEHT-LTF80 MHz_part1, (−1)*4xEHT-LTF80 MHz_part2, $0_{23}$, 4xEHT-LTF80 MHz_part1, 4xEHT-LTF80 MHz_part2, $0_{23}$, (−1)*4xEHT-LTF80 MHz_part1, 4xEHT-LTF80 MHz_part2, $0_{23}$, (−1)*4xEHT-LTF80 MHz_part1, 4xEHT-LTF80 MHz_part2].

The 4xEHT-LTF320 MHz sequence indicates a 4xLTF sequence in a range from subcarrier numbers −2036 to 2036 in the 320 MHz bandwidth in 11be. Coefficient L of the 4xEHT-LTF320 MHz sequence=[1 −1 1 1 −1 1 −1 1]. $0_{23}$ indicates 23 consecutive 0s. Similar to the foregoing 2xEHT-LTF320 MHz sequence, a PAPR of a coefficient L' formed by negating all coefficients multiplied by each segment in the 4xEHT-LTF320 MHz sequence or by performing cyclic shift for an even number of times (equal to a quantity of segments of the EHT-LTF sequence in the 80 MHz bandwidth, which is 2 herein) is equivalent to a PAPR of the coefficient L, that is, a PAPR value is consistent. In other words, when the coefficient of the 4xEHT-LTF320 MHz sequence is L' and L, the PAPR value of the 4xEHT-LTF320 MHz sequence is consistent.

It may be understood that, a negation (multiplying by −1) operation, an inversion operation, and a negation operation on an even-numbered location/an odd-numbered location of the entire 2xEHT-LTF320 MHz/4xEHT-LTF320 MHz sequence have small impact on performance (for example, a PAPR value) of the entire 2xEHT-LTF320 MHz/4xEHT-LTF320 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF320 MHz/4xEHT-LTF320 MHz sequence mentioned in embodiments of the present disclosure.

Optionally, in addition to the foregoing division manner in which the EHT-LTF sequence in the 80 MHz bandwidth is divided into two segments, the EHT-LTF sequence in the 80 MHz bandwidth may be further divided into more segments, and each segment is multiplied by a different coefficient, and then is combined into an EHT-LTF sequence of a larger bandwidth. For example, the EHT-LTF sequence in the 80 MHz bandwidth may be divided into the following four parts/four segments:

EHT-LTF80 MHZ=[EHT-LTF80 MHz_part1, EHT-LTF80 MHz_part2, EHT-LTF80 MHz_part3, EHT-LTF80 MHz_part4].

EHT-LTF80 MHz_part1=EHT-LTF80 MHz (−500:−257) indicates that a total of 244 subcarriers whose subcarrier numbers range from −500 to −257 are included. EHT-LTF80 MHz_part2=EHT-LTF80 MHz (−256:−1) indicates that a total of 256 subcarriers whose subcarrier numbers range from −256 to −1 are included. EHT-LTF80 MHz_part3=EHT-LTF80 MHz (0:255) indicates that a total of 256 subcarriers whose subcarrier numbers range from 0 to 255 are included. EHT-LTF80 MHz_part4=EHT-LTF80 MHz (256:500) indicates that a total of 245 subcarriers whose subcarrier numbers range from 256 to 500 are included. It may be understood that, because the foregoing division manner is the same for a 2xLTF mode and a 4xLTF mode, whether a 2xEHT-LTF or a 4xEHT-LTF is divided into segments is not indicated.

According to the foregoing four-segment division manner of the EHT-LTF80 MHz sequence, an EHT-LTF sequence in the 160 MHz bandwidth may be constructed. A possible 2xEHT-LTF160 MHz sequence is as follows:

2xEHT-LTF160 MHz=[2xEHT-LTF80 MHz_part1, 2xEHT-LTF80 MHz_part2, (−1)*2xEHT-LTF80 MHz_part3, (−1)*2xEHT-LTF80 MHz_part4, $0_{23}$, 2xEHT-LTF80 MHz_part1, 2xEHT-LTF80 MHz_part2, 2xEHT-LTF80 MHz_part3, 2xEHT-LTF80 MHz_part4].

The 2xEHT-LTF160 MHz sequence indicates a 2xLTF sequence in a range from subcarrier numbers −1012 to 1012 in the 160 MHz bandwidth in 11be. Coefficient L of the 2xEHT-LTF160 MHz sequence=[1 1 −1 −1 1 1 1 1]. $0_{23}$ indicates 23 consecutive 0s. Similar to the foregoing 2xEHT-LTF320 MHz sequence, a PAPR of a coefficient L' formed by negating all coefficients multiplied by each segment in the 2xEHT-LTF160 MHz sequence or by performing cyclic shift for an even number of times (equal to a quantity of segments of the EHT-LTF sequence in the 80 MHz bandwidth, which is 4 herein) is equivalent to a PAPR of the coefficient L, that is, a PAPR value is consistent. In other words, when the coefficient of the 2xEHT-LTF160 MHZ sequence is L' and L, the PAPR value of the 2xEHT-LTF160 MHz sequence is consistent.

A possible 4xEHT-LTF160 MHz sequence is as follows:
4xEHT-LTF160 MHz=[4xEHT-LTF80 MHz_part1, 4xEHT-LTF80 MHz_part2, (−1)*4xEHT-LTF80 MHz_part3, 4xEHT-LTF80 MHz_part4, $0_{23}$, 4xEHT-LTF80 MHz_part1, (−1)*4xEHT-LTF80 MHz_part2, 4xEHT-LTF80 MHz_part3, 4xEHT-LTF80 MHz_part4].

The 4xEHT-LTF160 MHz sequence indicates a 4xLTF sequence in a range from subcarrier numbers −1012 to 1012 in the 160 MHz bandwidth in 11be. Coefficient L of the 4xEHT-LTF160 MHz sequence=[1 1 −1 1 1 −1 1 1]. $0_{23}$ indicates 23 consecutive 0s. Similar to the foregoing 2xEHT-LTF320 MHz sequence, a PAPR of a coefficient L' formed by negating all coefficients multiplied by each segment in the 4xEHT-LTF160 MHz sequence or by performing cyclic shift for an even number of times (equal to a quantity of segments of the EHT-LTF sequence in the 80 MHz bandwidth, which is 4 herein) is equivalent to a PAPR of the coefficient L, that is, a PAPR value is consistent. In other words, when the coefficient of the 4xEHT-LTF160 MHz sequence is L' and L, the PAPR value of the 4xEHT-LTF160 MHz sequence is consistent.

It may be understood that, a negation (multiplying by −1) operation, an inversion operation, and a negation operation on an even-numbered location/an odd-numbered location of the entire 2xEHT-LTF160 MHz/4xEHT-LTF160 MHz sequence have small impact on performance (for example, a PAPR value) of the entire 2xEHT-LTF160 MHz/4xEHT-LTF160 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF160 MHz/4xEHT-LTF160 MHz sequence mentioned in embodiments of the present disclosure.

In this embodiment, some sequences in the HE-LTF80 MHz sequence are inverted to obtain an EHT-LTF80 MHz sequence, and sequence values corresponding to five direct current subcarriers between a first RU242 and a second RU242, 23 subcarriers between the second RU242 and a third RU242, and five direct current subcarriers between the third RU242 and a fourth RU242 do not need to be modified. Sequence values corresponding to corresponding subcarriers in 11ax are directly used. Then, based on the foregoing EHT-LTF80 MHz sequence, an EHT-LTF sequence in a larger bandwidth (for example, 160 MHz and 320 MHz) is constructed. These sequences have low PAPR values on a plurality of single Rus and a plurality of combined Rus. Compared with direct use of an HE-LTF sequence in 11ax without modifying, the EHT-LTF sequence provided in this embodiment reduces PAPR values on most resource blocks.

Embodiment 4

An embodiment 4 of the present disclosure describes a third EHT-LTF sequence in an 80 MHz bandwidth, and describes EHT-LTF sequences that are in a 160 MHz bandwidth and a 320 MHz bandwidth and that are constructed based on the 80 MHz EHT-LTF sequence.

Specifically, 1001 subcarriers numbered in a range from −500 to 500 in an HE-LTF sequence in the 80 MHz bandwidth may be divided into the following five parts:
HE-LTF80 MHZ [HE-LTF80 MHz_part1, HE-LTF80 MHz_part2, HE-LTF80 MHz_part3, HE-LTF80 MHz_part4, HE-LTF80 MHz_part5].

HE-LTF80 MHz_part1=HE-LTF80 MHz (−500:−259) indicates that a total of 242 subcarriers whose subcarrier numbers range from −500 to −259 are included. HE-LTF80 MHz_part2=HE-LTF80 MHz (−258:−12) indicates that a total of 247 subcarriers whose subcarrier numbers range from −258 to −12 are included. HE-LTF80 MHz_part3=HE-LTF80 MHz (−11:11) indicates that a total of 23 subcarriers whose subcarrier numbers range from −11 to 11 are included. HE-LTF80 MHz_part4=HE-LTF80 MHz (12:258) indicates that a total of 247 subcarriers whose subcarrier numbers range from 12 to 258 are included. HE-LTF80 MHz_part5=HE-LTF80 MHz (259:500) indicates that a total of 242 subcarriers whose subcarrier numbers range from 259 to 500 are included. It may be understood that, because the foregoing division manner is the same for a 2xLTF mode and a 4xLTF mode, whether a 2xHE-LTF or a 4xHE-LTF is divided into segments is not indicated.

Based on the division manner of the HE-LTF sequence in the 80 MHz bandwidth in this embodiment, locations of a second segment sequence and a fourth segment sequence in the HE-LTF80 MHz sequence are exchanged and the second segment sequence and the fourth segment sequence may be used as an EHT-LTF80 MHz sequence. A possible 2xEHT-LTF80 MHz sequence is as follows:
2xEHT-LTF80 MHz=[2xHE-LTF80 MHz_part1, 2xHE-LTF80 MHz_part4, 2xHE-LTF80 MHz_part3, 2xHE-LTF80 MHz_part2, 2xHE-LTF80 MHz_part5].

A possible 4xEHT-LTF80 MHz sequence is as follows:
4xEHT-LTF80 MHZ=[4xHE-LTF80 MHz_part1, 4xHE-LTF80 MHz_part4, 4xHE-LTF80 MHz_part3, 4xHE-LTF80 MHz_part2, 4xHE-LTF80 MHz_part5].

The 2xEHT-LTF80 MHz sequence indicates a 2xLTF sequence in a range from subcarrier numbers −500 to 500 in the 80 MHz bandwidth in 11be. The 4xEHT-LTF80 MHz sequence indicates a 4xLTF sequence in a range from subcarrier numbers −500 to 500 in the 80 MHz bandwidth in 11be.

A comparison result of PAPR values of resource blocks corresponding to that an LTF sequence in the 80 MHz bandwidth in 11be is a new sequence obtained by exchanging a location of the second segment of the HE-LTF80 MHz sequence with a location of the fourth segment of the HE-LTF80 MHz sequence and PAPR values of resource blocks corresponding to that an original 2xHE-LTF80 MHz sequence is directly used as an LTF sequence in the 80 MHz bandwidth in 11be is shown in Table 12. A second row in Table 12 indicates average PAPR values of a data part on different resource blocks. A third row in Table 12 indicates PAPR values of an original HE-LTF80 MHz sequence that is directly used as a 2xLTF sequence in the 80 MHz bandwidth on different resource blocks in 11be. A fourth row indicates PAPR values of the new sequence obtained by exchanging locations of the second sequence in the 2xHE-LTF80 MHz sequence and the fourth sequence in the 2xLTF sequence as a 2xLTF sequence in the 80 MHz bandwidth on different resource blocks in 11be. A fifth row in Table 12 indicates PAPR values of an original 4xHE-LTF80 MHz sequence that is directly used as a 4xLTF sequence in the 80

MHz bandwidth on different resource blocks in 11be. A sixth row indicates PAPR values of the new sequence obtained by exchanging locations of the second sequence in the 4xHE-LTF80 MHz sequence and the fourth sequence in the 4xLTF sequence as a 4xLTF sequence in the 80 MHz bandwidth on different resource blocks in 11be. Therefore, it can be learned from Table 12 that, in comparison with a case in which the original HE-LTF80 MHz sequence is directly used as an LTF sequence in 80 MHz in 11be, the EHT-LTF80 MHz sequence provided in this embodiment has a lower PAPR value on a plurality of single Rus and a plurality of combined Rus.

TABLE 12

Result of comparison between PAPR values of an original HE-LTF80 MHz sequence and EHT-LTF80 MHz obtained by exchanging locations of HE-LTF80 MHz sequence

| Max PAPR | RU26 | RU52 | RU106 | RU242 | RU484 | RU996 | RU52 + RU26 | RU106 + RU26 | RU484 + RU242 |
|---|---|---|---|---|---|---|---|---|---|
| Data(16QAM) | 6.52 | 7.17 | 7.76 | 8.36 | 8.82 | 9.22 | 7.54 | 7.94 | 9.08 |
| LTF 2x | 7.95 | 7.43 | 6.71 | 8.23 | 7.33 | 6.48 | 6.37 | 6.64 | 9.65 |
| LTF 2x (after exchanging) | 4.46 | 4.69 | 5.41 | 5.58 | 6.58 | 7.06 | 5.94 | 6.25 | 8.59 |
| LTF 4x | 7.29 | 8.48 | 6.69 | 7.07 | 7.36 | 6.74 | 6.90 | 7.42 | 8.46 |
| LTF 4x (after exchanging) | 3.78 | 4.97 | 5.53 | 5.60 | 8.03 | 7.08 | 6.46 | 6.41 | 8.29 |

It may be understood that, in the 802.11ax standard, pilot location distribution of the first RU242 and the second RU242 belongs to a type A (pilot location distribution shown in FIG. 9a), and pilot location distribution of the third RU242 and the fourth RU242 belongs to a type B (pilot location distribution shown in FIG. 9b). However, in the 802.11be standard, pilot location distribution of the first RU242 and the third RU242 belongs to a type A (pilot location distribution shown in FIG. 9a), and pilot location distribution of the second RU242 and the fourth RU242 belongs to a type B (pilot location distribution shown in FIG. 9b). Therefore, to reduce a PAPR value, a sequence corresponding to a resource block in 11ax needs to be aligned with a sequence corresponding to a resource block in 11be. In addition, because pilot location distribution of the first RU242 and the fourth RU242 in 11ax is the same as that of the first RU242 and the fourth RU242 in 11be, a sequence corresponding to the first RU242 and a sequence corresponding to the fourth RU242 in 11ax may be directly used. However, pilot location distribution of the second RU242 and the third RU242 in 11ax is different from that of the second RU242 and the third RU242 in 11be. Therefore, an LTF sequence corresponding to the second RU242 in 11ax may be moved to a subcarrier location corresponding to the third RU242 in 11be, and an LTF sequence corresponding to the third RU242 in 11ax is moved to a subcarrier location corresponding to the second RU242 in 11be.

Optionally, a negation (multiplying by −1) operation, an inversion operation, and a negation operation on an even-numbered location/an odd-numbered location of the entire 2xEHT-LTF80 MHz/4xEHT-LTF80 MHz sequence have small impact on performance (for example, a PAPR value) of the entire 2xEHT-LTF80 MHz/4xEHT-LTF80 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF80 MHz/4xEHT-LTF80 MHz sequence mentioned in embodiments of the present disclosure.

Based on the foregoing 2xEHT-LTF80 MHz sequence and the foregoing 4xEHT-LTF80 MHz sequence, a 2xEHT-LTF sequence and a 4xEHT-LTF sequence in a 160 MHz bandwidth and a 320 MHz bandwidth may be constructed. In the 160 MHz bandwidth and the 320 MHz bandwidth, the EHT-LTF sequence in 11be may be obtained by combining an improved 80 MHz bandwidth sequence multiplied by a different coefficient (for example, 1 or −1) or by combining each segment multiplied by a different coefficient (for example, 1 or −1) after segmentation. In other words, a 2xEHT-LTF80 MHz sequence may be multiplied by a different coefficient (for example, 1 or −1), or the 2xEHT-LTF80 MHz sequence is segmented and then each segment is multiplied by different coefficients (for example, 1 or −1), and then the segments are combined together to obtain the 2xEHT-LTF sequence in the 160 MHz bandwidth and the 320 MHz bandwidth. Similarly, a 4xEHT-LTF80 MHz sequence may be multiplied by a different coefficient (for example, 1 or −1), or the 4xEHT-LTF80 MHz sequence is segmented and then each segment is multiplied by different coefficients (for example, 1 or −1), and then the segments are combined together to obtain the 4xEHT-LTF sequence in the 160 MHz bandwidth and the 320 MHz bandwidth.

Optionally, 1001 subcarriers in a range of numbers from −500 to 500 of the EHT-LTF sequence in the 80 MHz bandwidth may be divided into the following two parts/two segments:

EHT-LTF80 MHz=[EHT-LTF80 MHz_part1, EHT-LTF80 MHz_part2].

EHT-LTF80 MHz_part1=EHT-LTF80 MHz (−500:−1) indicates that a total of 500 subcarriers whose subcarrier numbers range from −500 to −1 are included. EHT-LTF80 MHz_part2=EHT-LTF80 MHz (0:500) indicates that a total of 501 subcarriers whose subcarrier numbers range from 0 to 500 are included. It may be understood that, because the foregoing division manner is the same for a 2xLTF mode and a 4xLTF mode, whether a 2xEHT-LTF or a 4xEHT-LTF is divided into segments is not indicated.

After segmentation, each segment may be multiplied by a different coefficient, and then combined into an EHT-LTF sequence with a larger bandwidth. According to the foregoing two-segment division manner of the EHT-LTF80 MHz sequence, an EHT-LTF sequence in the 320 MHz bandwidth may be constructed. A possible 2xEHT-LTF320 MHz sequence is as follows:

2xEHT-LTF320 MHz=[2xEHT-LTF80 MHz_part1, (−1)*2xEHT-LTF80 MHz_part2, $0_{23}$, 2xEHT-LTF80 MHz_part1, 2xEHT-LTF80 MHz_part2, $0_{23}$, (−1)*2xEHT-LTF80 MHz_part1, 2xEHT-LTF80 MHz_part2, $0_{23}$, (−1)*2xEHT-LTF80 MHz_part1, (−1)*2xEHT-LTF80 MHz_part2].

The 2xEHT-LTF320 MHz sequence indicates a 2xLTF sequence in a range from subcarrier numbers −2036 to 2036 in the 320 MHz bandwidth in 11be. Coefficient L of the 2xEHT-LTF320 MHz sequence=[1 −1 1 1 −1 1 −1 −1]. $0_{23}$ indicates 23 consecutive 0s. Herein, a PAPR of a coefficient L' formed by negating all coefficients multiplied by each segment in the 2xEHT-LTF320 MHz sequence or by performing cyclic shift for an even number of times (equal to a quantity of segments of the EHT-LTF sequence in the 80 MHz bandwidth, which is 2 herein) is equivalent to a PAPR of the coefficient L, that is, a PAPR value is consistent. In other words, when the coefficient of the 2xEHT-LTF320 MHz sequence is L' and L, the PAPR value of the 2xEHT-LTF320 MHz sequence is consistent. For example, the coefficient L' obtained by negating (that is, being multiplied by −1) the coefficient L is: L'=[−1 1 −1 −1 1 −1 1 1]. The coefficient L' obtained by performing cyclic shift on the coefficient L twice is: L'=[−1 −1 1 −1 1 1 −1 1].

A possible 4xEHT-LTF320 MHz sequence is as follows:
4xEHT-LTF320 MHz=[4xEHT-LTF80 MHz_part1, (−1)*4xEHT-LTF80 MHz_part2, $0_{23}$, (−1)*4xEHT-LTF80 MHz_part1, (−1)*4xEHT-LTF80 MHz_part2, $0_{23}$, (−1)*4xEHT-LTF80 MHz_part1, 4xEHT-LTF80 MHz_part2, $0_{23}$, 4xEHT-LTF80 MHz_part1, 4xEHT-LTF80 MHz_part2].

The 4xEHT-LTF320 MHz sequence indicates a 4xLTF sequence in a range from subcarrier numbers −2036 to 2036 in the 320 MHz bandwidth in 11be. Coefficient L of the 4xEHT-LTF320 MHz sequence=[1 −1 −1 −1 −1 1 1 1]. $0_{23}$ indicates 23 consecutive 0s. Similar to the foregoing 2xEHT-LTF320 MHz sequence, a PAPR of a coefficient L' formed by negating all coefficients multiplied by each segment in the 4xEHT-LTF320 MHz sequence or by performing cyclic shift for an even number of times (equal to a quantity of segments of the EHT-LTF sequence in the 80 MHz bandwidth, which is 2 herein) is equivalent to a PAPR of the coefficient L, that is, a PAPR value is consistent. In other words, when the coefficient of the 4xEHT-LTF320 MHz sequence is L' and L, the PAPR value of the 4xEHT-LTF320 MHz sequence is consistent.

It may be understood that, a negation (multiplying by −1) operation, an inversion operation, and a negation operation on an even-numbered location/an odd-numbered location of the entire 2xEHT-LTF320 MHz/4xEHT-LTF320 MHz sequence have small impact on performance (for example, a PAPR value) of the entire 2xEHT-LTF320 MHz/4xEHT-LTF320 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF320 MHz/4xEHT-LTF320 MHz sequence mentioned in embodiments of the present disclosure.

Optionally, in addition to the foregoing division manner in which the EHT-LTF sequence in the 80 MHz bandwidth is divided into two segments, the EHT-LTF sequence in the 80 MHz bandwidth may be further divided into more segments, and each segment is multiplied by a different coefficient, and then is combined into an EHT-LTF sequence of a larger bandwidth. For example, the EHT-LTF sequence in the 80 MHz bandwidth may be divided into the following four parts/four segments:
EHT-LTF80 MHZ=[EHT-LTF80 MHz_part1, EHT-LTF80 MHz_part2, EHT-LTF80 MHz_part3, EHT-LTF80 MHz_part4].

EHT-LTF80 MHz_part1=EHT-LTF80 MHz (−500:−257) indicates that a total of 244 subcarriers whose subcarrier numbers range from −500 to −257 are included. EHT-LTF80 MHz_part2=EHT-LTF80 MHz (−256:−1) indicates that a total of 256 subcarriers whose subcarrier numbers range from −256 to −1 are included. EHT-LTF80 MHz_part3=EHT-LTF80 MHz (0:255) indicates that a total of 256 subcarriers whose subcarrier numbers range from 0 to 255 are included. EHT-LTF80 MHz_part4=EHT-LTF80 MHz (256:500) indicates that a total of 245 subcarriers whose subcarrier numbers range from 256 to 500 are included. It may be understood that, because the foregoing division manner is the same for a 2xLTF mode and a 4xLTF mode, whether a 2xEHT-LTF or a 4xEHT-LTF is divided into segments is not indicated.

According to the foregoing four-segment division manner of the EHT-LTF80 MHz sequence, an EHT-LTF sequence in the 160 MHz bandwidth may be constructed. A possible 2xEHT-LTF160 MHz sequence is as follows:
2xEHT-LTF160 MHZ=[2xEHT-LTF80 MHz_part1, 2xEHT-LTF80 MHz_part2, 2xEHT-LTF80 MHz_part3, 2xEHT-LTF80 MHz_part4, $0_{23}$, (−1)*2xEHT-LTF80 MHz_part1, (−1)*2xEHT-LTF80 MHz_part2, 2xEHT-LTF80 MHz_part3, 2xEHT-LTF80 MHz_part4].

The 2xEHT-LTF160 MHz sequence indicates a 2xLTF sequence in a range from subcarrier numbers −1012 to 1012 in the 160 MHz bandwidth in 11be. Coefficient L of the 2xEHT-LTF160 MHz sequence=[1 1 1 1 −1 −1 1 1]. $0_{23}$ indicates 23 consecutive 0s. Similar to the foregoing 2xEHT-LTF320 MHz sequence, a PAPR of a coefficient L' formed by negating all coefficients multiplied by each segment in the 2xEHT-LTF160 MHz sequence or by performing cyclic shift for an even number of times (equal to a quantity of segments of the EHT-LTF sequence in the 80 MHz bandwidth, which is 4 herein) is equivalent to a PAPR of the coefficient L, that is, a PAPR value is consistent. In other words, when the coefficient of the 2xEHT-LTF160 MHz sequence is L' and L, the PAPR value of the 2xEHT-LTF160 MHz sequence is consistent.

A possible 4xEHT-LTF160 MHz sequence is as follows:
4xEHT-LTF160 MHz=[4xEHT-LTF80 MHz_part1, 4xEHT-LTF80 MHz_part2, (−1)*4xEHT-LTF80 MHz_part3, (−1)*4xEHT-LTF80 MHz_part4, $0_{23}$, (−1)*4xEHT-LTF80 MHz_part1, 4xEHT-LTF80 MHz_part2, 4xEHT-LTF80 MHz_part3, (−1)*4xEHT-LTF80 MHz_part4].

The 4xEHT-LTF160 MHz sequence indicates a 4xLTF sequence in a range from subcarrier numbers −1012 to 1012 in the 160 MHz bandwidth in 11be. Coefficient L of the 4xEHT-LTF160 MHz sequence=[1 1 −1 −1 −1 1 1 −1]. $0_{23}$ indicates 23 consecutive 0s. Similar to the foregoing 2xEHT-LTF320 MHz sequence, a PAPR of a coefficient L' formed by negating all coefficients multiplied by each segment in the 4xEHT-LTF160 MHz sequence or by performing cyclic shift for an even number of times (equal to a quantity of segments of the EHT-LTF sequence in the 80 MHz bandwidth, which is 4 herein) is equivalent to a PAPR of the coefficient L, that is, a PAPR value is consistent. In other words, when the coefficient of the 4xEHT-LTF160 MHz sequence is L' and L, the PAPR value of the 4xEHT-LTF160 MHz sequence is consistent.

It may be understood that, a negation (multiplying by −1) operation, an inversion operation, and a negation operation on an even-numbered location/an odd-numbered location of the entire 2xEHT-LTF160 MHz/4xEHT-LTF160 MHz sequence have small impact on performance (for example, a PAPR value) of the entire 2xEHT-LTF160 MHz/4xEHT-LTF160 MHz sequence, and the impact may be ignored. In other words, a frequency domain sequence of the EHT-LTF included in the EHT PPDU eventually may be a sequence obtained by performing a negation (multiplying by −1) operation, an inversion operation, or a negation operation on an even-numbered location/an odd-numbered location on any 2xEHT-LTF160 MHz/4xEHT-LTF160 MHZ sequence mentioned in embodiments of the present disclosure.

In this embodiment, some sequences in an HE-LTF80 MHz sequence are exchanged/moved to obtain an EHT-LTF80 MHz sequence, and then an EHT-LTF sequence in a larger bandwidth (for example, 160 MHz and 320 MHz) is constructed based on the EHT-LTF80 MHz sequence. These sequences have low PAPR values on a plurality of single Rus and a plurality of combined Rus. Compared with direct use of an HE-LTF sequence in 11ax without modifying, the EHT-LTF sequence provided in this embodiment reduces PAPR values on most resource blocks.

Embodiment 5

An embodiment 5 of the present disclosure describes a fourth EHT-LTF sequence in an 80 MHz bandwidth, and describes EHT-LTF sequences that are in a 160 MHz bandwidth and a 320 MHz bandwidth and that are constructed based on the 80 MHz EHT-LTF sequence.

Specifically, 1001 subcarriers numbered in a range from −500 to 500 in an HE-LTF sequence in the 80 MHz bandwidth may be divided into the following five parts:

HE-LTF80 MHZ [HE-LTF80 MHz_part1, HE-LTF80 MHz_part2, HE-LTF80 MHz_part3, HE-LTF80 MHz_part4, HE-LTF80 MHz_part5].

HE-LTF80 MHz_part1=HE-LTF80 MHz (−500:−259) indicates that a total of 242 subcarriers whose subcarrier numbers range from −500 to −259 are included. HE-LTF80 MHz_part2=HE-LTF80 MHz (−258:−17) indicates that a total of 242 subcarriers whose subcarrier numbers range from −258 to −17 are included. HE-LTF80 MHz_part3=HE-LTF80 MHz (−16:16) indicates that a total of 33 subcarriers whose subcarrier numbers range from −16 to 16 are included. HE-LTF80 MHz_part4=HE-LTF80 MHz (17:258) indicates that a total of 242 subcarriers whose subcarrier numbers range from 17 to 258 are included. HE-LTF80 MHz_part5=HE-LTF80 MHz (259:500) indicates that a total of 242 subcarriers whose subcarrier numbers range from 259 to 500 are included. It may be understood that, because the foregoing division manner is the same for a 2xLTF mode and a 4xLTF mode, whether a 2xHE-LTF or a 4xHE-LTF is divided into segments is not indicated.

Based on a division manner of the HE-LTF sequence in the 80 MHz bandwidth in this embodiment, a possible 2xEHT-LTF80 MHz sequence is as follows:

2xEHT-LTF80 MHZ [2xHE-LTF80 MHz_part1, 2xNew_partA, 2xHE-LTF80 MHz_part4, 2xNew_partB, 2xHE-LTF80 MHz_part2, 2xNew_partC, 2xHE-LTF80 MHz_part5].

A possible 4xEHT-LTF80 MHz sequence is as follows:
4xEHT-LTF80 MHZ=[4xHE-LTF80 MHz_part1, 4xNew_partA, 4xHE-LTF80 MHz_part4, 4xNew_partB, 4xHE-LTF80 MHz_part2, 4xNew_partC, 4xHE-LTF80 MHz_part5].

The 2xEHT-LTF80 MHz sequence indicates a 2xLTF sequence in a range from subcarrier numbers −500 to 500 in the 80 MHz bandwidth in 11be. The 4xEHT-LTF80 MHZ sequence indicates a 4xLTF sequence in a range from subcarrier numbers −500 to 500 in the 80 MHz bandwidth in 11be. Based on the foregoing 2xEHT-LTF80 MHz sequence, possible 2xNew_partA, 2xNew_partB, and 2xNew_partC are as follows:

2xNew_partA=[1, 0, 1, 0, −1];
2xNew_partB=[0, 1, 0, −1, 0, 1, 0, −1, 0, 0, 0, 0, 0, 0, 0, 1, 0, 1, 0, −1, 0, 1, 0]; and
2xNew_partC=[1, 0, −1, 0, 1].

Based on the foregoing 4xEHT-LTF80 MHz sequence, possible 4xNew_partA,
4xNew_partB, and 4xNew_partC are as follows:
4xNew_partA=[−1, −1, 1, 1, 1];
4xNew_partB=[−1, −1, 1, 1, 1, 1, −1, 1, −1, −1, 1, −1, 1, −1, 1, 0, 0, 0, 0, 0, −1, −1, 1, 1, −1, −1, 1, −1, 1, 1, −1, 1, −1, −1]; and
4xNew_partC=[1, −1, 1, −1, −1].

It may be understood that, similar to the foregoing embodiment 4, pilot location distribution of the second RU242 and the third RU242 in 11ax is different from that of the second RU242 and the third RU242 in 11be. Therefore, an LTF sequence corresponding to the second RU242 in 11ax may be moved to a subcarrier location corresponding to the third RU242 in 11be, and an LTF sequence corresponding to the third RU242 in 11ax is moved to a subcarrier location corresponding to the second RU242 in 11be.

Optionally, lengths of 2xNew_partA, 2xNew_partB, and 2xNew_partC sequences and subcarrier locations corresponding to the sequences are fixed. A length of the 2xNew_partA sequence is 5, and the 2xNew_partA sequence corresponds to five direct current subcarriers between the first RU242 and the second RU242 in 11be. A length of the 2xNew_partB sequence is 23, and the 2xNew_partB sequence corresponds to 23 subcarriers between the second RU242 and the third RU242 in 11be. A length of the 2xNew_partC sequence is 5, and the 2xNew_partC sequence corresponds to five direct current subcarriers between the third RU242 and the fourth RU242 in 11be. Similarly, lengths of 4xNew_partA, 4xNew_partB, and 4xNew_partC sequences and subcarrier locations corresponding to the sequences are also fixed. A length of the 4xNew_partA sequence is 5, and the 4xNew_partA sequence corresponds to five direct current subcarriers between the first RU242 and the second RU242 in 11be. A length of the 4xNew_partB sequence is 23, and the 4xNew_partB sequence corresponds to 23 subcarriers between the second RU242 and the third RU242 in 11be. A length of the 4xNew_partC sequence is 5, and the 4xNew_partC sequence corresponds to five direct current subcarriers between the third RU242 and the fourth RU242 in 11be.

Optionally, based on the foregoing 2xEHT-LTF80 MHz and the foregoing 4xEHT-LTF80 MHz, a 2xEHT-LTF sequence and a 4xEHT-LTF sequence in a 160 MHz bandwidth and a 320 MHz bandwidth may be constructed. In this embodiment, a method for constructing a 2xEHT-LTF sequence and a 4xEHT-LTF sequence in the 160 MHz bandwidth and 320 MHz bandwidth is the same as the method for constructing a 2xEHT-LTF sequence and a 4xEHT-LTF sequence in the 160 MHz bandwidth and 320 MHz bandwidth in the embodiment 4, and details are not described herein again.

It may be understood that, a negation (multiplying by −1) operation, an inversion operation, and a negation operation on an even-numbered location/odd-numbered location of the entire EHT-LTF sequence have small impact on performance (for example, a PAPR value) of the entire EHT-LTF sequence, and the impact may be ignored. In other words, a frequency domain sequence of an EHT-LTF included in an EHT PPDU eventually may be a sequence obtained by performing a negation (multiplying by −1) operation, an inversion operation, or a negation operation on an even-numbered location/odd-numbered location on any EHT-LTF sequence mentioned in embodiments of the present disclosure.

In embodiments of the present disclosure, some sequences in an HE-LTF80 MHZ sequence are moved, and a value is re-assigned to a sequence corresponding to a direct current subcarrier in 11be, to obtain an EHT-LTF80 MHz sequence. Then, an EHT-LTF sequence in a larger bandwidth (for example, 160 MHz and 320 MHz) is constructed based on the EHT-LTF80 MHz sequence. PAPR values of these sequences on a plurality of single Rus and a plurality of combined Rus are low. Compared with direct use of an HE-LTF sequence in 11ax without modifying, the EHT-LTF sequence provided in this embodiment reduces PAPR values on most resource blocks.

The foregoing content describes in detail the methods provided in the present disclosure. To better implement the foregoing solutions in the embodiments of the present disclosure, embodiments of the present disclosure further provide corresponding apparatuses or devices.

In the embodiments of the present disclosure, the communication device may be divided into function modules based on the foregoing method examples. For example, each function module may be obtained through division based on a corresponding function, or two or more functions may be integrated into one processing module. The integrated module may be implemented in a form of hardware, or may be implemented in a form of a software functional module. It should be noted that, in embodiments of the present disclosure, module division is an example, and is merely a logical function division. In actual implementation, another division manner may be used.

Figure 10:
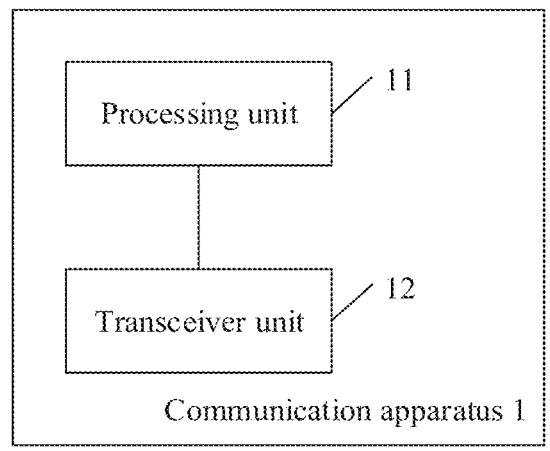
FIG. 10 is a schematic diagram of a structure of a communication apparatus according to an embodiment of the present disclosure.

When an integrated unit is used, FIG. 10 is a schematic diagram of a structure of a communication apparatus according to an embodiment of the present disclosure. The communication apparatus 1 may be a first communication device (for example, an AP) or a chip in the first communication device (for example, the AP), for example, a Wi-Fi chip. As shown in FIG. 10, the communication apparatus 1 includes a processing unit 11 and a transceiver unit 12.

The processing unit 11 is configured to generate an extremely high throughput physical layer protocol data unit (EHT PPDU), where the EHT PPDU includes an EHT-LTF. The transceiver unit 12 is configured to send the EHT PPDU.

Optionally, a frequency domain sequence of an EHT-LTF included in the EHT PPDU may be any EHT-LTF sequence provided in the embodiment 2 to the embodiment 5.

The communication apparatus 1 in this embodiment has any function of the first communication device in the foregoing method. Details are not described herein again.

Figure 11:
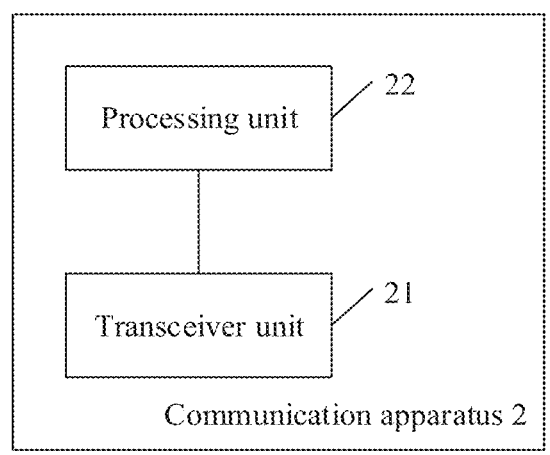
FIG. 11 is a schematic diagram of a structure of another communication apparatus according to an embodiment of the present disclosure.

FIG. 11 is a schematic diagram of a structure of another communication apparatus according to an embodiment of the present disclosure. The communication apparatus 2 may be a second communication device (for example, a STA) or a chip in the second communication device (for example, the STA), for example, a Wi-Fi chip. As shown in the FIG. 11, the communication apparatus 2 includes a transceiver unit 21 and a processing unit 22.

The transceiver unit 21 is configured to receive an EHT PPDU, where the EHT PPDU includes an EHT-LTF; and the processing unit 22 is configured to parse the EHT-LTF in the EHT PPDU.

Optionally, a frequency domain sequence of an EHT-LTF included in the EHT PPDU may be any EHT-LTF sequence provided in the embodiment 2 to the embodiment 5.

The communication apparatus 2 in this embodiment has any function of the second communication device in the foregoing method. Details are not described herein again.

The foregoing describes the first communication device and the second communication device in this embodiment. The following describes possible product forms of the first communication device and the second communication device. It should be understood that any form of product having a function of the first communication device in FIG. 10 and any form of product having a function of the second communication device in FIG. 11 both fall within the protection scope of embodiments of the present disclosure. It should be further understood that the following description is merely an example, and the product forms of the first communication device and the second communication device in this embodiment is not limited thereto.

In a possible product form, the first communication device and the second communication device in this embodiment may be implemented by using a general bus architecture.

The first communication device includes a processor and a transceiver that is internally connected to and communicates with the processor. The processor is configured to generate an extremely high throughput physical layer protocol data unit (EHT PPDU), where the EHT PPDU includes an EHT-LTF, and a frequency domain sequence of the EHT-LTF is determined based on a frequency domain sequence of a high-efficiency long training field HE-LTF; and the transceiver is configured to send the EHT PPDU. Optionally, the first communication device may further include a memory. The memory is configured to store instructions to be executed by the processor. Optionally, a frequency domain sequence of an EHT-LTF included in the EHT PPDU may be any EHT-LTF sequence provided in the embodiment 2 to the embodiment 5.

The second communication device includes a processor and a transceiver that is internally connected to and communicates with the processor. The transceiver is configured to receive an EHT PPDU, where the EHT PPDU includes an EHT-LTF; and the processor is configured to parse the EHT-LTF in the EHT PPDU. Optionally, the second communication device may further include a memory. The memory is configured to store instructions to be executed by the processor. Optionally, a frequency domain sequence of an EHT-LTF included in the EHT PPDU may be any EHT-LTF sequence provided in the embodiment 2 to the embodiment 5.

In a possible product form, the first communication device and the second communication device in this embodiment may be implemented by general-purpose processors.

A general-purpose processor for implementing the first communication device includes a processing circuit and an input/output interface that is internally connected to and communicates with the processing circuit. The processing circuit is configured to generate an extremely high throughput physical layer protocol data unit (EHT PPDU), where the EHT PPDU includes an EHT-LTF; and the input/output interface is configured to send the EHT PPDU. Optionally, the general-purpose processor may further include a storage medium, and the storage medium is configured to store instructions executed by the processing circuit. Optionally, a frequency domain sequence of an EHT-LTF included in the EHT PPDU may be any EHT-LTF sequence provided in the embodiment 2 to the embodiment 5.

A general-purpose processor for implementing the second communication device includes a processing circuit and an input/output interface that is internally connected to and communicates with the processing circuit. The input/output interface is configured to receive an EHT PPDU, where the EHT PPDU includes an EHT-LTF; and the processing circuit is configured to parse the EHT-LTF in the EHT PPDU. Optionally, the general-purpose processor may further include a storage medium, and the storage medium is configured to store instructions executed by the processing circuit. Optionally, a frequency domain sequence of an EHT-LTF included in the EHT PPDU may be any EHT-LTF sequence provided in the embodiment 2 to the embodiment 5.

As a possible product form, the first communication device and the second communication device described in this embodiment may further be implemented by using the following components: one or more FPGAs (field programmable gate arrays), a PLD (programmable logic device), a controller, a state machine, gate logic, a discrete hardware component, any other suitable circuit, or any combination of circuits that can perform various functions described in the present disclosure.

It should be understood that the communication apparatuses in the foregoing various product forms have any function of the first communication device or the second communication device in the foregoing method embodiments, and details are not described herein again.

An embodiment of the present disclosure further provides a computer-readable storage medium. The computer-readable storage medium stores instructions. When the instructions are run on a computer, the computer is enabled to perform the method in the embodiment 1.

An embodiment of the present disclosure further provides a computer program product. When the computer program product runs on a computer, the computer is enabled to perform the method in the embodiment 1.

An embodiment of the present disclosure further provides a communication apparatus. The apparatus may exist in a product form of a chip. A structure of the apparatus includes a processor and an interface circuit. The processor is configured to communicate with another apparatus by using a receiver circuit, the apparatus is enabled to perform the method in the embodiment 1.

An embodiment of the present disclosure further provides a wireless communication system, including a first communication device (for example, an AP) and a second communication device (for example, a STA). The first communication device and the second communication device may perform the method in the embodiment 1.

Method or algorithm steps described in combination with the content disclosed in the present disclosure may be implemented by hardware, or may be implemented by a processor by executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in the present disclosure may be implemented by hardware, software, firmware, or any combination thereof. When the embodiments of the present disclosure is implemented by software, the foregoing functions may be stored in a computer-readable medium or transmitted as one or more instructions or code in the computer-readable medium. The computer-readable medium includes a computer-readable storage medium and a communication medium. The communication medium includes any medium that facilitates transmission of a computer program from one place to another. The storage medium may be any available medium accessible to a general-purpose or special-purpose computer.

In the foregoing specific implementations, the objectives, technical solutions, and beneficial effects of the present disclosure are further described in detail. It should be understood that the foregoing descriptions are merely non-limiting examples of specific implementations of the present disclosure, and are not intended to limit the protection scope, which is intended to cover any modification, equivalent replacement, improvement, or the like made based on the technical solutions of the present disclosure.

What is claimed is:

1. A method for transmitting an extremely high throughput long training field (EHT-LTF) sequence, comprising:
generating, by a first communication device, an extremely high throughput physical layer protocol data unit (EHT PPDU), wherein the EHT PPDU comprises an EHT-LTF; and
sending, by the first communication device, the EHT PPDU,
wherein a 2x EHT-LTF sequence in an 80 MHz bandwidth is calculated according to the following equation:
2xEHT-LTF80 MHZ=[2xHE-LTF80 MHz_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHZ_part5], wherein
2xNew_partA is equal to [1, 0, −1, 0, 1], 2xNew_partB is equal to [0, 1, 0, −1, 0, 1, 0, 1, 0, 0, 0, 0, 0, 0, 0, −1, 0, 1, 0, −1, 0, 1, 0], and 2xNew_partC is equal to [−1, 0, 1, 0, 1]; and
2xHE-LTF80 MHz_part2_Reverse indicates that 2xHE-LTF80 MHZ_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−17), 2xHE-LTF80 MHZ_part4 is equal to 2xHE-LTF80 MHZ (17:258), and 2xHE-LTF80 MHz_part5 is equal to 2xHE-LTF80 MHZ (259:500);
wherein a 4xEHT-LTF sequence in an 80 MHz bandwidth is calculated according to the following equation:
4xEHT-LTF80 MHZ=[4xHE-LTF80 MHZ_part1, 4xNew_partA, 4xHE-LTF80 MHz_part2_Reverse, 4xNew_partB, 4xHE-LTF80 MHz_part4_Reverse, 4xNew_partC, (−1)*4xHE-LTF80 MHz_part5], wherein
4xNew_partA is equal to [−1, −1, −1, −1, 1], 4xNew_partB is equal to [1, −1, −1, −1, 1, 1, −1, 1, −1, 0, 0, 0, 0, 0, 1, 1, 1, 1, 1, 1, −1, 1, 1], and 4xNew_partC is equal to [−1, 1, −1, 1, −1]; and
4xHE-LTF80 MHz_part2_Reverse indicates that 4xHE-LTF80 MHz_part2 is arranged in a reverse order, and 4xHE-LTF80 MHZ_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−17), 4xHE-LTF80 MHz_part4 is equal to 4xHE-LTF80 MHZ (17:258), and 4xHE-LTF80 MHz_part5 is equal to 4xHE-LTF80 MHZ (259:500);

wherein a 2xEHT-LTF sequence and a 4xEHT-LTF sequence in an 80 MHz bandwidth are calculated respectively according to the following equations:

2xEHT-LTF80 MHz=[2xHE-LTF80 MHZ_part1, 2xHE-LTF80 MHz_part2_Reverse, 2xHE-LTF80 MHZ_part3, 2xHE-LTF80 MHz_part4_Reverse, 2xHE-LTF80 MHZ_part5]; and 4xEHT-LTF80 MHZ=[4xHE-LTF80 MHz_part1, 4xHE-LTF80 MHz_part2_Reverse, 4xHE-LTF80 MHZ_part3, 4xHE-LTF80 MHz_part4_Reverse, 4xHE-LTF80 MHz_part5], wherein 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHZ (−258:−12), 2xHE-LTF80 MHz_part3 is equal to 2xHE-LTF80 MHZ (−11:11), 2xHE-LTF80 MHZ_part4 is equal to 2xHE-LTF80 MHZ (12:258), and the 2xHE-LTF80 MHz_part5 is equal to 2xHE-LTF80 MHz (259:500); and 4xHE-LTF80 MHz_part2_Reverse indicates that 4xHE-LTF80 MHz_part2 is arranged in a reverse order, and 4xHE-LTF80 MHZ_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHZ (−258:−12), 4xHE-LTF80 MHZ_part3 is equal to 4xHE-LTF80 MHZ (−11:11), 4xHE-LTF80 MHz_part4 is equal to 4xHE-LTF80 MHZ (12:258), and the 4xHE-LTF80 MHz_part5 is equal to 4xHE-LTF80 MHz (259:500); or wherein a 2xEHT-LTF sequence and a 4xEHT-LTF sequence in a 160 MHz bandwidth are calculated respectively according to the following equations:

2xEHT-LTF160 MHZ=[2xEHT-LTF80 MHz_part1, 2xEHT-LTF80 MHZ_part2, (−1)*2xEHT-LTF80 MHz_part3, (−1)*2xEHT-LTF80 MHz_part4, $0_{23}$, 2xEHT-LTF80 MHz_part1, 2xEHT-LTF80 MHz_part2, 2xEHT-LTF80 MHz_part3, 2xEHT-LTF80 MHz_part4]; and 4xEHT-LTF160 MHZ=[4xEHT-LTF80 MHz_part1, 4xEHT-LTF80 MHZ_part2, (−1)*4xEHT-LTF80 MHZ_part3, 4xEHT-LTF80 MHZ_part4, $0_{23}$, 4xEHT-LTF80 MHz_part1, (−1)*4xEHT-LTF80 MHz_part2, 4xEHT-LTF80 MHz_part3, 4xEHT-LTF80 MHz_part4], wherein 2xEHT-LTF80 MHz_part1 is equal to 2xEHT-LTF80 MHz (−500:−257), 2xEHT-LTF80 MHz_part2 is equal to 2xEHT-LTF80 MHZ (−256:−1), 2xEHT-LTF80 MHZ_part3 is equal to 2xEHT-LTF80 MHZ (0:255), and the 2xEHT-LTF80 MHZ_part4 is equal to 2xEHT-LTF80 MHZ (256:500); and 4xEHT-LTF80 MHz_part1 is equal to 4xEHT-LTF80 MHz (−500:−257), 4xEHT-LTF80 MHz_part2 is equal to 4xEHT-LTF80 MHZ (−256:−1), 4xEHT-LTF80 MHZ_part3 is equal to 4xEHT-LTF80 MHZ (0:255), and the 4xEHT-LTF80 MHZ_part4 is equal to 4xEHT-LTF80 MHZ (256:500).

2. The method according to claim 1, wherein the 2xEHT-LTF sequence in the 80 MHz bandwidth is calculated according to the equation:

2xEHT-LTF80 MHz=[2xHE-LTF80 MHz_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHz_part5], wherein 2xNew_partA is equal to [1, 0, −1, 0, 1], 2xNew_partB is equal to [0, 1, 0, −1, 0, 1, 0, 1, 0, 0, 0, 0, 0, 0, 0, −1, 0, 1, 0, −1, 0, 1, 0], and 2xNew_partC is equal to [−1, 0, 1, 0, 1]; and 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−17), 2xHE-LTF80 MHz_part4 is equal to 2xHE-LTF80 MHz (17:258), and 2xHE-LTF80 MHz_part5 is equal to 2xHE-LTF80 MHz (259:500).

3. The method according to claim 1, wherein the 4xEHT-LTF sequence in the 80 MHz bandwidth is calculated according to the equation:

4xEHT-LTF80 MHz=[4xHE-LTF80 MHz_part1, 4xNew_partA, 4xHE-LTF80 MHz_part2_Reverse, 4xNew_partB, 4xHE-LTF80 MHz_part4_Reverse, 4xNew_partC, (−1)*4xHE-LTF80 MHz_part5], wherein 4xNew_partA is equal to [−1, −1, −1, −1, 1], 4xNew_partB is equal to [1, −1, −1, −1, 1, 1, −1, 1, −1, 0, 0, 0, 0, 0, 1, 1, 1, 1, 1, −1, 1, 1], and 4xNew_partC is equal to [−1, 1, −1, 1, −1]; and 4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−17), 4xHE-LTF80 MHz_part4 is equal to 4xHE-LTF80 MHz (17:258), and 4xHE-LTF80 MHz_part5 is equal to 4xHE-LTF80 MHz (259:500).

4. The method according to claim 1, wherein the 2xEHT-LTF sequence and the 4xEHT-LTF sequence in an 80 MHz bandwidth are calculated respectively according to the equations:

2xEHT-LTF80 MHz=[2xHE-LTF80 MHz_part1, 2xHE-LTF80 MHz_part2_Reverse, 2xHE-LTF80 MHz_part3, 2xHE-LTF80 MHz_part4_Reverse, 2xHE-LTF80 MHz_part5]; and 4xEHT-LTF80 MHz=[4xHE-LTF80 MHz_part1, 4xHE-LTF80 MHz_part2_Reverse, 4xHE-LTF80 MHz_part3, 4xHE-LTF80 MHz_part4_Reverse, 4xHE-LTF80 MHz_part5], wherein 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−12), 2xHE-LTF80 MHz_part3 is equal to 2xHE-LTF80 MHz (−11:11), 2xHE-LTF80 MHz_part4 is equal to 2xHE-LTF80 MHz (12:

258), and the 2xHE-LTF80 MHz_part5 is equal to 2xHE-LTF80 MHz (259:500); and

4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−12), 4xHE-LTF80 MHz_part3 is equal to 4xHE-LTF80 MHz (−11:11), 4xHE-LTF80 MHz_part4 is equal to 4xHE-LTF80 MHz (12:258), and the 4xHE-LTF80 MHz_part5 is equal to 4xHE-LTF80 MHz (259:500).

5. The method according to claim 1, wherein the 2xEHT-LTF sequence and the 4xEHT-LTF sequence in a 160 MHz bandwidth are calculated respectively according to the equations:

2xEHT-LTF160 MHz=[2xEHT-LTF80 MHz_part1, 2xEHT-LTF80 MHz_part2, (−1)*2xEHT-LTF80 MHz_part3, (−1)*2xEHT-LTF80 MHz_part4, $0_{23}$, 2xEHT-LTF80 MHz_part1, 2xEHT-LTF80 MHz_part2, 2xEHT-LTF80 MHz_part3, 2xEHT-LTF80 MHz_part4]; and 4xEHT-LTF160 MHz=[4xEHT-LTF80 MHz_part1, 4xEHT-LTF80 MHz_part2, (−1)*4xEHT-LTF80 MHz_part3, 4xEHT-LTF80 MHz_part4, $0_{23}$, 4xEHT-LTF80 MHz_part1, (−1)*4xEHT-LTF80 MHz_part2, 4xEHT-LTF80 MHz_part3, 4xEHT-LTF80 MHz_part4], wherein 2xEHT-LTF80 MHz_part1 is equal to 2xEHT-LTF80 MHz (−500:−257), 2xEHT-LTF80 MHz_part2 is equal to 2xEHT-LTF80 MHz (−256:−1), 2xEHT-LTF80 MHz_part3 is equal to 2xEHT-LTF80 MHz (0:255), and the 2xEHT-LTF80 MHz_part4 is equal to 2xEHT-LTF80 MHz (256:500); and 4xEHT-LTF80 MHz_part1 is equal to 4xEHT-LTF80 MHz (−500:−257), 4xEHT-LTF80 MHz_part2 is equal to 4xEHT-LTF80 MHz (−256:−1), 4xEHT-LTF80 MHz_part3 is equal to 4xEHT-LTF80 MHz (0:255), and the 4xEHT-LTF80 MHz_part4 is equal to 4xEHT-LTF80 MHz (256:500).

6. A method for transmitting an extremely high throughput long training field (EHT-LTF) sequence, comprising:

receiving, by a second communication device, an extremely high throughput physical layer protocol data unit (EHT PPDU), wherein the EHT PPDU comprises an EHT-LTF; and parsing, by the second communication device, the EHT-LTF in the EHT PPDU, wherein a 2xEHT-LTF sequence in an 80 MHz bandwidth is calculated according to the following equation:

2xEHT-LTF80 MHZ=[2xHE-LTF80 MHz_part1, 2xNew_partA, 2xHE-LTF80 MHZ_part2_Reverse, 2xNew_partB, 2xHE-LTF80 MHz_part4_Reverse, 2xNew_partC, 2xHE-LTF80 MHZ_part5], wherein 2xNew_partA is equal to [1, 0, −1, 0, 1], 2xNew_partB is equal to [0, 1, 0, −1, 0, 1, 0, 1, 0, 0, 0, 0, 0, 0, −1, 0, 1, 0, −1, 0, 1, 0], and 2xNew_partC is equal to [−1, 0, 1, 0, 1]; and 2xHE-LTF80 MHz_part2_Reverse indicates that 2xHE-LTF80 MHZ_part2 is arranged in a reverse order, and 2xHE-LTF80 MHz_part4_Reverse indicates that 2xHE-LTF80 MHz_part4 is arranged in a reverse order, 2xHE-LTF80 MHZ_part1 is equal to 2xHE-LTF80 MHZ (−500:−259), 2xHE-LTF80 MHz_part2 is equal to 2xHE-LTF80 MHz (−258:−17), 2xHE-LTF80 MHZ_part4 is equal to 2xHE-LTF80 MHZ (17:258), and 2xHE-LTF80 MHz_part5 is equal to 2xHE-LTF80 MHZ (259:500);

wherein a 4xEHT-LTF sequence in an 80 MHz bandwidth is calculated according to the following equation:

4xEHT-LTF80 MHZ=[4xHE-LTF80 MHz_part1, 4xNew_partA, 4xHE-LTF80 MHz_part2_Reverse, 4xNew_partB, 4xHE-LTF80 MHz_part4_Reverse, 4xNew_partC, (−1)*4xHE-LTF80 MHZ_part5], wherein 4xNew_partA is equal to [−1, −1, −1, −1, 1], 4xNew_partB is equal to [1, −1, −1, −1, 1, 1, −1, 1, −1, 0, 0, 0, 0, 0, 1, 1, 1, 1, 1, 1, −1, 1, 1], and 4xNew_partC is equal to [−1, 1, −1, 1, −1]; and 4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHZ (−500:−259), 4xHE-LTF80 MHz_part2 is equal to 4xHE-LTF80 MHz (−258:−17), 4xHE-LTF80 MHz_part4 is equal to 4xHE-LTF80 MHz (17:258), and 4xHE-LTF80 MHz_part5 is equal to 4xHE-LTF80 MHz (259:500);

wherein a 2xEHT-LTF sequence and a 4xEHT-LTF sequence in an 80 MHz bandwidth are calculated respectively according to the following equations:

2xEHT-LTF80 MHZ=[2xHE-LTF80 MHZ_part1, 2xHE-LTF80 MHz_part2_Reverse, 2xHE-LTF80 MHZ_part3, 2xHE-LTF80 MHz_part4_Reverse, 2xHE-LTF80 MHz_part5]; and 4xEHT-LTF80 MHZ [4xHE-LTF80 MHz_part1, 4xHE-LTF80 MHz_part2_Reverse, 4xHE-LTF80 MHz_part3, 4xHE-LTF80 MHz_part4_Reverse, 4xHE-LTF80 MHZ_part5], wherein 2xHE-LTF80 MHz_part2_Reverse indicates that 2xHE-LTF80 MHz_part2 is arranged in a reverse order, and 2xHE-LTF80 MHZ_part4_Reverse indicates that 2xHE-LTF80 MHz_part4 is arranged in a reverse order, 2xHE-LTF80 MHZ_part1 is equal to 2xHE-LTF80 MHZ (−500:−259), 2xHE-LTF80 MHz_part2 is equal to 2xHE-LTF80 MHZ (−258:−12), 2xHE-LTF80 MHz_part3 is equal to 2xHE-LTF80 MHZ (−11:11), 2xHE-LTF80 MHz_part4 is equal to 2xHE-LTF80 MHZ (12:258), and the 2xHE-LTF80 MHz_part5 is equal to 2xHE-LTF80 MHZ (259:500); and 4xHE-LTF80 MHz_part2_Reverse indicates that 4xHE-LTF80 MHz_part2 is arranged in a reverse order, and 4xHE-LTF80 MHZ_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−12), 4xHE-LTF80 MHz_part3 is equal to 4xHE-LTF80 MHz (−11:11), 4xHE-LTF80 MHz_part4 is equal to 4xHE-LTF80 MHZ (12:258), and the 4xHE-LTF80 MHz_part5 is equal to 4xHE-LTF80 MHZ (259:500); or wherein a 2xEHT-LTF sequence and a 4xEHT-LTF sequence in a 160 MHz bandwidth are calculated respectively according to the following equations:

2xEHT-LTF160 MHz=[2xEHT-LTF80 MHz_part1, 2xEHT-LTF80 MHz_part2, (−1)*2xEHT-LTF80 MHz_part3, (−1)*2xEHT-LTF80 MHz_part4, $0_{23}$, 2xEHT-LTF80 MHz_part1, 2xEHT-LTF80 MHz_part2, 2xEHT-LTF80 MHz_part3, 2xEHT-LTF80 MHz_part4]; and 4xEHT-LTF160 MHz=[4xEHT-LTF80 MHz_part1, 4xEHT-LTF80 MHz_part2, (−1)*4xEHT-LTF80 MHz_part3, 4xEHT-LTF80 MHz_part4, $0_{23}$, 4xEHT-LTF80 MHz_part1, (−1)*4xEHT-LTF80 MHZ_part2, 4xEHT-LTF80 MHz_part3, 4xEHT-LTF80 MHz_part4], wherein 2xEHT-LTF80 MHz_part1 is equal to 2xEHT-LTF80 MHZ (−500:−257), 2xEHT-LTF80 MHz_part2 is equal to 2xEHT-LTF80 MHz (−256:−1), 2xEHT-LTF80 MHZ_part3 is equal to 2xEHT-LTF80 MHz (0:255), and the 2xEHT-LTF80 MHz_part4 is equal to 2xEHT-LTF80 MHZ (256:500); and 4xEHT-LTF80 MHz_part1 is equal to 4xEHT-LTF80 MHz (−500:−257), 4xEHT-LTF80 MHz_part2 is equal to 4xEHT-LTF80 MHz (−256:−1), 4xEHT-LTF80 MHZ_part3 is equal to 4xEHT-LTF80 MHz (0:255), and the 4xEHT-LTF80 MHz_part4 is equal to 4xEHT-LTF80 MHZ (256:500).

7. The method according to claim 6, wherein the 2xEHT-LTF sequence in the 80 MHz bandwidth is calculated according to the equation:

2xEHT-LTF80 MHz [2xHE-LTF80 MHz_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHz_part5], wherein 2xNew_partA is equal to [1, 0, −1, 0, 1], 2xNew_partB is equal to [0, 1, 0, −1, 0, 1, 0, 1, 0, 0, 0, 0, 0, 0, 0, −1, 0, 1, 0, −1, 0, 1, 0], and 2xNew_partC is equal to [−1, 0, 1, 0, 1]; and 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−17), 2xHE-LTF80 MHz_part4 is equal to 2xHE-LTF80 MHz (17:258), and 2xHE-LTF80 MHz_part5 is equal to 2xHE-LTF80 MHz (259:500).

8. The method according to claim 6, wherein the 4xEHT-LTF sequence in the 80 MHz bandwidth is calculated according to the equation:

4xEHT-LTF80 MHz [4xHE-LTF80 MHz_part1, 4xNew_partA, 4xHE-LTF80 MHz_part2_Reverse, 4xNew_partB, 4xHE-LTF80 MHz_part4_Reverse, 4xNew_partC, (−1)*4xHE-LTF80 MHz_part5], wherein 4xNew_partA is equal to [−1, −1, −1, −1, 1], 4xNew_partB is equal to [1, −1, −1, −1, 1, 1, −1, 1, −1, 0, 0, 0, 0, 0, 1, 1, 1, 1, 1, −1, 1, 1], and 4xNew_partC is equal to [−1, 1, −1, 1, −1]; and 4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−17), 4xHE-LTF80 MHz_part4 is equal to 4xHE-LTF80 MHz (17:258), and 4xHE-LTF80 MHz_part5 is equal to 4xHE-LTF80 MHz (259:500).

9. The method according to claim 6, wherein the 2xEHT-LTF sequence and the 4xEHT-LTF sequence in an 80 MHz bandwidth are calculated respectively according to the equations:

2xEHT-LTF80 MHz=[2xHE-LTF80 MHz_part1, 2xHE-LTF80 MHz_part2_Reverse, 2xHE-LTF80 MHz_part3, 2xHE-LTF80 MHz_part4_Reverse, 2xHE-LTF80 MHz_part5]; and 4xEHT-LTF80 MHZ=[4xHE-LTF80 MHz_part1, 4xHE-LTF80 MHz_part2_Reverse, 4xHE-LTF80 MHz_part3, 4xHE-LTF80 MHz_part4_Reverse, 4xHE-LTF80 MHz_part5], wherein 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−12), 2xHE-LTF80 MHz_part3 is equal to 2xHE-LTF80 MHz (−11:11), 2xHE-LTF80 MHz_part4 is equal to 2xHE-LTF80 MHz (12:258), and the 2xHE-LTF80 MHz_part5 is equal to 2xHE-LTF80 MHz (259:500); and 4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−12), 4xHE-LTF80 MHz_part3 is equal to 4xHE-LTF80 MHz (−11:11), 4xHE-LTF80 MHz_part4 is equal to 4xHE-LTF80 MHz (12:258), and the 4xHE-LTF80 MHz_part5 is equal to 4xHE-LTF80 MHz (259:500).

10. The method according to claim 6, wherein the 2xEHT-LTF sequence and the 4xEHT-LTF sequence in a 160 MHz bandwidth are calculated respectively according to the equations:

2xEHT-LTF160 MHz=[2xEHT-LTF80 MHz_part1, 2xEHT-LTF80 MHz_part2, (−1)*2xEHT-LTF80 MHz_part3, (−1)*2xEHT-LTF80 MHz_part4, $0_{23}$, 2xEHT-LTF80 MHz_part1, 2xEHT-LTF80 MHz_part2, 2xEHT-LTF80 MHz_part3, 2xEHT-LTF80 MHz_part4]; and 4xEHT-LTF160 MHz=[4xEHT-LTF80 MHz_part1, 4xEHT-LTF80 MHz_part2, (−1)*4xEHT-LTF80 MHz_part3, 4xEHT-LTF80 MHz_part4, $0_{23}$, 4xEHT-LTF80 MHz_part1, (−1)*4xEHT-LTF80 MHz_part2, 4xEHT-LTF80 MHz_part3, 4xEHT-LTF80 MHz_part4], wherein 2xEHT-LTF80 MHz_part1 is equal to 2xEHT-LTF80 MHz (−500:−257), 2xEHT-LTF80 MHz_part2 is equal to 2xEHT-LTF80 MHz (−256:−1), 2xEHT-LTF80 MHz_part3 is equal to 2xEHT-LTF80 MHz (0:255), and the 2xEHT-LTF80 MHz_part4 is equal to 2xEHT-LTF80 MHz (256:500); and 4xEHT-LTF80 MHz_part1 is equal to 4xEHT-LTF80 MHz (−500:−257), 4xEHT-LTF80 MHz_part2 is equal to 4xEHT-LTF80 MHz (−256:−1), 4xEHT-LTF80 MHz_part3 is equal to 4xEHT-LTF80 MHz (0:255), and the 4xEHT-LTF80 MHz_part4 is equal to 4xEHT-LTF80 MHz (256:500).

11. An apparatus, applied for a first communication device, comprising:

at least one processor, and a memory storing instructions that, when executed by the at least one processor, cause the first communication device to perform operations comprising:

generating an extremely high throughput physical layer protocol data unit (EHT PPDU), wherein the EHT PPDU comprises an EHT-LTF; and sending the EHT PPDU,
wherein a 2xEHT-LTF sequence in an 80 MHz bandwidth is calculated according to the following equation:
2xEHT-LTF80 MHZ=[2xHE-LTF80 MHZ_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHZ_part5], wherein 2xNew_partA is equal to [1, 0, −1, 0, 1], 2xNew_partB is equal to [0, 1, 0, −1, 0, 1, 0, 1, 0, 0, 0, 0, 0, 0, 0, −1, 0, 1, 0, −1, 0, 1, 0], and 2xNew_partC is equal to [−1, 0, 1, 0, 1]; and
2xHE-LTF80 MHZ_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHZ (−258:−17), 2xHE-LTF80 MHZ_part4 is equal to 2xHE-LTF80 MHZ (17:258), and 2xHE-LTF80 MHz_part5 is equal to 2xHE-LTF80 MHZ (259:500);
wherein a 4xEHT-LTF sequence in an 80 MHz bandwidth is calculated according to the following equation:
4xEHT-LTF80 MHZ=[4xHE-LTF80 MHZ_part1, 4xNew_partA, 4xHE-LTF80 MHz_part2_Reverse, 4xNew_partB, 4xHE-LTF80 MHZ_part4_Reverse, 4xNew_partC, (−1)*4xHE-LTF80 MHZ_part5], wherein
4xNew_partA is equal to [−1, −1, −1, −1, 1], 4xNew_partB is equal to [1, −1, −1, −1, 1, 1, −1, 1, −1, 0, 0, 0, 0, 0, 1, 1, 1, 1, 1, 1, −1, 1, 1], and 4xNew_partC is equal to [−1, 1, −1, 1, −1]; and
4xHE-LTF80 MHZ_part2_Reverse indicates that 4xHE-LTF80 MHz_part2 is arranged in a reverse order, and 4xHE-LTF80 MHZ_part4_Reverse indicates that 4xHE-LTF80 MHz_part4 is arranged in a reverse order, 4xHE-LTF80 MHz_part1 is equal to 4xHE-LTF80 MHZ (−500:−259), 4xHE-LTF80 MHz_part2 is equal to 4xHE-LTF80 MHz (−258:−17), 4xHE-LTF80 MHz_part4 is equal to 4xHE-LTF80 MHz (17:258), and 4xHE-LTF80 MHz_part5 is equal to 4xHE-LTF80 MHZ (259:500);
wherein a 2xEHT-LTF sequence and a 4xEHT-LTF sequence in an 80 MHz bandwidth are calculated respectively according to the following equations:
2xEHT-LTF80 MHZ=[2xHE-LTF80 MHz_part1, 2xHE-LTF80 MHz_part2_Reverse, 2xHE-LTF80 MHz_part3, 2xHE-LTF80 MHz_part4_Reverse, 2xHE-LTF80 MHZ_part5]; and
4xEHT-LTF80 MHZ=[4xHE-LTF80 MHZ_part1, 4xHE-LTF80 MHz_part2_Reverse, 4xHE-LTF80 MHZ_part3, 4xHE-LTF80 MHz_part4_Reverse, 4xHE-LTF80 MHz_part5], wherein
2xHE-LTF80 MHZ_part2_Reverse indicates that 2xHE-LTF80 MHz_part2 is arranged in a reverse order, and 2xHE-LTF80 MHZ_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−12), 2xHE-LTF80 MHz_part3 is equal to 2xHE-LTF80 MHz (−11:11), 2xHE-LTF80 MHz_part4 is equal to 2xHE-LTF80 MHz (12:258), and the 2xHE-LTF80 MHz_part5 is equal to 2xHE-LTF80 MHz (259:500); and
4xHE-LTF80 MHZ_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHZ (−500:−259), 4xHE-LTF80 MHz_part2 is equal to 4xHE-LTF80 MHz (−258:−12), 4xHE-LTF80 MHZ_part3 is equal to 4xHE-LTF80 MHZ (−11:11), 4xHE-LTF80 MHz_part4 is equal to 4xHE-LTF80 MHZ (12:258), and the 4xHE-LTF80 MHz_part5 is equal to 4xHE-LTF80 MHZ (259:500); or
wherein a 2xEHT-LTF sequence and a 4xEHT-LTF sequence in a 160 MHz bandwidth are calculated respectively according to the following equations:
2xEHT-LTF160 MHZ=[2xEHT-LTF80 MHz_part1, 2xEHT-LTF80 MHz_part2, (−1)*2xEHT-LTF80 MHZ_part3, (−1)*2xEHT-LTF80 MHZ_part4, $0_{23}$, 2xEHT-LTF80 MHz_part1, 2xEHT-LTF80 MHz_part2, 2xEHT-LTF80 MHz_part3, 2xEHT-LTF80 MHz_part4]; and
4xEHT-LTF160 MHZ=[4xEHT-LTF80 MHZ_part1, 4xEHT-LTF80 MHz_part2, (−1)*4xEHT-LTF80 MHz_part3, 4xEHT-LTF80 MHz_part4, $0_{23}$, 4xEHT-LTF80 MHz_part1, (−1)*4xEHT-LTF80 MHz_part2, 4xEHT-LTF80 MHz_part3, 4xEHT-LTF80 MHz_part4], wherein
2xEHT-LTF80 MHz_part1 is equal to 2xEHT-LTF80 MHZ (−500:−257), 2xEHT-LTF80 MHz_part2 is equal to 2xEHT-LTF80 MHz (−256:−1), 2xEHT-LTF80 MHz_part3 is equal to 2xEHT-LTF80 MHZ (0:255), and the 2xEHT-LTF80 MHz_part4 is equal to 2xEHT-LTF80 MHz (256:500); and
4xEHT-LTF80 MHz_part1 is equal to 4xEHT-LTF80 MHz (−500:−257), 4xEHT-LTF80 MHz_part2 is equal to 4xEHT-LTF80 MHZ (−256:−1), 4xEHT-LTF80 MHZ_part3 is equal to 4xEHT-LTF80 MHz (0:255), and the 4xEHT-LTF80 MHZ_part4 is equal to 4xEHT-LTF80 MHZ (256:500).

12. The apparatus according to claim 11, wherein the 2xEHT-LTF sequence in the 80 MHz bandwidth is calculated according to the following equation:
2xEHT-LTF80 MHz [2xHE-LTF80 MHz_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHz_part5], wherein
2xNew_partA is equal to [1, 0, −1, 0, 1], 2xNew_partB is equal to [0, 1, 0, −1, 0, 1, 0, 1, 0, 0, 0, 0, 0, 0, 0, −1, 0, 1, 0, −1, 0, 1, 0], and 2xNew_partC is equal to [−1, 0, 1, 0, 1]; and
2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−17), 2xHE-LTF80 MHz_part4 is equal to 2xHE-LTF80 MHZ (17:258), and 2xHE-LTF80 MHz_part5 is equal to 2xHE-LTF80 MHz (259:500).

13. The apparatus according to claim 11, wherein the 4xEHT-LTF sequence in the 80 MHz bandwidth is calculated according to the equation:
4xEHT-LTF80 MHZ=[4xHE-LTF80 MHZ_part1, 4xNew_ partA, 4xHE-LTF80 MHz_part2_Reverse, 4xNew_ partB, 4xHE-LTF80 MHz_part4_Reverse, 4xNew_ partC, (−1)*4xHE-LTF80 MHZ_part5], wherein
4xNew_partA is equal to [−1, −1, −1, −1, 1], 4xNew_partB is equal to [1, −1, −1, −1, 1, 1, −1, 1, −1, 0, 0, 0, 0, 0, 1, 1, 1, 1, 1, 1, −1, 1, 1], and 4xNew_partC is equal to [−1, 1, −1, 1, −1]; and 4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−17), 4xHE-LTF80 MHz_part4 is equal to 4xHE-LTF80 MHz (17:258), and 4xHE-LTF80 MHz_part5 is equal to 4xHE-LTF80 MHz (259:500).

14. The apparatus according to claim 11, wherein the 2xEHT-LTF sequence and the 4xEHT-LTF sequence in an 80 MHz bandwidth are calculated respectively according to the equations:

2xEHT-LTF80 MHz=[2xHE-LTF80 MHz_part1, 2xHE-LTF80 MHz_part2_Reverse, 2xHE-LTF80 MHz_part3, 2xHE-LTF80 MHz_part4_Reverse, 2xHE-LTF80 MHz_part5]; and 4xEHT-LTF80 MHz=[4xHE-LTF80 MHz_part1, 4xHE-LTF80 MHz_part2_Reverse, 4xHE-LTF80 MHz_part3, 4xHE-LTF80 MHz_part4_Reverse, 4xHE-LTF80 MHz_part5], wherein 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−12), 2xHE-LTF80 MHz_part3 is equal to 2xHE-LTF80 MHz (−11:11), 2xHE-LTF80 MHz_part4 is equal to 2xHE-LTF80 MHz (12:258), and the 2xHE-LTF80 MHz_part5 is equal to 2xHE-LTF80 MHz (259:500); and 4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−12), 4xHE-LTF80 MHz_part3 is equal to 4xHE-LTF80 MHz (−11:11), 4xHE-LTF80 MHz_part4 is equal to 4xHE-LTF80 MHz (12:258), and the 4xHE-LTF80 MHz_part5 is equal to 4xHE-LTF80 MHz (259:500).

15. The apparatus according to claim 11, wherein the 2xEHT-LTF sequence and the 4xEHT-LTF sequence in a 160 MHz bandwidth are calculated respectively according to the equations:

2xEHT-LTF160 MHz=[2xEHT-LTF80 MHz_part1, 2xEHT-LTF80 MHz_part2, (−1)*2xEHT-LTF80 MHz_part3, (−1)*2xEHT-LTF80 MHz_part4, 0$_{23}$, 2xEHT-LTF80 MHz_part1, 2xEHT-LTF80 MHz_part2, 2xEHT-LTF80 MHz_part3, 2xEHT-LTF80 MHz_part4]; and 4xEHT-LTF160 MHz=[4xEHT-LTF80 MHz_part1, 4xEHT-LTF80 MHz_part2, (−1)*4xEHT-LTF80 MHz_part3, 4xEHT-LTF80 MHz_part4, 0$_{23}$, 4xEHT-LTF80 MHz_part1, (−1)*4xEHT-LTF80 MHz_part2, 4xEHT-LTF80 MHz_part3, 4xEHT-LTF80 MHz_part4], wherein 2xEHT-LTF80 MHz_part1 is equal to 2xEHT-LTF80 MHz (−500:−257), 2xEHT-LTF80 MHz_part2 is equal to 2xEHT-LTF80 MHz (−256:−1), 2xEHT-LTF80 MHz_part3 is equal to 2xEHT-LTF80 MHz (0:255), and the 2xEHT-LTF80 MHz_part4 is equal to 2xEHT-LTF80 MHz (256:500); and 4xEHT-LTF80 MHz_part1 is equal to 4xEHT-LTF80 MHz (−500:−257), 4xEHT-LTF80 MHz_part2 is equal to 4xEHT-LTF80 MHz (−256:−1), 4xEHT-LTF80 MHz_part3 is equal to 4xEHT-LTF80 MHz (0:255), and the 4xEHT-LTF80 MHz_part4 is equal to 4xEHT-LTF80 MHz (256:500).

16. An apparatus, applied for a second communication device, comprising:

at least one processor, and a memory storing instructions that, when executed by the at least one processor, cause the apparatus to perform operations comprising:

receiving an extremely high throughput physical layer protocol data unit (EHT PPDU), wherein the EHT PPDU comprises an EHT-LTF; and parsing the EHT-LTF in the EHT PPDU, wherein a 2x EHT-LTF sequence in an 80 MHz bandwidth is calculated according to the following equations:

2xEHT-LTF80 MHZ=[2xHE-LTF80 MHZ_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHZ_part5], wherein 2xNew_partA is equal to [1, 0, −1, 0, 1], 2xNew_partB is equal to [0, 1, 0, −1, 0, 1, 0, 1, 0, 1, 0, 0, 0, 0, 0, 0, 0, −1, 0, 1, 0, −1, 0, 1, 0], and 2xNew_partC is equal to [−1, 0, 1, 0, 1]; and 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHZ (−500:−259), 2xHE-LTF80 MHz_part2 is equal to 2xHE-LTF80 MHZ (−258:−17), 2xHE-LTF80 MHz_part4 is equal to 2xHE-LTF80 MHZ (17:258), and 2xHE-LTF80 MHZ_part5 is equal to 2xHE-LTF80 MHZ (259:500);

wherein a 4xEHT-LTF sequence in an 80 MHz bandwidth is calculated according to the following equation:

4xEHT-LTF80 MHZ=[4xHE-LTF80 MHz_part1, 4xNew_partA, 4xHE-LTF80 MHz_part2_Reverse, 4xNew_partB, 4xHE-LTF80 MHz_part4_Reverse, 4xNew_partC, (−1)*4xHE-LTF80 MHZ_part5], wherein 4xNew_partA is equal to [−1, −1, −1, −1, 1], 4xNew_partB is equal to [1, −1, −1, −1, 1, 1, −1, 1, −1, 0, 0, 0, 0, 0, 1, 1, 1, 1, 1, −1, 1, 1], and 4xNew_partC is equal to [−1, 1, −1, 1, −1]; and 4xHE-LTF80 MHz_part2_Reverse indicates that 4xHE-LTF80 MHZ_part2 is arranged in a reverse order, and 4xHE-LTF80 MHZ_part4_Reverse indicates that 4xHE-LTF80 MHz_part4 is arranged in a reverse order, 4xHE-LTF80 MHz_part1 is equal to 4xHE-LTF80 MHZ (−500:−259), 4xHE-LTF80 MHz_part2 is equal to 4xHE-LTF80 MHz (−258:−17), 4xHE-LTF80 MHz_part4 is equal to 4xHE-LTF80 MHZ (17:258), and 4xHE-LTF80 MHz_part5 is equal to 4xHE-LTF80 MHZ (259:500);

wherein a 2xEHT-LTF sequence and a 4xEHT-LTF sequence in an 80 MHz bandwidth are calculated respectively according to the following equations:

2xEHT-LTF80 MHZ=[2xHE-LTF80 MHZ_part1, 2xHE-LTF80 MHz_part2_Reverse, 2xHE-LTF80 MHZ_part3, 2xHE-LTF80 MHz_part4_Reverse, 2xHE-LTF80 MHZ_part5]; and 4xEHT-LTF80 MHZ [4xHE-LTF80 MHZ_part1, 4xHE-LTF80 MHz_part2_Reverse, 4xHE-LTF80

MHZ_part3, 4xHE-LTF80 MHz_part4_Reverse, 4xHE-LTF80 MHZ_part5], wherein

2xHE-LTF80 MHZ_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHZ_part2 is equal to 2xHE-LTF80 MHz (−258:−12), 2xHE-LTF80 MHz_part3 is equal to 2xHE-LTF80 MHZ (−11:11), 2xHE-LTF80 MHz_part4 is equal to 2xHE-LTF80 MHZ (12:258), and the 2xHE-LTF80 MHz_part5 is equal to 2xHE-LTF80 MHZ (259:500); and 4xHE-LTF80 MHZ_part2_Reverse indicates that 4xHE-LTF80 MHz_part2 is arranged in a reverse order, and 4xHE-LTF80 MHZ_part4_Reverse indicates that 4xHE-LTF80 MHz_part4 is arranged in a reverse order, 4xHE-LTF80 MHZ_part1 is equal to 4xHE-LTF80 MHz (−500:−259), 4xHE-LTF80 MHz_part2 is equal to 4xHE-LTF80 MHZ (−258:−12), 4xHE-LTF80 MHZ_part3 is equal to 4xHE-LTF80 MHz (−11:11), 4xHE-LTF80 MHz_part4 is equal to 4xHE-LTF80 MHZ (12:258), and the 4xHE-LTF80 MHz_part5 is equal to 4xHE-LTF80 MHz (259:500); or wherein a 2xEHT-LTF sequence and a 4xEHT-LTF sequence in a 160 MHz bandwidth are calculated respectively according to the following equations:

2xEHT-LTF160 MHz=[2xEHT-LTF80 MHz_part1, 2xEHT-LTF80 MHZ_part2, (−1)*2xEHT-LTF80 MHZ_part3, (−1)*2xEHT-LTF80 MHZ_part4, $0_{23}$, 2xEHT-LTF80 MHz_part1, 2xEHT-LTF80 MHz_part2, 2xEHT-LTF80 MHZ_part3, 2xEHT-LTF80 MHz_part4]; and 4xEHT-LTF160 MHz=[4xEHT-LTF80 MHz_part1, 4xEHT-LTF80 MHZ_part2, (−1)*4xEHT-LTF80 MHZ_part3, 4xEHT-LTF80 MHz_part4, $0_{23}$, 4xEHT-LTF80 MHz_part1, (−1)*4xEHT-LTF80 MHz_part2, 4xEHT-LTF80 MHZ_part3, 4xEHT-LTF80 MHZ_part4], wherein 2xEHT-LTF80 MHZ_part1 is equal to 2xEHT-LTF80 MHZ (−500:−257), 2xEHT-LTF80 MHz_part2 is equal to 2xEHT-LTF80 MHz (−256:−1), 2xEHT-LTF80 MHZ_part3 is equal to 2xEHT-LTF80 MHz (0:255), and the 2xEHT-LTF80 MHz_part4 is equal to 2xEHT-LTF80 MHz (256:500); and 4xEHT-LTF80 MHz_part1 is equal to 4xEHT-LTF80 MHz (−500:−257), 4xEHT-LTF80 MHz_part2 is equal to 4xEHT-LTF80 MHz (−256:−1), 4xEHT-LTF80 MHZ_part3 is equal to 4xEHT-LTF80 MHz (0:255), and the 4xEHT-LTF80 MHZ_part4 is equal to 4xEHT-LTF80 MHZ (256:500).

17. The apparatus according to claim 16, wherein the 2xEHT-LTF sequence in the 80 MHz bandwidth is calculated according to the equations:

2xEHT-LTF80 MHz [2xHE-LTF80 MHz_part1, 2xNew_partA, 2xHE-LTF80 MHz_part2_Reverse, 2xNew_partB, 2xHE-LTF80 MHz_part4_Reverse, 2xNew_partC, 2xHE-LTF80 MHz_part5], wherein 2xNew_partA is equal to [1, 0, −1, 0, 1], 2xNew_partB is equal to [0, 1, 0, −1, 0, 1, 0, 1, 0, 0, 0, 0, 0, 0, 0, −1, 0, 1, 0, −1, 0, 1, 0], and 2xNew_partC is equal to [−1, 0, 1, 0, 1]; and 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−17), 2xHE-LTF80 MHz_part4 is equal to 2xHE-LTF80 MHz (17:258), and 2xHE-LTF80 MHz_part5 is equal to 2xHE-LTF80 MHz (259:500).

18. The apparatus according to claim 16, wherein the 4xEHT-LTF sequence in the 80 MHz bandwidth is calculated according to the equation:

4xEHT-LTF80 MHZ [4xHE-LTF80 MHz_part1, 4xNew_partA, 4xHE-LTF80 MHz_part2_Reverse, 4xNew_partB, 4xHE-LTF80 MHz_part4_Reverse, 4xNew_partC, (−1)*4xHE-LTF80 MHz_part5], wherein 4xNew_partA is equal to [−1, −1, −1, −1, 1], 4xNew_partB is equal to [1, −1, −1, −1, 1, 1, −1, 1, −1, 0, 0, 0, 0, 0, 1, 1, 1, 1, 1, 1, −1, 1, 1], and 4xNew_partC is equal to [−1, 1, −1, 1, −1]; and 4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−17), 4xHE-LTF80 MHz_part4 is equal to 4xHE-LTF80 MHz (17:258), and 4xHE-LTF80 MHz_part5 is equal to 4xHE-LTF80 MHz (259:500).

19. The apparatus according to claim 16, wherein the 2xEHT-LTF sequence and the 4xEHT-LTF sequence in an 80 MHz bandwidth are calculated respectively according to the equations:

2xEHT-LTF80 MHz=[2xHE-LTF80 MHz_part1, 2xHE-LTF80 MHz_part2_Reverse, 2xHE-LTF80 MHz_part3, 2xHE-LTF80 MHz_part4_Reverse, 2xHE-LTF80 MHz_part5]; and 4xEHT-LTF80 MHz=[4xHE-LTF80 MHz_part1, 4xHE-LTF80 MHz_part2_Reverse, 4xHE-LTF80 MHz_part3, 4xHE-LTF80 MHz_part4_Reverse, 4xHE-LTF80 MHz_part5], wherein 2xHE-LTF80 MHz_part2_Reverse indicates that 2xHE-LTF80 MHz_part2 is arranged in a reverse order, and 2xHE-LTF80 MHz_part4_Reverse indicates that 2xHE-LTF80 MHz_part4 is arranged in a reverse order, 2xHE-LTF80 MHz_part1 is equal to 2xHE-LTF80 MHz (−500:−259), 2xHE-LTF80 MHz_part2 is equal to 2xHE-LTF80 MHz (−258:−12), 2xHE-LTF80 MHz_part3 is equal to 2xHE-LTF80 MHz (−11:11), 2xHE-LTF80 MHz_part4 is equal to 2xHE-LTF80 MHz (12:258), and the 2xHE-LTF80 MHz_part5 is equal to 2xHE-LTF80 MHz (259:500); and 4xHE-LTF80 MHz_part2_Reverse indicates that 4xHE-LTF80 MHz_part2 is arranged in a reverse order, and 4xHE-LTF80 MHz_part4_Reverse indicates that 4xHE-LTF80 MHz_part4 is arranged in a reverse order, 4xHE-LTF80 MHz_part1 is equal to 4xHE-LTF80 MHz (−500:−259), 4xHE-LTF80 MHz_part2 is equal to 4xHE-LTF80 MHz (−258:−12), 4xHE-LTF80 MHz_part3 is equal to 4xHE-LTF80 MHz (−11:11), 4xHE-LTF80 MHz_part4 is equal to 4xHE-LTF80 MHz (12:258), and the 4xHE-LTF80 MHz_part5 is equal to 4xHE-LTF80 MHz (259:500).

20. The apparatus according to claim 16, wherein the 2xEHT-LTF sequence and the 4xEHT-LTF sequence in a 160 MHz bandwidth are calculated respectively according to the equations:

2xEHT-LTF160 MHz=[2xEHT-LTF80 MHz_part1, 2xEHT-LTF80 MHz_part2, (−1)*2xEHT-LTF80 MHz_part3, (−1)*2xEHT-LTF80 MHz_part4, $0_{23}$, 2xEHT-LTF80 MHz_part1, 2xEHT-LTF80 MHz_part2, 2xEHT-LTF80 MHz_part3, 2xEHT-LTF80 MHz_part4]; and 4xEHT-LTF160 MHz=[4xEHT-LTF80 MHz_part1, 4xEHT-LTF80 MHz_part2, (−1)*4xEHT-LTF80 MHz_part3, 4xEHT-LTF80 MHz_part4, $0_{23}$, 4xEHT-LTF80 MHz_part1, (−1)*4xEHT-LTF80 MHz_part2, 4xEHT-LTF80 MHz_part3, 4xEHT-LTF80 MHz_part4], wherein 2xEHT-LTF80 MHz_part1 is equal to 2xEHT-LTF80 MHz (−500:−257), 2xEHT-LTF80 MHz_part2 is equal to 2xEHT-LTF80 MHz (−256:−1), 2xEHT-LTF80 MHz_part3 is equal to 2xEHT-LTF80 MHz (0:255), and the 2xEHT-LTF80 MHz_part4 is equal to 2xEHT-LTF80 MHz (256:500); and 4xEHT-LTF80 MHz_part1 is equal to 4xEHT-LTF80 MHz (−500:−257), 4xEHT-LTF80 MHz_part2 is equal to 4xEHT-LTF80 MHz (−256:−1), 4xEHT-LTF80 MHz_part3 is equal to 4xEHT-LTF80 MHz (0:255), and the 4xEHT-LTF80 MHz_part4 is equal to 4xEHT-LTF80 MHz (256:500).

\* \* \* \* \*